(12) United States Patent
Lee et al.

(10) Patent No.: US 11,648,478 B2
(45) Date of Patent: May 16, 2023

(54) VIRTUAL REALITY CONTROL SYSTEM

(71) Applicant: SKONEC ENTERTAINMENT CO., LTD., Seoul (KR)

(72) Inventors: Who Jung Lee, Seoul (KR); Jae Young Kim, Namyangju-si (KR); Sang Woo Han, Seoul (KR); Jong Hyun Yuk, Seoul (KR)

(73) Assignee: SKONEC ENTERTAINMENT CO., LTD., Seoul (KR)

( * ) Notice: Subject to any disclaimer, the term of this patent is extended or adjusted under 35 U.S.C. 154(b) by 0 days.

(21) Appl. No.: 16/958,545

(22) PCT Filed: Dec. 26, 2018

(86) PCT No.: PCT/KR2018/016684
§ 371 (c)(1),
(2) Date: Jun. 26, 2020

(87) PCT Pub. No.: WO2019/132522
PCT Pub. Date: Jul. 4, 2019

(65) Prior Publication Data
US 2020/0338453 A1    Oct. 29, 2020

Related U.S. Application Data

(60) Provisional application No. 62/610,455, filed on Dec. 26, 2017.

(30) Foreign Application Priority Data

Aug. 21, 2018  (KR) .......................... 10-2018-0097683
Aug. 21, 2018  (KR) .......................... 10-2018-0097684
Aug. 21, 2018  (KR) .......................... 10-2018-0097685

(51) Int. Cl.
*A63F 13/65*    (2014.01)
*A63F 13/52*    (2014.01)
(Continued)

(52) U.S. Cl.
CPC ............ *A63F 13/65* (2014.09); *A63F 13/212* (2014.09); *A63F 13/52* (2014.09);
(Continued)

(58) Field of Classification Search
CPC ........ A63F 13/65; A63F 13/212; A63F 13/52; A63F 13/5375; A63F 13/56; A63F 13/69;
(Continued)

(56) References Cited

U.S. PATENT DOCUMENTS 5,615,132 A    3/1997 Horton et al.
5,659,691 A    8/1997 Durward et al.
(Continued)

FOREIGN PATENT DOCUMENTS

EP    2579128 B1    11/2017
JP    09-503082 A    3/1997
(Continued)

OTHER PUBLICATIONS

Machine translation of JP 2010-068872 Program, Information Storage Medium and Game Device.*
(Continued)

*Primary Examiner* — Malina D. Blaise
(74) *Attorney, Agent, or Firm* — Maschoff Brennan

(57) ABSTRACT

According to one aspect, there is provided a virtual reality control system including: a sensor detecting a light signal; a display displaying an image to a user; at least one controller controlling the display; and an input device transmitting an input signal input from the user to the controller, wherein the controller is computing position data of the user by using data based on the light signal and computing virtual position data based on the position data of the user, wherein a plurality of areas is displayed on the display based on the virtual position data, wherein the plurality of areas includes an accessible area, where a character based on the virtual (Continued)

position data can move to, and an inaccessible area, where the character cannot move to, wherein an accessible mark is provided in the accessible area which is located within a reference distance from the character.

9 Claims, 35 Drawing Sheets

(51) Int. Cl.
    *A63F 13/5375* (2014.01)
    *A63F 13/69* (2014.01)
    *A63F 13/837* (2014.01)
    *G06F 3/01* (2006.01)
    *G06T 19/00* (2011.01)
    *A63F 13/212* (2014.01)
    *A63F 13/56* (2014.01)
    *G02B 27/01* (2006.01)
    *G06T 19/20* (2011.01)
    *A63F 13/847* (2014.01)

(52) U.S. Cl.
CPC .......... *A63F 13/5375* (2014.09); *A63F 13/56* (2014.09); *A63F 13/69* (2014.09); *A63F 13/837* (2014.09); *G02B 27/017* (2013.01); *G06F 3/011* (2013.01); *G06T 19/006* (2013.01); *G06T 19/20* (2013.01); *A63F 13/847* (2014.09); *A63F 2300/575* (2013.01); *A63F 2300/8082* (2013.01)

(58) Field of Classification Search
CPC .................. A63F 13/837; A63F 13/847; A63F 2300/575; A63F 2300/8082; G02B 27/017; G06F 3/011; G06T 19/006; G06T 19/20
See application file for complete search history.

(56) References Cited

U.S. PATENT DOCUMENTS

| | | | |
|---|---|---|---|
| 7,292,240 B2 | 11/2007 | Okuno et al. | |
| 9,405,365 B2* | 8/2016 | Publicover | G06F 3/013 |
| 9,599,821 B2 | 3/2017 | Van Curen et al. | |
| 9,983,697 B1* | 5/2018 | Gribetz | G06T 19/006 |
| 9,984,510 B1* | 5/2018 | Kinstner | G06T 15/08 |
| 2006/0050069 A1 | 3/2006 | Okuno et al. | |
| 2006/0071946 A1* | 4/2006 | Anabuki | G06T 7/73 345/633 |
| 2007/0202946 A1* | 8/2007 | Matsuyama | A63F 13/837 463/7 |
| 2011/0043702 A1* | 2/2011 | Hawkins | G06F 3/017 348/584 |
| 2011/0225069 A1* | 9/2011 | Cramer | G06Q 30/06 705/26.1 |
| 2013/0293677 A1 | 11/2013 | Lee et al. | |
| 2014/0221090 A1 | 8/2014 | Mutschler et al. | |
| 2014/0306866 A1 | 10/2014 | Miller et al. | |
| 2015/0190716 A1 | 7/2015 | Evertt et al. | |
| 2015/0234462 A1 | 8/2015 | Miller et al. | |
| 2015/0234463 A1 | 8/2015 | Miller et al. | |
| 2015/0235429 A1 | 8/2015 | Miller et al. | |
| 2015/0235433 A1 | 8/2015 | Miller et al. | |
| 2015/0235434 A1 | 8/2015 | Miller et al. | |
| 2015/0235435 A1 | 8/2015 | Miller et al. | |
| 2015/0235610 A1 | 8/2015 | Miller et al. | |
| 2015/0325055 A1* | 11/2015 | Balakrishna | H04N 13/361 348/49 |
| 2016/0041391 A1 | 2/2016 | Van Curen et al. | |
| 2017/0018184 A1* | 1/2017 | Northrup | H04W 4/02 |
| 2017/0115727 A1* | 4/2017 | Matsuike | G06T 19/20 |
| 2018/0015375 A1* | 1/2018 | Marino | A63F 13/537 |
| 2018/0143429 A1 | 5/2018 | Gibbs et al. | |
| 2018/0149864 A1 | 5/2018 | Gibbs et al. | |
| 2018/0210627 A1 | 7/2018 | Woo et al. | |
| 2018/0250595 A1 | 9/2018 | Kurabayashi | |
| 2018/0288119 A1* | 10/2018 | Lee | H04L 67/125 |
| 2019/0155481 A1* | 5/2019 | DiVerdi | G06T 19/20 |
| 2019/0362564 A1* | 11/2019 | Shen | G06T 19/20 |

FOREIGN PATENT DOCUMENTS

| | | | |
|---|---|---|---|
| JP | 10-283151 A | 10/1998 | |
| JP | 2002-149581 A | 5/2002 | |
| JP | 2003-271992 A | 9/2003 | |
| JP | 2006-079174 A | 3/2006 | |
| JP | 2010-068872 A | 4/2010 | |
| JP | 2017-086215 A | 5/2017 | |
| JP | 2018-018147 A | 2/2018 | |
| KR | 10-2006-0127255 A | 12/2006 | |
| KR | 10-2012-0084252 A | 7/2012 | |
| KR | 10-2014-0033088 A | 3/2014 | |
| KR | 10-2014-0083015 A | 7/2014 | |
| KR | 10-2015-0106772 A | 9/2015 | |
| KR | 10-2016-0018436 A | 2/2016 | |
| KR | 10-2016-0068361 A | 6/2016 | |
| KR | 10-1666561 B1 | 10/2016 | |
| KR | 10-2016-0135652 A | 11/2016 | |
| KR | 10-2017-0033340 A | 3/2017 | |
| KR | 10-2017-0069790 A | 6/2017 | |
| WO | 2014/164901 A1 | 10/2014 | |

OTHER PUBLICATIONS

"R Cake baking games" (Nov. 1, 2017) https://www.youtube.com/watch?v=e5BlI7R-nYs.
"Tower Tag—A PvP Shooter made for VR Arcades" (Mar. 20, 2017) https://www.youtube.com/watch?v=Fg8XobTnvOg.
"Serious Sam VR : The Last Hope" (Jan. 3, 2017) https://www.youtube.com/watch?v=GOgTcUApAxM.
KR Office Action dated Sep. 16, 2019 as received in Application No. 10-2018-0097683.
KR Office Action dated Sep. 16, 2019 as received in Application No. 10-2018-0097684.
KR Office Action dated Oct. 8, 2019 as received in Application No. 10-2018-0097682.
KR Office Action dated Oct. 30, 2019 as received in Application No. 10-2018-0167749.
KR Decision to Grant dated Feb. 18, 2020 as received in Application No. 10-2018-0097683.
KR Decision to Grant dated Feb. 18, 2020 as received in Application No. 10-2018-0097684.
KR Decision to Grant dated Mar. 3, 2020 as received in Application No. 10-2018-0097685.
KR Office Action dated Jan. 14, 2020 as received in Application No. 10-2018-0097686.
KR Office Action dated Apr. 14, 2020 as received in Application No. 10-2018-0097687.
KR Notice of Allowance in Application No. 10-2018-0097687 dated Nov. 4, 2020.
KR Office Action in Application No. 10-2018-0097686 dated Aug. 15, 2020.
KR Office Action in Application N. 10-2018-0097686 dated Jun. 29, 2020.
KR Office Action in Application No. 10-2018-0097687 dated Sep. 8, 2020.
KR Office Action in Application No. 10-2018-0167749 dated Jul. 30, 2020.
U.S. Office Action in U.S. Appl. No. 16/958,524 dated Jun. 24, 2022.

* cited by examiner

1000

FIG. 17
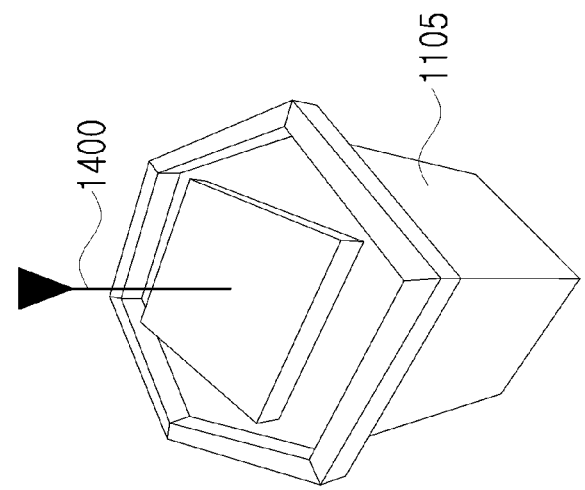
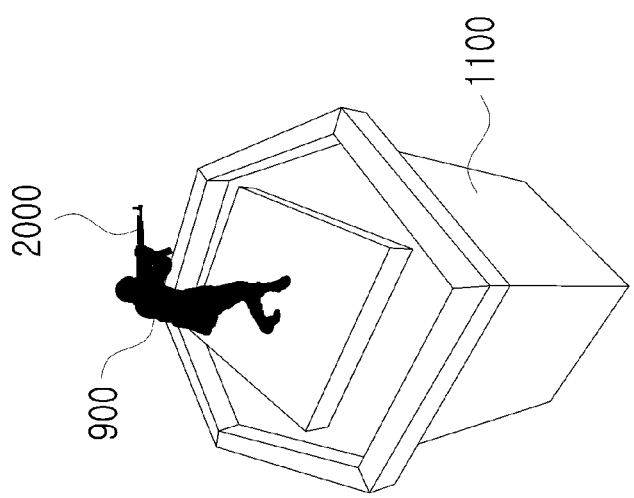

FIG. 19
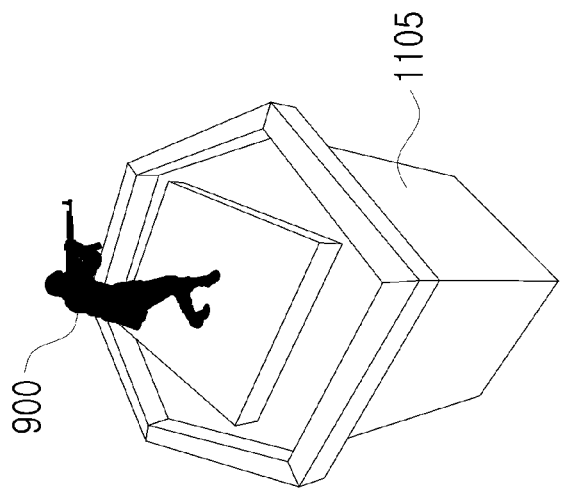
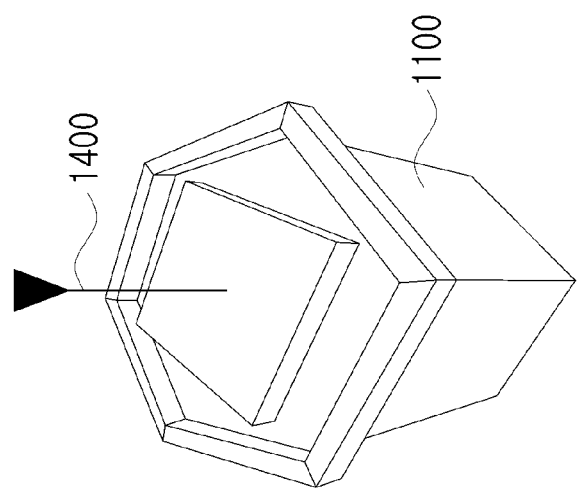

VIRTUAL REALITY CONTROL SYSTEM

TECHNICAL FIELD

The present invention relates to a virtual reality control system.

BACKGROUND ART

Virtual reality may be a technology that provides a user with virtual information added to reality or with a state of a target object in the real world as a virtual environment image generated by a program.

Such a technology for providing a virtual environment may include a technology that creates a virtual space, a virtual character, and a virtual object using a program on the basis of information provided in the real world regarding a state of the target object such as a user or an object. In this technology, information on the state of the target object may be acquired using various sensors.

Meanwhile, as a method of moving a virtual character in a virtual environment according to the state of the target object, a method in which the virtual character moves according to the movement of the user may be provided. However, there is a discrepancy between a space where the user can move in the real world and a space where the virtual character can move in the virtual environment, and thereby the user may feel uncomfortable in moving.

Therefore, a method of effectively moving a virtual character in a virtual environment according to movement of the user in reality is required.

DISCLOSURE

Technical Problem

One object of the present invention is to provide a method of implementing a virtual reality to provide a virtual experience to a user, in which a character corresponding to a user is allowed to freely move, and a method of moving a virtual character in a virtual environment according to movement of the user in the real word.

Technical Solution

One aspect of the present invention provides a virtual reality control system comprising a sensor detecting a light signal, a display displaying an image to a user, at least one controller controlling the display, and an input device transmitting an input signal input from the user to the controller, wherein the controller is computing position data of the user by using data based on the light signal and computing virtual position data based on the position data of the user, wherein a plurality of areas is displayed on the display based on the virtual position data, wherein the plurality of areas includes an accessible area, where a character based on the virtual position data can move to, and an inaccessible area, where the character cannot move to, wherein an accessible mark is provided in the accessible area which is located within a reference distance from the character, wherein when the input signal is transmitted to the controller while a virtual object corresponding to position data of the input device aims the accessible area which is located within the reference distance at a selection moment, the controller changes a field of view displayed on the display from a field of view corresponding to the virtual position data to a field of view corresponding to the accessible area where the virtual object aims at the selection moment, and wherein when the input signal is transmitted to the controller while the virtual object aims the inaccessible area, the controller does not change a field of view displayed on the display.

Another aspect of the present invention provides a virtual reality control system including a first sensor detecting a first light signal; a second sensor detecting a second light signal, a first display displaying an image to a first user, a second display displaying an image to a second user, at least one controller controlling at least one of the first display and the second display, and an input device transmitting an input signal input from the first user to the controller, wherein the at least one controller is computing first position data of the first user based on the first light signal and computing first virtual position data based on the first position data, computing second position data of the second user based on the second light signal, and computing second virtual position data based on the second position data, wherein a plurality of areas is displayed on at least one of the first display and the second display based on at least one of the first virtual position data and the second virtual position data, wherein the plurality of areas includes an accessible area, where a first character based on the first virtual position data or a second character based on the second virtual position data can move to, and an inaccessible area, where the first character and the second character cannot move to, wherein a first accessible mark is provided in the accessible area which is located within a first reference distance from the first character, wherein when the input signal is transmitted to the controller while a virtual object corresponding to position data of the input device aims the first accessible mark, the controller changes a field of view displayed on the first display from a field of view corresponding to the first virtual position data to a field of view corresponding to the accessible area where the first accessible mark is provided, and wherein when the input signal is transmitted to the controller while the virtual object aims the inaccessible area, the controller does not change a field of view displayed on the first display.

Advantageous Effects

According to one embodiment, when a virtual experience is provided to a user, a character corresponding to the user can easily recognize an accessible area and freely move in a virtual reality, and thus a feeling of immersion and an interest in the virtual experience can be increased.

According to another embodiment, when a virtual experience is provided to a plurality of users, characters corresponding to the respective users in the virtual reality distinguish accessible areas and the lines of movement are not crossed, and thus not only the feeling of immersion and interest in the virtual experience but also safety can be increased.

DESCRIPTION OF DRAWINGS

FIG. 17 is a diagram illustrating an example of a display stage of FIG. 16 according to one embodiment.

FIG. 19 is a diagram illustrating an example of an operation stage of FIG. 16 according to one embodiment.

MODES OF THE INVENTION

Figure 1:
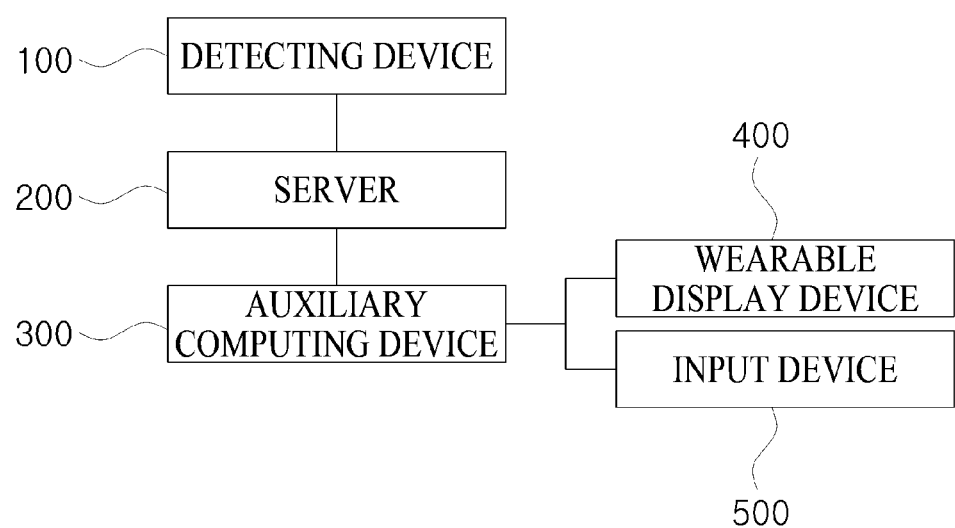
FIG. 1 is a diagram illustrating an environment of a virtual reality control system according to one embodiment.

The above objects, characteristics, and advantages of the present invention will now be described more fully with reference to the accompanying drawings. The invention may, however, be embodied in many different forms and in description that follows, particular embodiments of the invention are illustrated in the accompanying drawings and described in detail.

In the drawings, the thicknesses of layers and regions are exaggerated for clarity. It will also be understood that when a layer is referred to as being "on" another layer or substrate, it can be directly on another layer or substrate, or intervening layers may also be present. Further, like reference numerals will be used to designate like components having similar functions throughout the drawings within the scope of the present disclosure.

Detailed descriptions of related well-known functions that are determined to unnecessarily obscure the gist of the present invention will be omitted. While the terms including an ordinal number, such as "first," "second," etc., may be used to describe various components, such components are not be limited by these terms. The terms first and second should not be used to attach any order of importance but are used to distinguish one element from another element.

Further, in the following description, usage of terms, such as "module," and "unit" used for referring to elements is given merely to facilitate explanation of the present invention, without having any significant meaning by itself.

Unlike the real world, virtual reality may be an artificial environment created by a program.

Such virtual reality may be generally classified into a virtual reality (VR) that creates a virtual space separated from reality with a program and provides an image of the virtual space, an augmented reality (AR) that provides a single image by superimposing virtual images on the real world, and a mixed reality (MR) that provides a virtual space by mixing the real world and a virtual reality and provides an image of the virtual space.

In describing virtual reality hereinafter, the virtual reality may refer to a virtual environment that provides various types of virtual spaces, as well as the above-described VR, AR, and MR.

Hereinafter, a virtual reality control system 10 for providing virtual reality according to one embodiment will be described with reference to FIG. 1.

FIG. 1 is a diagram illustrating an environment of a virtual reality control system 10 according to one embodiment.

Referring to FIG. 1, the virtual reality control system may include a detecting device 100, a server 200, an auxiliary computing device 300, a wearable display device 400, and an input device 500.

According to one embodiment, the detecting device 100 may be connected to the server 200.

The detecting device 100 may acquire detecting data by tracking a target object.

The target object according to one embodiment may be an object that affects an image output through the wearable display device 400.

For example, the target object may include at least one of the wearable display device 400, a user, the input device 500, an object located near the user, and an object having a reference point or a characteristic point.

In addition, the tracking of the target object according to one embodiment may mean acquiring data on a position of the target object in the reality environment.

For example, by tracking the target object, data on a position that changes according to movement of the target object in the reality environment may be acquired. The position data of the target object may be acquired at predetermined intervals but is not limited thereto.

According to one embodiment, the detecting device 100 may provide the detecting data to the server 200.

According to one embodiment, the server 200 may be connected to the detecting device 100 and the auxiliary computing device 300.

The server 200 may acquire data from the devices connected thereto.

According to one embodiment, the server 200 may acquire at least one of detecting data, image data acquired by the detecting device 100, and state data of the detecting device 100 from the detecting device 100.

In addition, the server 200 may acquire a variety of data according to some embodiments described below.

According to one embodiment, the server 200 may control the devices connected thereto.

According to one embodiment, the server 200 may control the auxiliary computing device 300 or the wearable display device 400.

In one example, the server 200 may control driving a program or application installed in the auxiliary computing device 300. More specifically, the server 200 may control start and/or termination of the program or application installed in the auxiliary computing device 300.

In another example, the server 200 may provide various settings necessary for operation of the detecting device 100.

In addition, the server 200 may generate position data of the target object or generate virtual position data corresponding to a position of the target object in a virtual environment on the basis of the detecting data.

Also, the server 200 may perform authentication of the program or application executed in the auxiliary computing device 300.

The functions of the server 200 according to one embodiment are not limited to the above-described functions, and the server 200 that performs various functions may be provided according to some embodiments.

In addition, the server 200 according to one embodiment is not necessarily provided as a single physical device and may be provided as a plurality of devices that perform individual functions which are subdivided from the above-described functions.

For example, the server 200 may be divided into a detecting server connected to the detecting device 100 and configured to acquire position data on the basis of the detecting data, an operation server configured to control some of the devices provided to the system, and a license server configured to perform authentication of a program or application executed in at least one device among the devices of the virtual reality control system 10, and relevant functions may be performed by the respective servers.

Meanwhile, the server 200 may be provided with an input signal acquired by the auxiliary computing device 300 from the input device 500 or input data based on the input signal.

The input data may include selection data of the user regarding an object or the like, data related to a motion input via the input device 500, and aiming data related to an aiming direction of the input device 500.

The auxiliary computing device 300 may be connected to at least one of the detecting device 100, the server 200, the wearable display device 400, and the input device 500.

The auxiliary computing device 300 may calculate virtual position data on the basis of the position data acquired from the server 200.

Alternatively, the auxiliary computing device 300 may calculate the position data of the target object or calculate the virtual position data by processing the detecting data acquired from the detecting device 100.

The auxiliary computing device 300 may provide an image to the user via the wearable display device 400 through a pre-stored program or application.

In addition, the auxiliary computing device 300 may provide sound data to be provided via the wearable display device 400.

According to one embodiment, the auxiliary computing device 300 may acquire an image to be provided to the user on the basis of the position data through a pre-installed program or application.

In addition, the auxiliary computing device 300 may acquire input data on the basis of the input signal acquired from the input device 500.

In addition, the auxiliary computing device 300 may acquire an image to be provided to the user by taking into account the acquired input data.

The wearable display device 400 may be connected to the auxiliary computing device 300.

The wearable display device 400 may provide an image of a virtual environment to the user.

The wearable display device 400 may visually output the virtual environment image acquired from the auxiliary computing device 300 to the user.

In addition, the wearable display device 400 may output the sound data acquired from the auxiliary computing device 300.

The input device 500 may acquire a signal related to a user's input to be reflected in the virtual environment.

The input device 500 may be connected to the auxiliary computing device 300.

The input device 500 may provide an input signal that corresponds to the user's input to the auxiliary computing device 300.

The input device 500 may include an acceleration sensor, a gyroscope, a gyro sensor, microelectromechanical systems (MEMS), a geomagnetic sensor, an inertial measurement sensor (IMIU), an optical sensor, an illuminance sensor, a photo sensor, an infrared sensor, a color sensor, a depth sensor, an electromagnetic wave sensor, and the like for acquiring a signal corresponding to a movement of the user.

In addition, the input device 500 may include a button, a switch, a jog shuttle, a wheel, and the like for acquiring a signal related to the user's selection.

In addition, the input device 500 may be connected to the auxiliary computing device 300 through at least one of wired communication and wireless communication.

Also, the input device 500 may include a communication module for communicating with the auxiliary computing device 300.

FIG. 1 illustrates that the input device 500 is connected to the auxiliary computing device 300, but the embodiment is not limited thereto, and the input device 500 may be provided in various connection forms according to the selection.

For example, the input device 500 may be connected to the server 200 and the wearable display device 400 and provide an input signal thereto.

The above-described virtual reality control system 10 is merely an example for convenience of description. The virtual reality control system 10 according to one embodiment is not limited to the configuration and connection relationship shown in FIG. 1 and may be provided in various forms according to the selection.

In one example, the auxiliary computing device 300 and the wearable display device 400 may be provided as one device, and in this case, operations performed in the auxiliary computing device 300 may be implemented in the wearable display device 400.

However, in the following description of the various embodiments, the above-described virtual reality control system 10 will be described as an example for convenience of description.

Hereinafter, a detecting device 100 according to one embodiment will be described with reference to FIG. 2.

Figure 2:
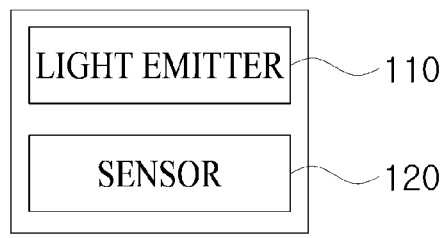
FIG. 2 is a block diagram illustrating a detecting device according to one embodiment.

FIG. 2 is a block diagram illustrating a detecting device according to one embodiment.

Referring to FIG. 2, the detecting device 100 may include a light emitter 110 and a sensor 120.

The light emitter 110 may project a signal to the target object or to the vicinity of the target object for tracking.

In one example, the light emitter 110 may be provided as a light-emitting device that projects an optical signal such as visible light, infrared light, or the like.

More specifically, the light emitter may be provided as a visible-light light emitting diode (LED), an infrared LED, or the like.

The sensor 120 may acquire a signal from an external source.

In one example, the sensor 120 may acquire a signal corresponding to the signal projected from the light emitter 110.

In another example, the sensor 120 may acquire a signal related to light reflected by a marker provided on the target object.

For example, the sensor 120 may be provided as an image sensor, an optical sensor, an illuminance sensor, a photo sensor, an infrared sensor, a color sensor, a depth sensor, an electromagnetic wave sensor, or the like.

Figure 3:
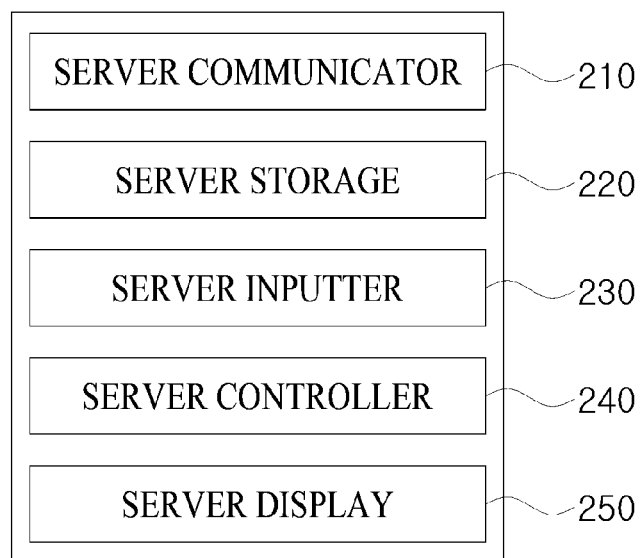
FIG. 3 is a block diagram illustrating a server according to one embodiment.

FIG. 3 is a block diagram illustrating a server 200 according to one embodiment.

Referring to FIG. 3, the server 200 may include a server communicator 210, a server storage 220, a server inputter 230, a server controller 240, and a server display 250.

The server communicator 210 may be connected to at least one of the detecting device 100, the auxiliary computing device 300, the wearable display device 400, and the input device 500 to acquire or provide data therefrom or thereto.

The server communicator 210 may be connected to at least one of the detecting device 100, the auxiliary computing device 300, the wearable display device 400, and the input device 500 through at least one of wired communication and wireless communication.

For example, the wireless communication may include a mobile communication network, such as a Wi-Fi network, a $3^{rd}$ generation (3G) network, a long-term evolution (LTE) network, a 5G network, and Long Range (LoRA), wireless access in vehicular environment (WAVE), beacon, ZigBee, Bluetooth, Bluetooth low energy, or the like.

In addition, the wired communication may include a twisted-pair cable, a coaxial cable, an optical fiber cable, or the like.

The server communicator 210 may be provided as a communication module for providing at least one of the wired communication and the wireless communication.

The server storage 220 may store data therein.

The server storage 220 may store data acquired from an external source.

In addition, the server storage 220 may store data necessary for operation of the server 200.

For example, the server storage 220 may be provided as a hard disk, a floppy disk, a magnetic medium, such as magnetic tape, an optical medium, such as a compact disc read only memory (CD-ROM), a digital versatile disc, or the like, a magneto-optical medium, such as a floptical disk, a read only memory (ROM), a random access memory (RAM), a flash memory, a solid state drive (SSD), a CD-ROM, a DVD-ROM, a Universal Serial Bus (USB), or the like.

The server inputter 230 may acquire a signal corresponding to an input of the user.

The input of the user may be, for example, a press, a click, a touch, or a drag of a button.

The server inputter 230 may be implemented as, for example, a keyboard, a key pad, a jog shuttle, or a wheel.

The server controller 240 may control an overall operation of the server 200.

For example, the server controller 240 may control the operation of a device included in the server 200.

The server display 250 may output visual data.

The server display 250 may be provided as a monitor, a TV, a display panel, or the like, which outputs visual data.

In addition, when the server display 250 is provided as a touch screen, the server display 250 may perform a function of the server inputter 230.

Figure 4:
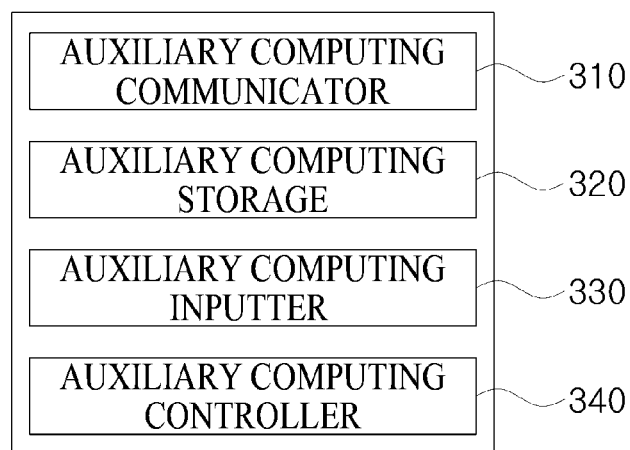
FIG. 4 is a block diagram illustrating an auxiliary computing device according to one embodiment.

FIG. 4 is a block diagram illustrating an auxiliary computing device 300 according to one embodiment.

Referring to FIG. 4, the auxiliary computing device 300 may include an auxiliary computing communicator 310, an auxiliary computing storage 320, an auxiliary computing inputter 330, and an auxiliary computing controller 340.

The auxiliary computing communicator 310 may be connected to at least one of the server 200, the wearable display device 400, and the input device 500.

The auxiliary computing communicator 310 may be connected to at least one of the server 200, the wearable display device 400 and the input device 500 through at least one of wired communication and wireless communication.

The auxiliary computing communicator 310 may exchange data with at least one of the connected server 200, the connected wearable display device, and the connected input device 500.

For example, the wireless communication may include a mobile communication network, such as a Wi-Fi network, a 3G network, an LTE network, a 5G network, and LoRA, WAVE, beacon, ZigBee, Bluetooth, Bluetooth low energy, and the like.

In addition, the wired communication may include a twisted-pair cable, a coaxial cable, an optical fiber cable, or the like.

The auxiliary computing communicator 310 may be provided as a communication module for providing at least one of the wired communication and the wireless communication.

The auxiliary computing storage 320 may store data acquired from an external source.

In addition, the auxiliary computing storage 320 may store data necessary for operation of the auxiliary computing device 300.

Also, the auxiliary computing storage 320 may store therein an application or program therein to provide a virtual experience to the user.

The auxiliary computing inputter 330 may acquire a signal corresponding to an input of the user.

The input of the user may be, for example, a press, a click, a touch, or a drag of a button.

For example, the auxiliary computing inputter 330 may be implemented as, for example, a keyboard, a key pad, a jog shuttle, or a wheel.

The auxiliary computing controller 340 may control an overall operation of the auxiliary computing device 300.

Figure 5:
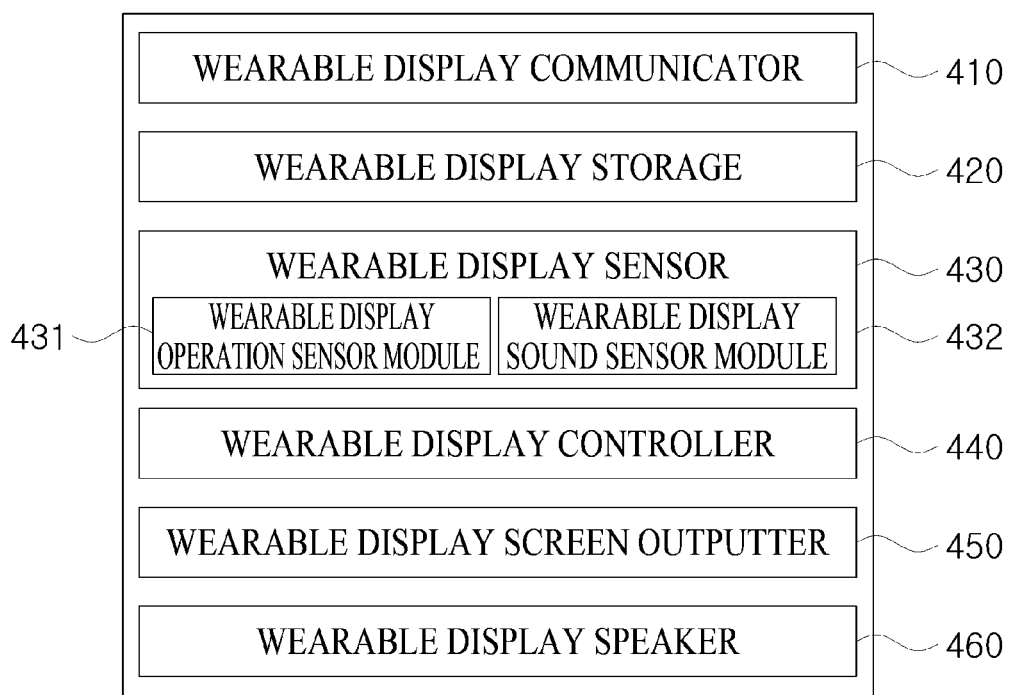
FIG. 5 is a diagram illustrating a wearable display device according to one embodiment.

FIG. 5 is a diagram illustrating a wearable display device 400 according to one embodiment.

Referring to FIG. 5, the wearable display device 400 may include a wearable display communicator 410, a wearable display storage 420, a wearable display sensor 430, a wearable display controller 440, a wearable display screen outputter 450, and a wearable display speaker 460.

The wearable display communicator 410 may be connected to the auxiliary computing device 300.

The wearable display communicator 410 may be connected to the auxiliary computing device 300 through at least one of wired communication and wireless communication.

The wearable display storage 420 may store data therein.

The wearable display storage 420 may store an application or program necessary for operation of the wearable display device 400.

In addition, the wearable display storage 420 may store data acquired from an external source.

The wearable display sensor 430 may acquire a state of the wearable display device 400 and a signal corresponding to an input of the user.

The wearable display sensor 430 according to one embodiment may include a wearable display operation sensor module 431 and a wearable display sound sensor module 432.

The wearable display operation sensor module 431 may acquire a signal related to a state of the wearable display device 400.

In one example, the wearable display operation sensor module 431 may acquire rotation data related to a rotation of the wearable display device 400.

In another example, the wearable display operation sensor module 431 may acquire movement data related to a position movement of the wearable display device 400.

The wearable display operation sensor module 431 may include an acceleration sensor, a gyroscope, a gyro sensor, MEMS, a geomagnetic sensor, an IMIU, an optical sensor, an illuminance sensor, a photo sensor, an infrared sensor, a color sensor, a depth sensor, an electromagnetic wave sensor, and the like.

The wearable display sound sensor module 432 may acquire a signal corresponding to a sound externally input.

In one example, the wearable display sound sensor module 432 may be a microphone.

The wearable display controller 440 may control an overall operation of the wearable display device 400.

The wearable display screen outputter 450 may output visual data to the user.

In one example, the wearable display screen outputter 450 may output an image of virtual reality. In another example, the wearable display screen outputter 450 may output an image of a three-dimensional (3D) virtual reality.

The wearable display screen outputter 450 may be provided as an image outputting device, such as a liquid crystal display (LCD), electronic paper, an LED display, organic light emitting diode (OLED) display, a curved display, a stereoscopy (a 3D display using binocular disparity), or the like.

The wearable display speaker 460 may output auditory data.

The wearable display speaker 460 may be provided as a sound device, such as a tuner, a player, an amplifier, a speaker, or the like.

Figure 6:
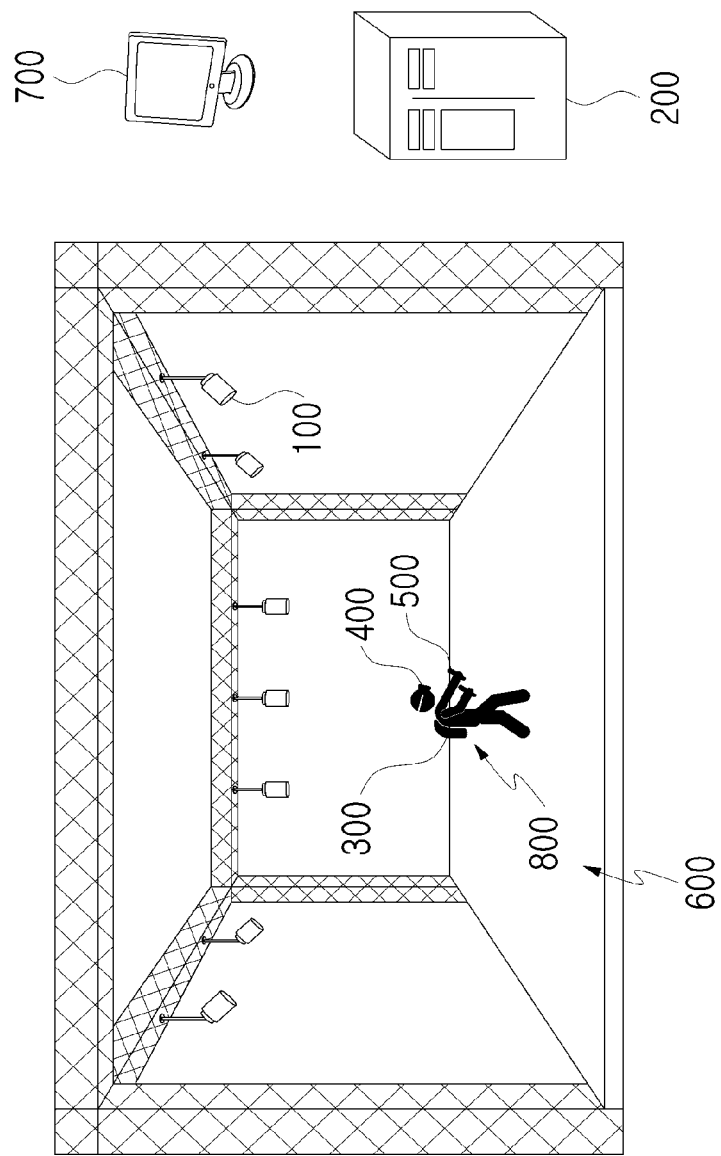
FIG. 6 is a diagram illustrating an implementation example of a virtual reality control system (10) according to one embodiment.

FIG. 6 is a diagram illustrating an implementation example of a virtual reality control system 10 according to one embodiment.

Referring to FIG. 6, the virtual reality control system 10 may provide at least one user 800 with a tracking area 600 for a virtual experience.

In addition, in the tracking area 600, the user 800 may be provided with at least one of an auxiliary computing device 300, a wearable display device 400, and an input device 500.

In addition, a target object to be provided to the user 800 may be provided with a marker M.

For example, when target objects are the wearable display device 400 and the input device 500, the wearable display device 400 and the input device 500 may be provided with markers M in different patterns.

A pattern in which the marker M is provided will be described below.

In addition, the tracking area 600 may be provided with at least one detecting device 100.

For example, as shown in FIG. 6, the tracking area 600 may be provided with a plurality of detecting devices 100.

The detecting devices 100 may be provided to be spaced apart from each other at predetermined intervals around the periphery of the tracking area 600.

In addition, the detecting devices 100 may be provided to be spaced apart from each other at a predetermined height from the ground.

In addition, the detecting devices 100 may be provided to be oriented toward the tracking area 600.

The detecting devices 100 may be fixedly installed on a pre-installed frame.

For example, as shown in FIG. 6, a frame for installing the detecting devices 100 may be provided around the tracking area 600. In addition, the detecting devices 100 may be fixedly installed on the frame.

The detecting devices 100 may acquire detecting data related to the tracking area 600.

A sensor 120 included in the detecting device 100 may acquire detecting data related to at least a part of the tracking area 600.

The detecting device 100 may provide the detecting data to a server 200 or an auxiliary computing device 300.

For example, the detecting device 100 may provide the detecting data acquired by the sensor 120 to the server 200.

The server 200 may acquire real-time position data of the target object on the basis of the detecting data.

As shown in FIG. 6, when the plurality of detecting devices 100 are provided in the tracking area 600, the server 200 or the auxiliary computing device 300 may acquire detecting data from the plurality of detecting devices 100, and acquire the current position data of the target object on the basis of the acquired detecting data.

In addition, the server 200 or the auxiliary computing device 300 may acquire virtual position data of at least one target object on the basis of position data of target objects.

For example, the auxiliary computing device 300 may acquire coordinates in the virtual reality corresponding to coordinates included in position data of the user 800 in the real world as virtual position data of a character in the virtual reality corresponding to the user 800.

The server 200 may provide at least one of the position data and the virtual position data of the target object to the auxiliary computing device 300.

The auxiliary computing device 300 may calculate the virtual position data on the basis of the acquired position data.

In addition, the auxiliary computing device 300 may acquire a virtual environment image on the basis of the virtual position data.

For example, a virtual environment necessary for a virtual experience is constructed by a program or application stored in the auxiliary computing storage 320 and the auxiliary computing device 300 may acquire a virtual environment image area from the virtual environment on the basis of the acquired virtual position data. The auxiliary computing device 300 may acquire a virtual environment image related to the virtual environment image area.

The auxiliary computing device 300 may provide the virtual environment image to the wearable display device 400.

The wearable display device 400 may output the virtual environment image to the user 800.

In addition, the server 200 may provide the virtual environment image to a monitoring display device 700.

The server 200 may provide the virtual environment image acquired from the auxiliary computing device 300 to the connected monitoring display device 700.

In addition, when the server 200 is connected to a plurality of auxiliary computing devices 300, the server 200 may acquire a virtual environment image from at least one auxiliary computing device 300 among the plurality of auxiliary computing devices 300 and provide the acquired virtual environment image to the connected monitoring display device 700.

For example, the server 200 may obtain selection of auxiliary computing devices 300 from which the virtual environment image is to be acquired from among the auxiliary computing devices 300 connected to the server 200 through the server inputter 230, and may provide the virtual environment image acquired from the selected auxiliary computing device 300 to the monitoring display device 700.

In addition, the server 200 may acquire the virtual position data from the auxiliary computing device 300 and acquire a virtual environment image on the basis of the acquired virtual position data and a pre-set position of a virtual camera in the virtual environment.

In addition, the server 200 may provide the acquired virtual environment image to the connected monitoring display device 700.

The monitoring display device 700 may output the virtual environment image acquired from the server 200.

In addition, the input device 500 may be provided to be connected to at least one of the server 200, the auxiliary computing device 300, and the wearable display device 400.

In addition, the input device 500 may be provided with at least one marker M.

The input device 500 may be provided such that each user 800 carries the input device 500.

For example, the user 800 may carry the input device 500 in his/her hand.

According to one embodiment, the server 200 may acquire position data of the input device 500 on the basis of the detecting data acquired from the detecting device 100. In addition, the reality position data of the input device 500 may include at least one of position data or orientation direction data of the input device 500 in the tracking area 600.

The auxiliary computing device 300 may determine an orientation direction of a virtual object corresponding to the input device 500 in the virtual environment on the basis of the position data of the input device 500.

In addition, the auxiliary computing device 300 may acquire a virtual image in which the orientation direction of the virtual object corresponding to the input device 500 in the virtual environment is taken into consideration.

For example, the auxiliary computing device 300 may acquire a virtual image in which a gun corresponding to the input device 500 is oriented in a direction corresponding to an orientation direction of the input device 500 in the virtual environment.

In addition, the auxiliary computing device 300 may acquire a virtual image in which the generation of an event in accordance with an event generation command of the user 800 through the input device 500 in the virtual environment is taken into consideration.

For example, when the user 800 presses a switch provided to the input device 500, the auxiliary computing device 300 may acquire a virtual image showing that a character corresponding to the user 800 fires a gun in the virtual environment.

Figure 7:
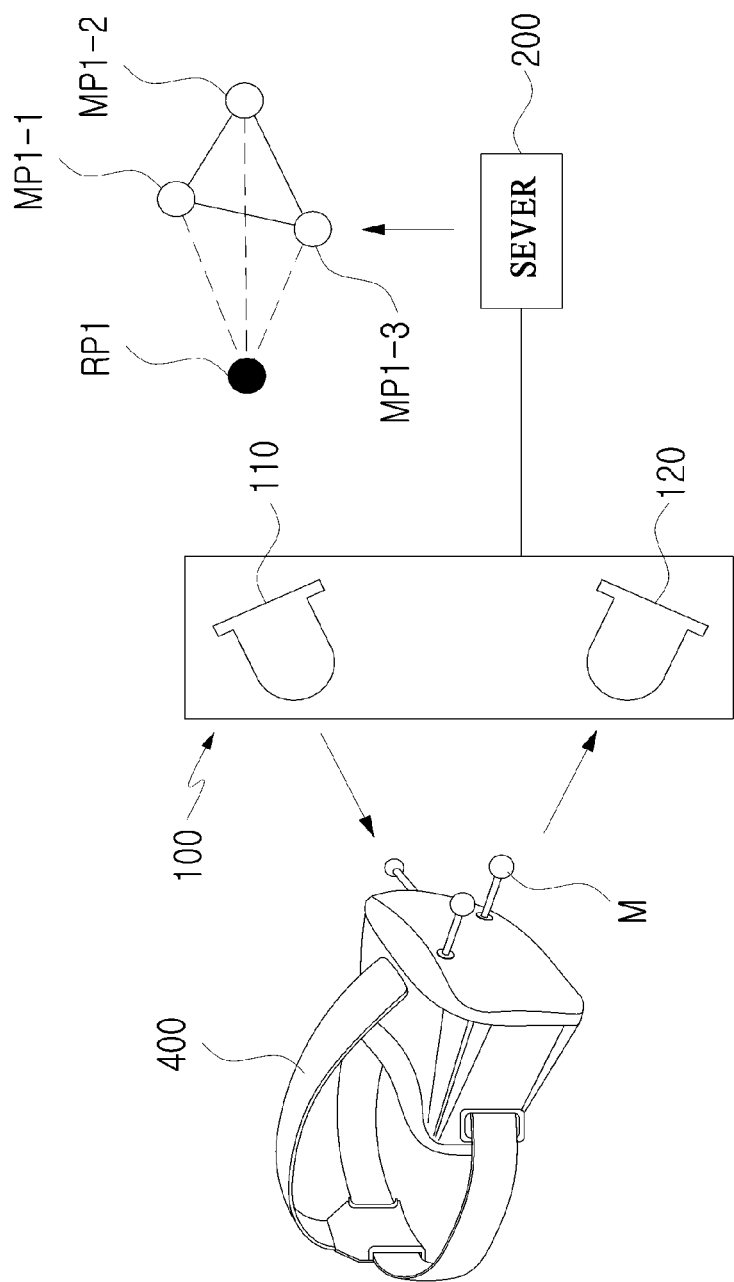
FIG. 7 is a schematic diagram illustrating a method of tracking a target object according to one embodiment.

FIG. 7 is a schematic diagram illustrating a method of tracking a target object according to one embodiment.

Referring to FIG. 7, the method of tracking a target object may acquire data related to the target object using an externally provided sensor and determine a position of the target object on the basis of the acquired data related to the target object.

Hereinafter, an example in which the target object is a wearable display device 400 will be described with reference to FIG. 7.

Referring to FIG. 7, the target object may be provided with a marker M for identifying the target object.

The marker M may be provided on the target object and serve as a reference for identifying and tracking the target object.

In order to track a target object, it is necessary to distinguish between the target object and other devices, and it may be possible to identify the target object by providing a marker M to the target object.

In addition, when a plurality of target objects are provided, it is necessary to identify each of the target objects, and to this end, a marker provided on one object may be distinguishable from another marker M provided on another object.

For example, a marker M provided on one target object may be provided in a pattern different from that of another marker M provided on another target object.

In addition, the pattern may include various types of patterns, such as a pattern formed by a plurality of marker M provided at different positions, an optical pattern provided to one display panel, and the like.

The pattern may be formed by marker coordinates of the marker M.

For example, three markers M may be tracked by the detecting device 100 so that first marker coordinates MP1-1, second marker coordinates MP1-2, and third marker coordinates MP1-3 may be acquired as detecting data, and the first marker coordinates MP1-1 to the third marker coordinates MP1-3 may form a triangular-shaped pattern.

In addition, the marker M may be provided as a passive marker, which reflects or absorbs an optical signal projected from a light emitter 110, and an active marker, which autonomously emits an optical signal.

For example, the passive marker may include a three-dimensional model with a light reflective material attached thereto, paper on which a recognizable code is printed, reflective tape, and the like.

In addition, the active marker may include an LED module, a radio wave generator, and the like.

According to one embodiment, the target object may be provided with at least one marker M.

For example, when the virtual reality control system 10 tracks a position of only one object, only one marker M may be provided on the target object.

In addition, even when the virtual reality control system 10 tracks a position of only one object, the target object may be provided with a plurality of markers M.

In addition, when the virtual reality control system 10 tracks positions of a plurality of target objects, one target object may be provided with a plurality of markers M forming a pattern in order to identify each of the plurality of target objects.

For example, when target objects whose positions are tracked by the virtual reality control system 10 are a wearable display device 400 and an input device 500, the wearable display device 400 may be provided with a marker M in a first pattern, and the input device 500 may be provided with a marker M in a second pattern.

The first pattern is different from the second pattern, and the first pattern which is detected during the position tracking may be identified as the wearable display device 400, and the second pattern detected may be identified as the input device 500.

In the above description, when a plurality of target objects are provided, the markers M provided on each of the plurality of objects are provided to form a pattern in order to identify each of the plurality of objects. However, the embodiment is not limited thereto, and even when a single target object is provided, markers M provided on the target object may be formed to form a pattern.

In addition, the pattern of the markers M provided on the target object may be used to identify the user 800.

For example, the first pattern may be identified as the wearable display device 400 worn by a first user and the second pattern may be identified as the input device 500 carried by the first user. In addition, a third pattern may be identified as a wearable display device 400 worn by a second user and a fourth pattern may be identified as an input device 500 carried by the second user.

To track the target object, a server 200 may acquire data related to the target object from the detecting device 100 and acquire detecting data related to a position of the target object on the basis of the acquired data. In addition, the server 200 may calculate the position data of the target object on the basis of the detecting data.

A description of a technique by which the detecting device 100 to provide data related to a target object to the server 200 will be given. The light emitter 110 of the detecting device 100 may project a signal to at least a part of the tracking area 600.

For example, when the light emitter 110 is an infrared LED, the light emitter 110 may project an infrared signal to at least a part of the tracking area 600.

In addition, a sensor 120 may provide data acquired from an external source to the server 200.

In one example, when the sensor 120 is a camera, the sensor 120 may provide an image signal acquired from an external source to the server 200.

Although FIG. 7 illustrates only one sensor 120, the embodiment is not limited thereto. As described in FIG. 6, a plurality of sensors 120 may be provided and each of the plurality of sensors 120 may provide acquired data to the server 200.

The server 200 may determine the position of the target object on the basis of the data acquired from the sensor 120.

The server 200 may determine whether the data acquired from the sensor 120 includes data related to a marker M. In addition, when it is determined that the data related to the marker M is included in the data acquired from the sensor 120, the server 200 may identify the target object on the basis of a pattern of the marker M.

For example, when the data acquired from the sensor 120 includes a first pattern, the server 200 may identify the target object as the wearable display device 400.

A plurality of patterns may be present in the data acquired from one sensor 120, and the server 200 may identify the plurality of patterns.

The patterns may be pre-stored in the server 200, and when the pre-stored pattern is present in the acquired data, the server 200 may determine that the corresponding pattern is present and may identify a target object corresponding to the pattern.

The server 200 may determine the position of the target object on the basis of the data acquired from the sensor 120.

Meanwhile, a representative point RP related to each of the pre-stored patterns may be set in the server 200.

The representative point RP may be a point that represents a pattern.

The presentative point RP may be present outside of the pattern.

For example, the representative point RP may be set to a point spaced a predetermined distance from a plane formed by first marker coordinates MK1-1, second marker coordinates MK1-2, and third marker coordinates MK1-3.

When a pattern based on a plurality of markers M is provided, coordinate data related to the plurality of markers M included in the pattern may be acquired and the server 200 may acquire a representative point RP representing the pattern as the position data of the target object to which the pattern is provided.

Therefore, the server 200 may acquire the position data of the target object, thereby being capable of tracking the target object.

The method of tracking a position of a target object is not limited to the above examples, and various types of methods of tracking a position may be used according to selection.

According to one embodiment, when the sensor 120 is provided as an image sensor, the sensor 120 may acquire an external image and acquire position data related to the target object on the basis of the acquired image.

In one example, when the sensor 120 shown in FIG. 7 is provided to the wearable display device 400, the sensor 120 may be provided on one side of the wearable display device 400 and be oriented in an outward direction from the inside of the wearable display device 400 to acquire image data related to the outside of the wearable display device 400.

In addition, the wearable display device 400 may provide the acquired image data to the auxiliary computing device 300.

According to one embodiment, the wearable display device 400 may provide the image data to the auxiliary computing device 300 at a predetermined interval.

For example, the wearable display device 400 may provide the image data to the auxiliary computing device 300 at the same interval as that at which the image data is acquired through the sensor 120.

The auxiliary computing device 300 may acquire at least one characteristic point from the acquired image data.

According to one embodiment, the auxiliary computing device 300 may acquire an object included in the image data as the characteristic point.

According to one embodiment, the auxiliary computing device 300 may acquire an object greater than a predetermined size from among objects included in the image data as the characteristic point.

The auxiliary computing device 300 may identify the objects included in the image data and acquire an object greater than a predetermined size from among the identified objects as the characteristic point. In addition, the auxiliary computing device 300 may determine a size of the object on the basis of the number of pixels occupied by the object included in the image data.

According to one embodiment, the auxiliary computing device 300 may acquire a pre-set type of object from among the objects included in the image data as the characteristic point.

For example, when a ball type object is pre-set, the auxiliary computing device 300 may acquire a ball type object, such as a baseball ball, a soccer ball, a basketball ball, or the like, which is included in the image data, as the characteristic point.

According to one embodiment, the auxiliary computing device 300 may acquire a marker included in the image data as the characteristic point.

The auxiliary computing device 300 may identify a marker, such as a barcode, a quick response (QR) code, or the like, which is included in the image data, and acquire the marker as the characteristic point.

In addition, the auxiliary computing device 300 may determine a position of the characteristic point included in the image data.

The auxiliary computing device 300 may determine at least one of a position change and a size change of the characteristic point on the basis of the image data acquired from the wearable display device 400.

The auxiliary computing device 300 may determine a moving direction and a moving distance of the wearable display device 400 on the basis of a position change direction, a position variation, and a size variation of the characteristic point.

For example, the auxiliary computing device 300 may determine a position change of the characteristic point on the basis of image data acquired from the wearable display device 400.

The auxiliary computing device 300 may determine a moving direction and a moving distance of the wearable display device 400.

The auxiliary computing device 300 may determine a moving direction and a moving distance of the wearable display device 400 on the basis of a position change direction, a position variation, and a size variation of the characteristic point.

For example, the auxiliary computing device 300 may compare a position of a characteristic point included in first image data acquired at a first point in time with a position of a characteristic point included in second image data acquired at a second point in time that is later than the first point in time, and when the comparison shows that the characteristic point in the first image data is moved to the right in the second image data, may determine that the wearable display device 400 is moved to the left.

In addition, the auxiliary computing device 300 may determine a moving distance of the characteristic point when the position of the characteristic point is changed.

The auxiliary computing device may determine a moving distance of the characteristic point on the basis of the number of pixels between the position of the characteristic point in the first image data and the position of the characteristic point in the second image data.

Alternatively, the auxiliary computing device 300 may determine a moving distance of the characteristic point on the basis of coordinates of the characteristic point in the first image data and coordinates of the characteristic point in the second image data.

Also, for example, the auxiliary computing device 300 may determine a moving direction and a moving distance of the wearable display device on the basis of the size variation.

The auxiliary computing device 300 may compare a size of a characteristic point included in the first image data acquired at the first point in time with a size of a characteristic point included in the second image data acquired at the second point in time that is later than the first point in time, and when the comparison shows that the position of the characteristic point in the first image data is moved to the right in the second image data, may determine that the wearable display device 400 is moved to the left.

Accordingly, the auxiliary computing device 300 may track the position of the target object on the basis of a change in position of the target object relative to a pre-set initial position.

Figure 8:
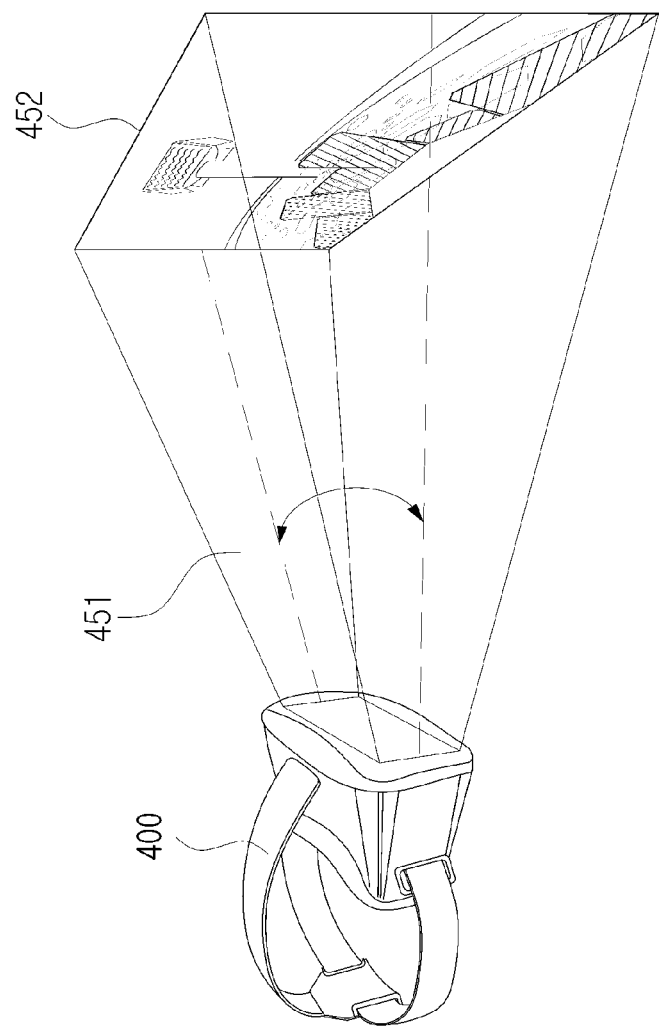
FIG. 8 is a diagram illustrating an example of outputting a virtual environment image through a wearable display device according to one embodiment.

FIG. 8 is a diagram illustrating an example of outputting a virtual environment image 452 through a wearable display device according to one embodiment.

Referring to FIG. 8, a virtual reality control system 10 may provide a virtual environment image 452 related to at least a part of a virtual environment to a user 800 through a wearable display device 400.

The virtual environment may include the background, terrain, a virtual object, a character, and the like.

For example, the virtual environment may be provided with a character corresponding to the user 800.

In another example, the virtual environment may be provided with a virtual object, such as a hand or a gun, which corresponds to an input device 500 carried by the user 800.

In another example, the virtual object may include an object that is implemented in the virtual environment and may be used by the user 800 during a virtual experience.

The terrain may be provided at a preset position in the virtual environment.

In addition, the terrain may include an accessible area to which a character is movable or is able to move into and an inaccessible area to which the character is not allowed to move into.

The terrain will be further described below.

In addition, the character may include a non-player character (NPC) and a user character provided by an application or program pre-stored in the auxiliary computing device 300.

For the virtual environment, position data of the character or the object may be represented as virtual position data.

Meanwhile, the position data in reality may include at least one of position coordinates and orientation direction of a target object.

For example, the position data may be position coordinates of the target object located in a tracking area 600.

A server 200 may pre-store a coordinate value related to the tracking area 600.

The server 200 may pre-store a coordinate system related to the tracking area 600. The coordinate system may be at least one of a plane coordinate system, an orthogonal coordinate system, a polar coordinate system, a spatial coordinate system, a cylindrical coordinate system, and a spherical coordinate system.

The server 200 may acquire a coordinate value of the target object in the tracking area 600 on the basis of detecting data and the coordinate system related to the tracking area 600. In addition, the server 200 may acquire the acquired coordinate value of the target object in the tracking area 600 as position data.

In one example, when the detecting data is an infrared image, the server 200 may acquire a coordinate value of the marker in the tracking area 600 on the basis of a position of the marker corresponding to the target object in the infrared image and an installation position of the detecting device 100 that has provided the infrared image. In addition, the server 200 may determine a pattern formed by the marker on the basis of the coordinate value of the marker in the tracking area 600 and identify a target object corresponding to the pattern formed by the marker. In addition, the server 200 may acquire a representative point RP of the target object on the basis of the pattern formed by the marker and the coordinate value of the marker in the tracking area 600, and acquire a coordinate value of the representative point RP of the target object as position data of the target object.

The server 200 may provide the position data to the auxiliary computing device 300.

The auxiliary computing device 300 may pre-store a coordinate value related to a virtual environment.

The auxiliary computing device 300 may pre-store a coordinate system related to the virtual environment. The coordinate system may be at least one of a plane coordinate system, an orthogonal coordinate system, a polar coordinate system, a spatial coordinate system, a cylindrical coordinate system, and a spherical coordinate system.

The auxiliary computing device 300 may acquire a coordinate value of a target object in the virtual environment on the basis of the position data and the coordinate system related to the virtual environment.

For example, the auxiliary computing device 300 may acquire a coordinate value in the virtual environment corresponding to a coordinate value included in the reality position data and acquire the acquired coordinate value in the virtual environment as virtual position data.

The auxiliary computing device 300 may acquire the virtual environment image 452 to be output to the user 800 on the basis of the virtual position data.

According to one embodiment, the auxiliary computing device 300 may acquire virtual position data of the wearable display device 400 as virtual position data of a virtual camera and acquire a field of view 451 of the virtual camera on the basis of the virtual position data of the virtual camera and an orientation direction of the virtual camera.

The auxiliary computing device 300 may acquire the orientation direction of the virtual camera on the basis of an orientation direction included in the position data of the wearable display device 400.

In addition, the auxiliary computing device 300 may acquire a predetermined area in the orientation direction of the virtual camera as the field of view 451 of the virtual camera.

Meanwhile, the field of view 451 of the virtual camera may be acquired on the basis of specific virtual position data in the virtual environment, as well as the virtual position data of the wearable display device 400.

In addition, the auxiliary computing device 300 may acquire the virtual environment image 452 corresponding to the field of view 451 of the virtual camera in the virtual environment.

The auxiliary computing device 300 may provide the virtual environment image 452 to the wearable display device 400.

The wearable display device 400 may output the acquired virtual environment image 452 to the user 800 through the wearable display screen outputter 450.

Hereinafter, a method by which a virtual reality control system 10 according to one embodiment of the present invention provides a user 800 with survival content as part of virtual experience will be described with reference to FIGS. 9 and 10.

Figure 9:
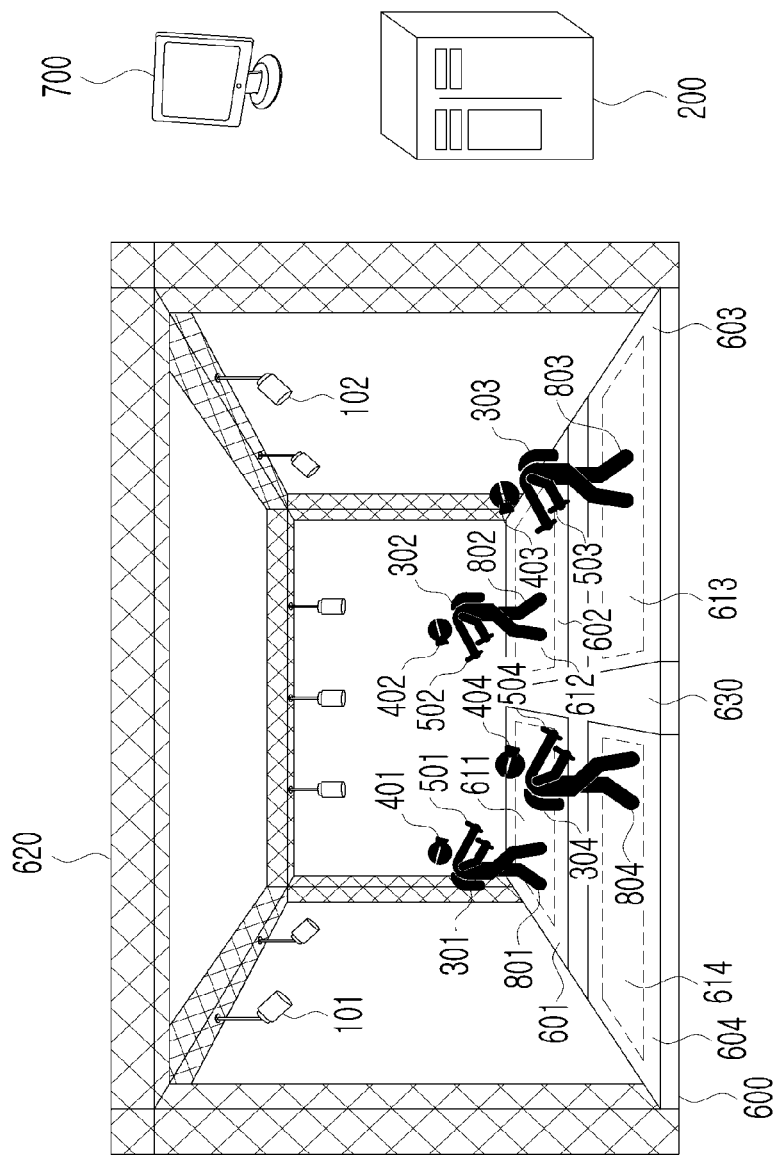
FIG. 9 is a diagram illustrating an example of a virtual reality control system for providing a virtual experience to a user according to one embodiment.

FIG. 9 is a diagram illustrating a virtual reality control system 10 for providing the virtual experience to a user 800 according to one embodiment.

Referring to FIG. 9, the virtual reality control system 10 may include a detecting device 100, a server 200, an auxiliary computing device 300, a wearable display device 400, an input device 500, a structure 620, and a monitoring display 700.

The virtual reality control system 10 may provide a virtual experience to at least one user 800.

The user 800 may include a first user 801, a second user 802, a third user 803, and a fourth user 804.

The structure 620 may provide a space for a virtual experience of the user 800.

The structure 620 may include a plurality of columns.

The structure 620 may be composed of a plurality of trusses.

The structure 620 may support the detecting device 100.

For example, the structure 620 may provide a column-shaped space having a polygonal or circular bottom surface.

The wearable display device 400 may provide a virtual reality image or a virtual reality video to the user 800.

The wearable display device 400 may include a first wearable display device 401, a second wearable display device 402, a third wearable display device 403, and a fourth wearable display device 404.

The first wearable display device 401 to the fourth wearable display device 404 may be worn by the first user 801 to the fourth user 804, respectively, and provide the virtual reality image or the virtual reality video.

The first wearable display device 401 to the fourth wearable display device 404 may be distinguished from each other by attaching markers M thereto in different patterns so that the detecting device 100 may track positions of each wearable display device.

In one embodiment, markers M in a triangular pattern having sides of different lengths or different interior angles may be attached to each of the first wearable display device 401 to the fourth wearable display device 404.

The auxiliary computing device 300 may control the wearable display device 400 by executing a program or an application.

The auxiliary computing device 300 may acquire position data from the server 200 and uses the position data.

In one embodiment, the auxiliary computing device 300 may calculate virtual position data on the basis of position data of the user 800 and output an image related to virtual reality to the wearable display device 400 on the basis of the virtual position data.

The auxiliary computing device 300 may include a first auxiliary computing device 301, a second auxiliary computing device 302, a third auxiliary computing device 303, and a fourth auxiliary computing device 304.

The auxiliary computing device 300 may be provided in the form that may be carried by the user 800 or in the form that is provided in a separate place outside of the structure 620 according to a method of communicating with the server 200 or the wearable display device 400.

For example, the auxiliary computing device 300 may be provided in the form of a backpack personal computer (PC) wearable by the user 800.

Alternatively, the auxiliary computing device 300 may be provided in the form that is embedded in the wearable display device 400.

The first auxiliary computing device 301 to the fourth auxiliary computing device 304 may control, respectively, the first wearable display device 401 to the fourth wearable display device 404 by executing a program or an application.

The input device 500 may receive an input of the user 800 and transmit an input signal to the auxiliary computing device 300.

For example, the input device 500 may include at least one button, and when the button is pressed by the user 800, may transmit an input signal to the auxiliary computing device 300.

In addition, the input signal may be transmitted to the auxiliary computing device 300 on the basis of movement of the input device 500.

For example, when the input device 500 moves along a predetermined trajectory, the input signal may be transmitted from the input device 500 to the auxiliary computing device 300.

Meanwhile, the input device 500 may transmit the input signal to the server 200.

The input device 500 may include a first input device 501, a second input device 502, a third input device 503, and a fourth input device 504.

The first input device 501 to the fourth input device 504 may be provided as one or more gripping devices so that the first user 801 to the fourth user 804 can carry them in one hand or both hands.

The first input device 501 to the fourth input device 504 may be distinguished by attaching markers M thereto in different patterns so that the detecting device 100 may track positions of each input device.

In one embodiment, each of the first input device 501 to the fourth input device 504 may have markers M attached thereto in a triangular pattern having sides of different lengths or different interior angles.

Meanwhile, the patterns of the markers attached to the first wearable display device 401 to the fourth wearable display device 404 and the patterns of the markers attached to the first input device 501 to the fourth input device 504 may be different from each other.

The server 200 may acquire detecting data from the detecting device 100, calculate position data or virtual position data of the user 800, and transmit the position data or the virtual position data to the auxiliary computing device 300.

The server 200 may be attached to the structure 620 or be located outside of the structure 620.

Meanwhile, the server 200 may substitute for the function of the auxiliary computing device 300.

For example, the server 200 may calculate the position data or virtual position data of the user 800 from the acquired detecting data and control the wearable display device 400 by executing a program or application that reflects the position data or the virtual position data.

The server 200 may output the same or different virtual reality images to the first wearable display device 401 to the fourth wearable display device 404 by executing a program or an application.

The detecting device 100 may transmit, to the server 200 or the auxiliary computing device 300, the detecting data acquired by tracking a position of a target object, such as the wearable display device 400, the input device 500, or the user 800.

The detecting device 100 may be attached to the structure 620 and be positioned to be spaced a predetermined distance from the user 800.

An area in which a motion of the user 800 can be tracked may be increased in proportion to the distance from the user 800 to the detecting device 100.

The detecting device 100 may include a first detecting device 101 and a second detecting device 102.

The virtual reality control system 10 may include a tracking area 600 in which the detecting device 100 may track a target object, such as the wearable display device 400, the input device 500, or the user 800.

The tracking area 600 may be defined by the structure 620. The tracking area 600 may be an area corresponding to an area in which the structure 620 is installed.

In the tracking area 600, a light signal may be emitted from a light emitter 110 and a sensor 120 may receive the light signal from the tracking area 600, and outside of the tracking area 600, the light signal may not be emitted from the light emitter 110 or the sensor 120 may not receive the light signal.

In addition, when the user 800 is positioned within the tracking area 600, an image related to the virtual reality may be output to the wearable display device 400 by the auxiliary computing device 300.

Meanwhile, when the user 800 is positioned outside of the tracking area 600, the auxiliary computing device 300 may induce the user 800 to move to the tracking area 600 by controlling the wearable display device 400.

The tracking area 600 may include a first tracking area 601, a second tracking area 602, a third tracking area 603, and a fourth tracking area 604.

The first tracking area 601 to the fourth tracking area 604 may be provided in a rectangular parallelepiped shape and may be positioned to be attached to each other or spaced apart from each other.

The first user 801 to the fourth user 804 may be positioned in the first tracking area 601 to the fourth tracking area 604.

Meanwhile, the virtual reality control system 10 may further include a border area to divide the first tracking area 610 to the fourth tracking area 604.

The border area 630 may be positioned between the first tracking area 601 and the second tracking area 602, the border area 630 may be positioned between the second tracking area 602 and the third tracking area 603, the border area 630 may be positioned between the third tracking area 603 and the fourth tracking area 604, and the border area 630 may be positioned between the first tracking area 601 and the fourth tracking area 604.

The border area 630 may be provided in a cross shape to divide the real space into the first tracking area 601 to the fourth tracking area 604.

The tracking area 600 may include a recommended movement area in which the detecting device 100 easily tracks the user 800 and the user 800 can be protected from an internal or external collision.

The recommended movement area may have a size smaller than or equal to the size of the tracking area 600.

The recommended movement area may be an area in which the movement of the wearable display device 400, the input device 500, or the user 800 may be tracked by the detecting device 100 at a relatively high accuracy.

The recommended movement area may include a first recommended movement area 611, a second recommended movement area 612, a third recommended movement area 613, and a fourth recommended movement area 614.

The first tracking area 601 to the fourth tracking area 604 may include the first recommended movement area 611 to the fourth recommended movement area 614, respectively.

The first recommended movement area 611 to the fourth recommended movement area 614 may be set to prevent the first user 801 to the fourth user 804 from colliding with each other when the first user 801 to the fourth user 804 are located in the first recommended movement area 611 to the fourth recommended movement area 614, respectively.

Meanwhile, the virtual reality control system 10 may further include a monitoring display device 700 to monitor a virtual experience process of the user 800.

The monitoring display device 700 may receive the virtual reality image from the server 200 or the auxiliary computing device 300 and output a field of view of a virtual camera in the virtual reality.

For example, the monitoring display device 700 installed on the structure 620 may be connected to the server 200 via a wired or wireless communication and receive an image output to a server display 250 from the server 200 or an image output to at least one of the first wearable display device 401 to the fourth wearable display device 404 and output the received image.

Figure 10:
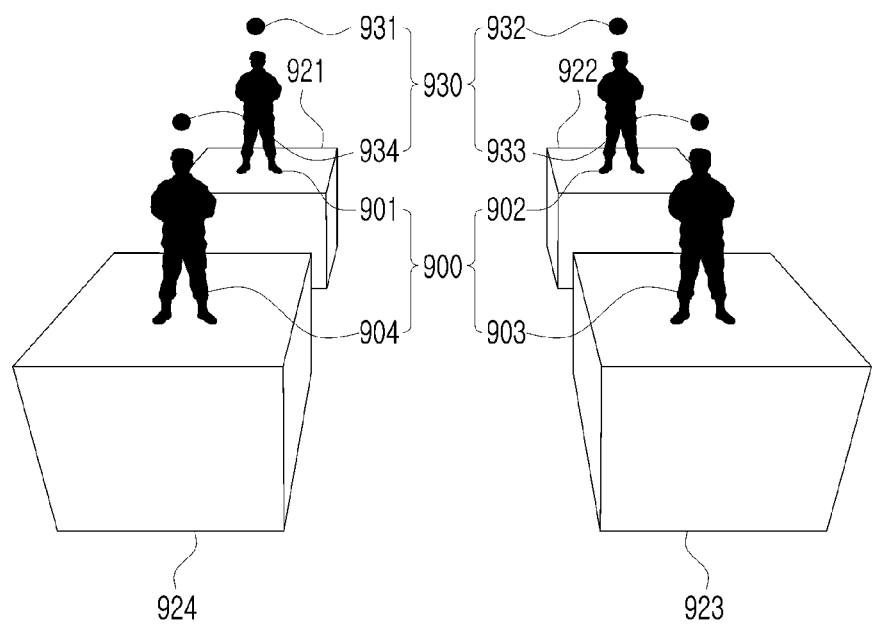
FIG. 10 is a diagram illustrating a tutorial virtual space according to one embodiment.

FIG. 10 is a diagram illustrating a tutorial virtual space 20 according to one embodiment.

Referring to FIG. 10, a tutorial virtual space 20 may be provided to a user 800 through a wearable display device 400.

The tutorial virtual space 20 may be provided to the user 800 by the virtual reality control system 10.

The tutorial virtual space 20 may be a virtual space constructed when a program or an application is executed in an auxiliary computing device 300.

The tutorial virtual space 20 may include a character 900, representative virtual position data 930, and a tutorial area.

The character 900 may be positioned in the tutorial area.

The character 900 may include a first character 901, a second character 902, a third character 903, and a fourth character 904.

The character 900 may move in accordance with movement of the user 800 in the tutorial virtual space 20.

The character 900 may move according to the change in virtual position data calculated on the basis of position data that changes according to the movement of the user 800.

The virtual position data may be data related to a virtual position in virtual reality corresponding to a position of a target object, such as the wearable display device 400, an input device 500, or the user 800, in the real world.

The virtual position data may be calculated based on the position data related to the target object.

Alternatively, the virtual position data may be calculated based on position data of a marker M attached to the target object.

The auxiliary computing device 300 may generate a virtual object corresponding to each target object in a virtual space on the basis of the virtual position data.

For example, the auxiliary computing device 300 may generate the character 900 on the basis of virtual position data of the wearable display device 400 and the input device 500. In this case, a head and a body of the character 900 may be based on the virtual position data of the wearable display device 400 and hand and arm portions of the character 900 may be generated on the basis of the virtual position data of the input device 500.

The wearable display device 400 may output the virtual object generated by the auxiliary computing device 300.

For example, a virtual object corresponding to the input device 500 in the virtual space may be a hand of the character 900 or a basic device carried by the character 900.

The representative virtual position data 930 may be displayed in the tutorial virtual space 20. The representative virtual position data 930 may be one of a plurality of pieces of virtual position data calculated from each target object.

The representative virtual position data 930 may be virtual coordinates that correspond to the topmost of the character 900. The representative virtual position data 930 may be coordinates of the uppermost part in a Z-axis direction of an area occupied by the character 900.

The representative virtual position data 930 may be calculated according to the position data of the wearable display device 400.

The representative virtual position data 930 may be data on a position spaced a predetermined distance from the wearable display device 400.

The representative virtual position data 930 may be position data that is spaced apart from the wearable display device 400 in an opposite direction to a field of view and is spaced apart from the wearable display device 400 in a direction away from the ground in the z-axis direction.

Meanwhile, the representative virtual position data 930 may be virtual coordinates that correspond to a representative point RP of the wearable display device 400.

The representative virtual position data 930 may include first representative virtual position data 931, second representative virtual position data 932, third representative virtual position data 933, and fourth representative virtual position data 934.

The first representative virtual position data 931 to the fourth representative virtual position data 934 may be displayed in various shapes, such as a circle, a sphere, a rectangle, and the like, around the first character 901 to the fourth character 904.

Meanwhile, the first representative virtual position data 931 to the fourth representative virtual position data 934 may not be displayed.

The tutorial virtual space 20 may include a tutorial area occupiable by the character 900.

The tutorial area may correspond to the tracking area 600 and may have a size and shape similar to those of the tracking area 600.

The tutorial area may include a first tutorial area 921, a second tutorial area 922, a third tutorial area 923, and a fourth tutorial area 924.

The first tutorial area 921 to the fourth tutorial area 924 may correspond to the first tracking area 601 to the fourth tracking area 604.

The first character 901 to the fourth character 904 may be positioned in the first tutorial area 921 to the fourth tutorial area 924, respectively.

Alternatively, the first representative virtual position data 931 to the fourth representative virtual position data 934 may be positioned in the first tutorial area 921 to the fourth tutorial area 924, respectively.

Before the virtual experience is provided, the first user 801 to the fourth user 804 may be positioned in the first tracking area 601 to the fourth tracking area 604, while carrying, respectively, the first auxiliary computing device 301 to the fourth auxiliary computing device 304, also carrying, respectively, the first input device 501 to the fourth input device 504, and wearing, respectively, the first wearable display device 401 to the fourth wearable display device 404.

Preferably, the first user 801 to the fourth user 804 may be positioned in the first recommended movement area 611 to the fourth recommended movement area 614, respectively.

The first detecting device 101 and the second detecting device 102 may acquire detecting data of the target object, such as the wearable display device 400, the input device 500, or the user 800, in the tracking area 600.

Each of the first detecting device 101 and the second detecting device 102 may include a plurality of cameras.

The server 200 may calculate the position data of the target object, such as the wearable display device 400, the input device 500, or the user 800, on the basis of the detecting data acquired from the first detecting device 101 and the second detecting device 102.

Meanwhile, each of the first detecting device 101 and the second detecting device 102 may acquire detecting data of the target object, such as the wearable display device 400, the input device 500, or the user 800, which is positioned in a different tracking area within the tracking area 600.

For example, the first detecting device 101 may acquire detecting data of the first wearable display device 401, the first input device 501, or the first user 801, which is located in the first tracking area 601.

The first detecting device 101 may include a plurality of cameras and the server 200 may calculate the position data of the first wearable display device 401, the first input device 501, or the first user 801 on the basis of the detecting data acquired from the plurality of cameras included in the first detecting device 101.

In another example, the second detecting device 102 may acquire detecting data of the second wearable display device 402, the second input device 502, or the second user 802, which is located in the second tracking area 602.

The second detecting device 102 may include a plurality of cameras, and the server 200 may calculate the position data of the second wearable display device 402, the second input device 502, or the second user 802 on the basis of the detecting data acquired from the plurality of cameras included in the second detecting device 102.

In another example, the first detecting device 101 may acquire the detecting data by tracking the first user 801 and the fourth user 804 in the first tracking area 601 and the fourth tracking area 604 and the second detecting system 102 may acquire the detecting data by tracking the second user 802 and the third user 803 in the second tracking area 602 and the third tracking area 603.

The server 200 may transmit all or part of the calculated position data of the target object, such as the wearable display device 400, the input device 500, or the user 800, to the first auxiliary computing device 301 to the fourth auxiliary computing device 304.

The first auxiliary computing device 301 to the fourth auxiliary computing device 304 may calculate all or part of the first representative virtual position data 931 to the fourth representative virtual position data 934 on the basis of the position data acquired from the server 200.

The first auxiliary computing device 301 to the fourth auxiliary computing device 304 may generate the first character 901 to the fourth character 904 corresponding to the first user 801 to the fourth user 804 on the basis of the first representative virtual position data 931 to the fourth representative virtual position data 934.

In addition, the first auxiliary computing device 301 to the fourth auxiliary computing device 304 may output an image, in which some or all of the first character 901 to the fourth character 904 are included to the first wearable display device 401 to the fourth wearable display device 404, respectively, by executing a program.

In one embodiment, an image in which the second character 902 to the fourth character 904 are included may be output as a field of view of the first character 901 to the first wearable display device 401.

An image in which some or all of the first character 901 to the fourth character 904 are included may be output to the monitoring display 700.

The virtual reality control system 10 may provide the user 800 with a tutorial on the virtual content through a tutorial virtual space 20.

The auxiliary computing device 300 may provide the user with a field of view of a virtual camera in the tutorial virtual space 20 through the wearable display device 400.

The field of view of the virtual camera may be based on the virtual position data of the wearable display device 400 in the tutorial virtual space 20 or may be a field of view at a specific point in the virtual reality.

In one embodiment, a field of view of the first character 901 within the tutorial virtual space 20 may be output to the first wearable display device 401.

A guidance message or guiding voice regarding a basic motion may be output to the wearable display device 400.

The basic motion may include a motion, such as moving, shooting, sitting, covering, and acquiring an item, which is necessary for experiencing survival content.

The user 800 may become accustomed to the basic motion by moving or manipulating the input device 500 according to the guiding message or the guiding voice.

Hereinafter, a method by which a virtual reality control system 10 provides a survival virtual space 30 to a user will be described with reference to FIG. 11.

Figure 11:
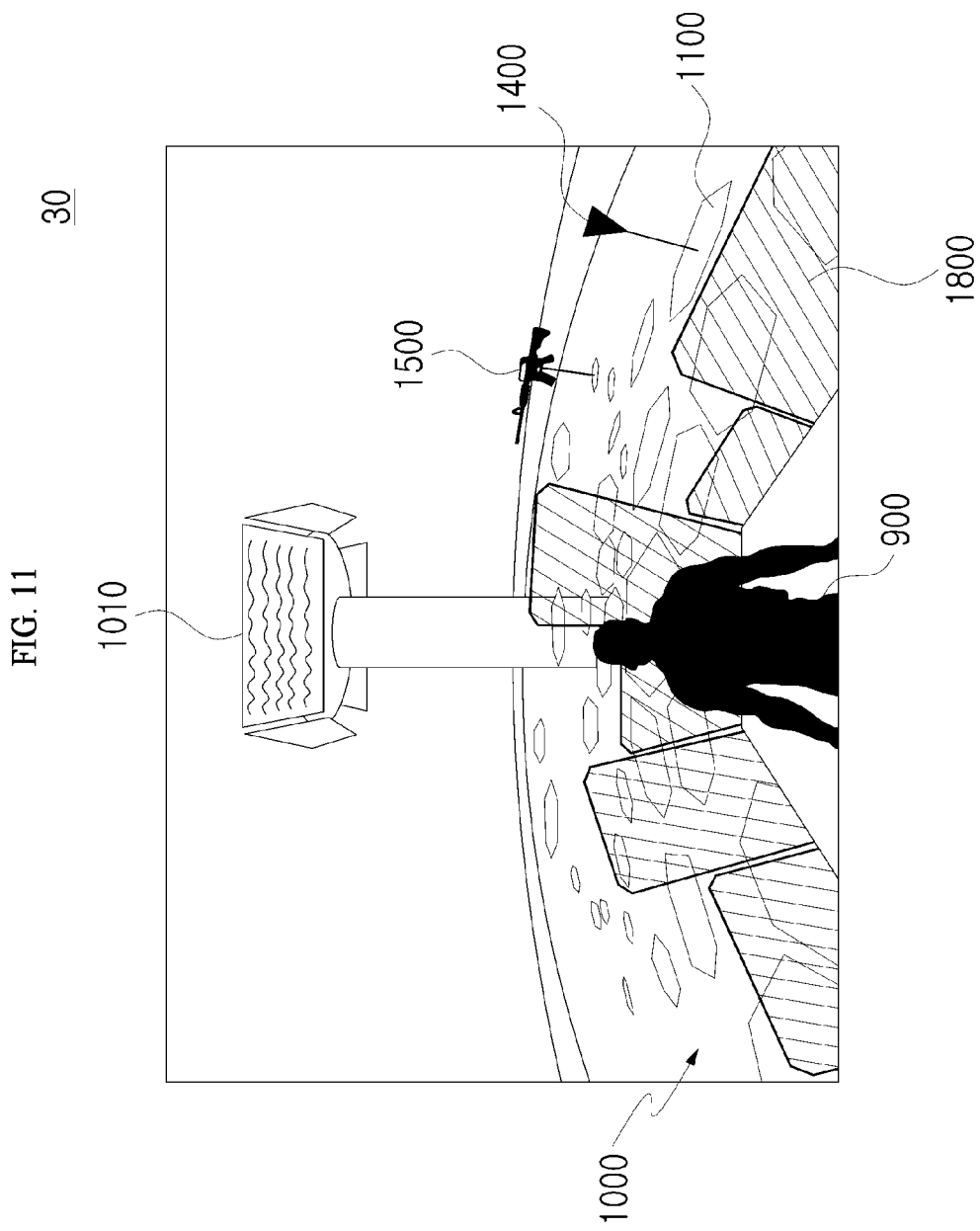
FIG. 11 is a diagram illustrating an example of a survival virtual space output to a wearable display device according to one embodiment.

FIG. 11 is a diagram illustrating a survival virtual space 30 that is output to a wearable display device 400.

When a tutorial is finished, the virtual reality control system 10 may provide the survival virtual space 30 to the user 800.

The survival virtual space 30 may be a virtual space constructed by an auxiliary computing device 300 for a survival experience.

Referring to FIG. 11, the survival virtual space 30 may include a character 900, terrain 1000, an electronic board 1010, an accessible mark 1400, an item 1500, a barrier 1800, and the like.

The character 900 may correspond to the user 800 and may be moved or operated in the survival virtual space 30 according to the movement or manipulation of the user 800.

The terrain 1000 is a part where the character 900 moves in the virtual space or a part where the character 900, the accessible mark 1400, the item 1500, or the barrier 1800 may be located.

The terrain 1000 may be part of a background in the survival virtual space 30.

The electronic board 1010 may show the progress state of the survival content in the survival virtual space 30 so that the user 800 and an audience viewing the survival content through the monitoring display 700 can easily grasp the flow of the survival content.

In one embodiment, the remaining time until the end of the virtual experience, kill and death data of the character 900, score data and rank data, and the like may be displayed on the electronic board 1010.

The electronic board 1010 may be located in the center of the survival virtual space 30 while being connected to the terrain 1000 or independently floating in the air.

The electronic board 1010 may be in a rectangular parallelepiped shape and data on the progress state of the survival content may be displayed on a side thereof.

The accessible mark 1400 may be a mark displayed to assist the character 900 in moving to another area.

The user 800 may move the character 900 to the area having the accessible mark 1400 using the input device 500.

The accessible mark 1400 may be displayed in an area which is relatively close among an accessible area 1100 to which the character 900 can move into or a special area 1310.

The accessible mark 1400 may be connected to the accessible area 1100 in various shapes or be displayed floating above the accessible area 1100.

A detail of a method by which the character 900 moves in the terrain 1000 using the accessible mark 1400 will be described below.

The item 1500 may include tools that the character 900 can use in experiencing the survival content.

In one embodiment, the item 1500 may include a knife, a bow, a grenade, a handgun, a shotgun, a mini gun, a laser gun, a rocket launcher, equipment such as rampage, a first aid box, a recovery capsule, and the like.

The user 800 may manipulate the input device 500 to cause the character 900 to obtain the item 1500.

The barrier 1800 may protect the character 900 from external attacks.

The barrier 1800 may be positioned around the character 900 in the terrain 1000 and may take an attack to the character 900 from the outside in place of the character 900.

The barrier 1800 may have various shapes, such as a polygon, a curved shape, and the like, and have various heights and widths.

Details of the shape and function of the barrier 1800 will be described below.

When the tutorial is finished in the tutorial virtual space 20, the wearable display device 400 may output an image related to the survival virtual space 30.

The auxiliary computing device may output the field of view of the virtual camera in the survival virtual space 30 to the wearable display device 400.

FIG. 11 may illustrate a field of view of a virtual camera located above the character 900 in a state where the character 900 is positioned within the terrain 1000 in the survival virtual space 30.

In this case, the field of view of the virtual camera may be a field of view at a specific position in the survival virtual space 30.

Thus, a field of view when viewed from behind the character 900 may be output to the wearable display device 400 so that the character 900 may be displayed, or a field of view when viewed from the character 900 may be output so that the character 900 may not be displayed.

The user 800 may operate the input device 500 to move the accessible area 1100 in which the accessible mark 1400 is present in the terrain 1000 or to obtain an item 1500 so that the survival content may proceed.

An attack target that the character 900 has to attack may be present in the survival virtual space 30.

When the user 800 defeats the attack target by manipulating the character 900, the user 800 may score a point, and the cumulative scores and the number of instances of defeating the attack target, and the like may be displayed on the electronic board 1010 in real time.

Meanwhile, in a case where a plurality of users 800 play the survival content, a field of view of each of the first character 901 to the fourth character 904 may be output to each of the first wearable display device 401 to the fourth wearable display device 404 that are worn by the first user 801 to the fourth user 804, respectively.

Some or all of the first character 901 to the fourth character 904 may be displayed in the field of view output to each of the first wearable display device 401 to the fourth wearable display device 404.

A detail of a method of proceeding with survival content will be described below.

Figure 12:
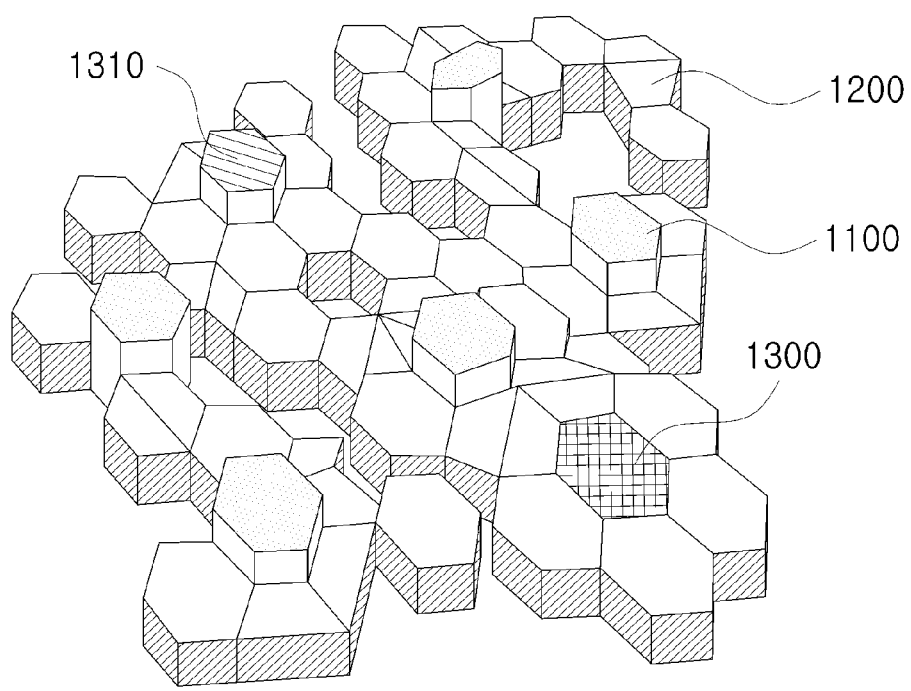
FIG. 12 is a diagram illustrating an example of terrain formed in a survival virtual space according to one embodiment.

FIG. 12 is a diagram illustrating terrain 1000 formed in a survival virtual space 30.

The survival virtual space 30 provided to a user 800 may include terrain 1000 where a character 900 may be located.

Referring to FIG. 12, the terrain 1000 may include an accessible area 1100, an inaccessible area 1200, a respawn area 1300, and a special area 1310.

The accessible area 1100 may be an area where the character 900 may be located or move in the terrain 1000.

The accessible area 1100 may be implemented as a column-shaped block of various heights which has a polygonal or circular bottom surface with various sizes.

The accessible area 1100 may be randomly disposed in some part of the terrain 1000 by the auxiliary computing device 300.

The inaccessible area 1200 may be an area where the character 900 may be located or may not move in the terrain 1000.

The inaccessible area 1200 may be randomly disposed in a part of the terrain 1000 by the auxiliary computing device 300.

The inaccessible area 1200 may be disposed between the accessible areas 1100 that are spaced apart from each other.

The inaccessible area 1200 may be implemented as a column-shaped block of various heights which has a polygonal or circular bottom surface with various sizes.

Alternatively, the inaccessible area 1200 may be implemented as a column-shaped block having a side surface similar to the side surface of the accessible area 1100, the respawn area 1300, or the special area 1310 so as to be attached to the side surface of the accessible area 1100, the respawn area 1300, or the special area 1310.

The respawn area 1300 may be an area where the character 900 is initially positioned when the user 800 is provided with the survival virtual space 30 or an area where the character 900 is positioned when a death event occurs to the character 900 in the progress of the survival content.

The respawn area 1300 may be randomly disposed in a part of the terrain 1000 by the auxiliary computing device 300.

Alternatively, the number of respawn areas 1300 may be determined according to the number of users 800 to which the virtual reality control system 10 is provided or the number of characters 900 present in the survival virtual space 30.

In one embodiment, when only the first character 901 corresponding to the first user 801 is present in the survival virtual space 30, there is one respawn area 1300, and when the first character 901 to the fourth character 904 corresponding to the first user 801 to the fourth user 804 are present in the survival virtual space 30, there may be at least one or more respawn areas 1300.

Alternatively, the first user 801 to the fourth user 804 may form a plurality of teams, and the same respawn area 1300 may be used by each team.

The respawn area 1300 may be implemented as a column-shaped block of various heights which has a polygonal or circular bottom surface with various sizes.

Alternatively, the respawn area 1300 may be formed by assembling a plurality of blocks.

The special area 1310 is an area for generating a special event when the character 900 is positioned thereon.

The special event may be an event set in a program executed by the auxiliary computing device 300 and may include an event necessary for the user 800 to proceed with the survival content, such as an event in which the character 900 floats in the air, an event in which various items are provided, an event in which a special item is provided, or an event in which the physical strength of the character 900 is restored.

The special area 1310 may be randomly disposed in a part of the terrain 1000 by the auxiliary computing device 300.

The special area 1310 may be implemented as a column-shaped block of various heights which has a polygonal or circular bottom surface with various sizes.

The terrain 1000 provided in the survival virtual space 30 may be formed by assembling at least two or more blocks.

Each of the blocks forming the terrain 1000 may be one of the accessible area 1100, the inaccessible area 1200, the respawn area 1300, and the special area 1310.

The accessible area 1100, the inaccessible area 1200, and the special area 1310 may be implemented as blocks having different heights to be distinguished from one another.

The respawn area 1300 may be implemented as a block of a larger size than other areas or may be implemented as a shape in which a plurality of blocks are assembled.

The inaccessible area 1200 may be disposed between the accessible area 1100, the respawn area 1300, and the special area 1310 to connect each area, thereby constructing the terrain 1000 in the survival virtual space 30.

The accessible area 1100, the inaccessible area 1200, the respawn area 1300, and the special area 1310 may be distinguished by different sizes and shapes and also by different colors.

Meanwhile, the terrain 1000 may be implemented in various structures and configurations by the auxiliary computing device 300.

The auxiliary computing device 300 may generate the terrain 1000 of various structures and configurations through a program or application for providing the survival content.

For example, the user 800 may create or modify the terrain 1000 in which the survival content proceeds via an auxiliary computing inputter 330.

In this case, the areas for forming the terrain 1000 may be provided as hexagonal column blocks. The terrain 1000 may be formed by connecting the hexagonal column blocks having properties that allow or do not allow the character 900 to move thereto and the hexagonal column blocks having properties with special functions.

In addition, the terrain 1000 may be modified by adding or removing the hexagonal column blocks having the above-described properties to or from the existing terrain 1000.

The areas that constitute the terrain 1000 may be provided as blocks which are easy to connect to each other, other than the hexagonal column blocks, and may be provided by combining blocks with different shapes.

The terrain 1000 to be generated may include at least one respawn area 1300, at least two or more accessible areas 1100, and at least one inaccessible area 1200.

As the terrain 1000 is created or modified in various ways, the difficulty of the survival content may be adjusted.

In addition, when the terrain 1000 created or modified by the user 800 forms the survival virtual space 30, an interest of the user 800 in the virtual experience may be increased.

Figure 13:
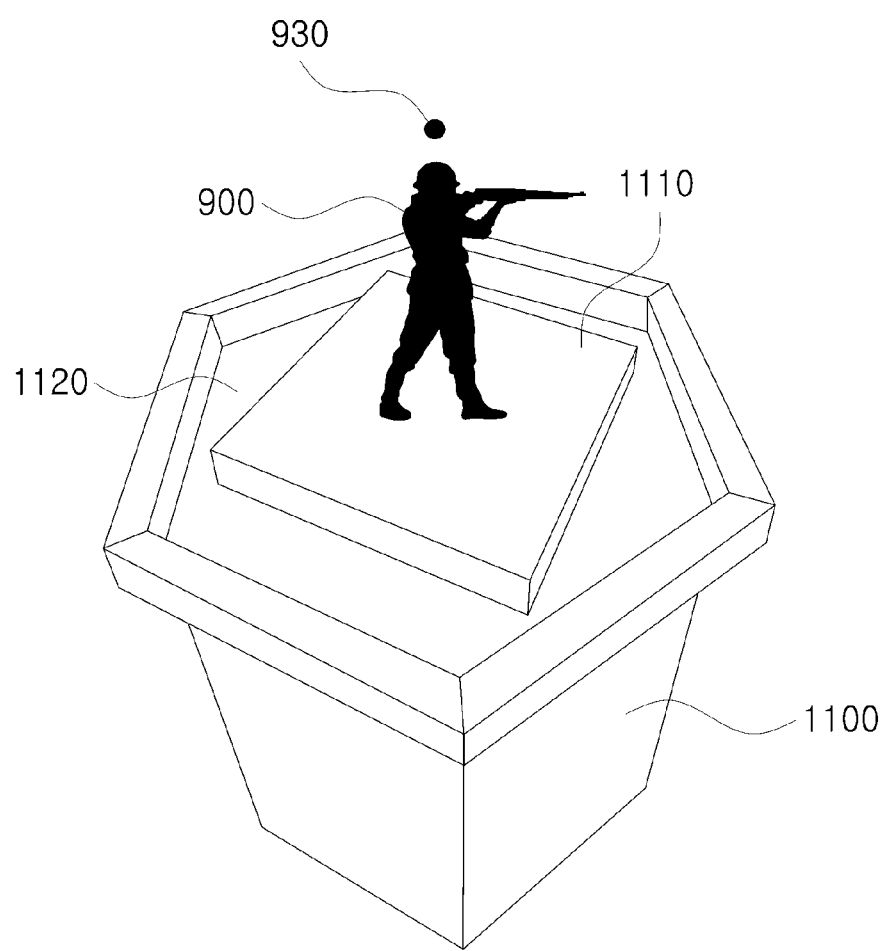
FIG. 13 is a diagram illustrating an example in which a character is positioned in an accessible area according to one embodiment.

FIG. 13 is a diagram illustrating that a character 900 is positioned in an accessible area 1100.

Referring to FIG. 13, the character 900 may be present in the survival virtual space 30 on the basis of representative virtual position data 930, and the accessible area 1100 may include a safety area 1110 and a barrier area 1120.

The character 900 may be implemented as a set of virtual coordinates in the survival virtual space 30.

The set of virtual coordinates implementing the character 900 may be based on the representative virtual position data 930.

A server 200 may calculate position data by processing detecting data acquired from a detecting device 100 and the auxiliary computing device 300 may calculate the representative virtual position data 930 by acquiring and processing the calculated position data.

Thus, the representative virtual position data 930 may be changed in real time according to the movement of a target object in the real world.

In FIG. 13, the representative virtual position data 930 may be virtual coordinates above a head of the character 900.

The accessible area 1100 may correspond to a tracking area 600 in the real world and may have a size and shape similar to those of the tracking area 600.

Alternatively, the accessible area 1100 may have an area smaller than the tracking area 600 and may have a shape different from that of the tracking area 600.

Alternatively, the accessible area 1100 may have an area larger than the tracking area 600 if necessary.

The safety area 1110 may be an area corresponding to a recommended movement area in the real world, may have size and shape similar to those of the recommended movement area, and may be included in the accessible area 1100.

Alternatively, the safety area 1110 may have an area smaller or larger than the recommended movement area if necessary and may be included in the accessible area 1100.

The barrier area 1120 is an area that does not correspond to the safety area 1110 in the accessible area 1100.

In the barrier area 1120, the barrier 1800 may be formed and the barrier 1800 may protect the character 900 from external attacks.

Details of generation of the barrier 1800 and functions and roles of the barrier 1800 will be described below.

The character 900 may move in or get into the accessible area 1100 according to the movement or operation of the user 800.

Meanwhile, the auxiliary computing device 300 may determine whether the character 900 is positioned in the accessible area 1100 on the basis of the representative virtual position data 930.

Further, the auxiliary computing device 300 may determine which area the character 900 is positioned in among the safety area 1110 and the barrier area 1120 on the basis of the representative position data 930.

In the tutorial virtual space 20 or before the virtual experience is provided in the real world, the user 800 may be taught about a range in which the user 800 can move.

The character 900 may leave the accessible area 1100 or the safety area 1110 according to the movement or operation of the user 800.

For example, when the user 800 moves out of the tracking area 600 or the recommended movement area in the real world, the character 900 may leave the accessible area 1100 or the safety area 1110 in the survival virtual space 30.

In this case, the auxiliary computing device 300 or the server 200 may induce the user 800 to be positioned in the tracking area 600 or the recommended movement area by controlling the wearable display device 400 worn by the user 800.

A method of inducing the movement or operation of the user 800 by controlling the wearable display device 400 will be described below.

Hereinafter, a method in which an accessible mark 1400 is displayed in the accessible area 1100 according to a position of the character 900 in the survival virtual space 30 will be described with reference to FIGS. 14 and 15.

Figure 14:
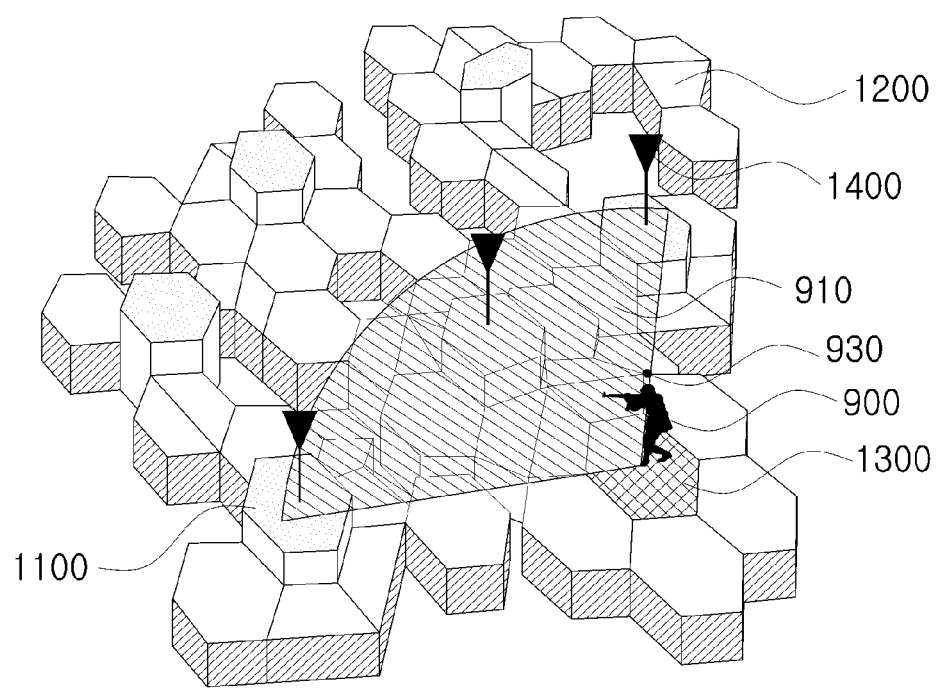
FIG. 14 is a diagram illustrating an example in which an accessible mark is displayed in an accessible area positioned within a movement range of a character when the character is in a respawn area according to one embodiment.

FIG. 14 is a diagram illustrating that an accessible mark 1400 is displayed in an accessible area 1100 positioned within a movement range 910 of a character 900 when the character 900 is in a respawn area 1300.

The accessible mark 1400 may be displayed in the accessible area 1100 or a special area 1310 by a program or application executed by an auxiliary computing device 300.

The accessible mark 1400 may not be displayed in an inaccessible area 1200 and the respawn area 1300.

The accessible mark 1400 may be displayed in a form floating in the center of the accessible area 1100 or the special area 1310.

Meanwhile, the character 900 may have the movement range 910 corresponding to a range in which the character 900 is movable at once.

The movement range 910 may be set by a program or application executed by the auxiliary computing device 300 on the basis of representative virtual position data 930.

For example, the auxiliary computing device 300 may set the movement range 910 within a predetermined distance on the basis of the representative position data 930.

The movement range 910 may or may not be displayed in the wearable display device 400.

The accessible mark 1400 may be displayed in the accessible area 1100 present within the movement range 910 of the character 900.

Meanwhile, the auxiliary computing device 300 may not separately set the movement range 910 and display the accessible mark 1400 in the accessible area 1100.

For example, when there is a virtual connection line connecting the accessible area 1100 and the representative virtual position data 930 and when another accessible area is not present within a predetermined distance from the virtual connection line, the accessible mark 1400 may be displayed in the accessible area 1100.

In another example, the auxiliary computing device 300 may randomly display the accessible mark 1400 in the accessible area 1100 within the terrain 1000 regardless of the representative virtual position data 930.

Figure 15:
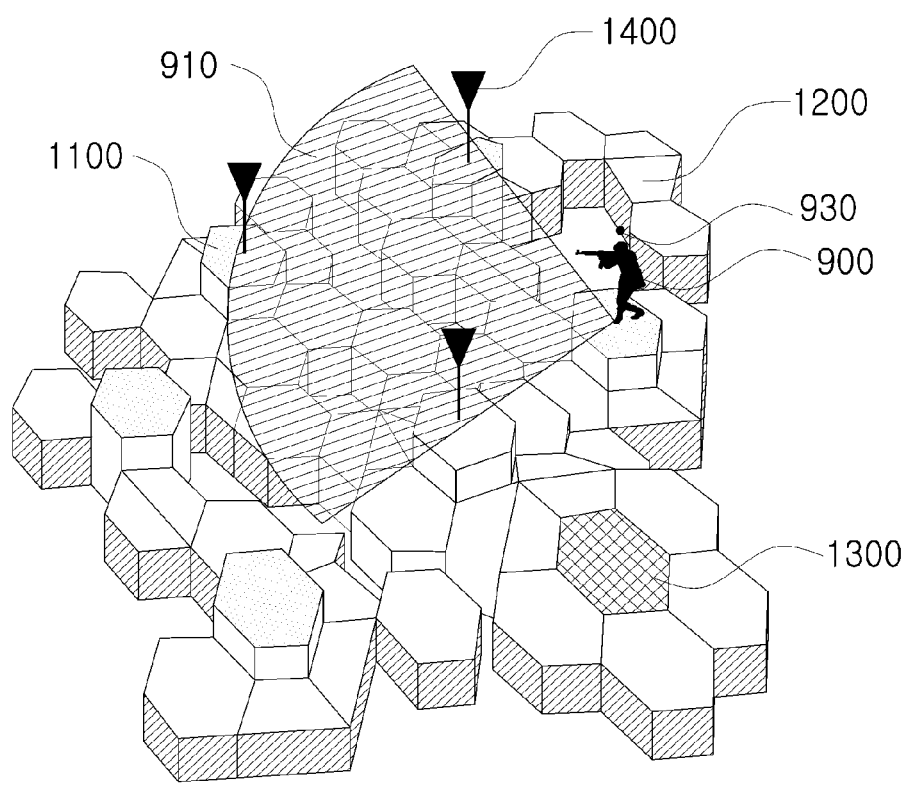
FIG. 15 is a diagram illustrating an accessible mark displayed on the basis of a new virtual position of a character when the character positioned in the respawn area moves to an accessible area according to one embodiment.

FIG. 15 is a diagram illustrating that the accessible mark 1400 is displayed on the basis of new representative virtual position data 930 of the character 900 when the character 900 positioned in the respawn area 1300 in FIG. 14 moves to the accessible area 1100.

When the character 900 moves to the rightmost accessible area 1100 among three accessible areas 1100 in each of which the accessible mark 1400 is displayed in FIG. 14, the accessible mark 1400 may be displayed in the accessible area 1100 positioned within the movement range 910 on the basis of representative virtual position data 930 after the movement, as shown in FIG. 15.

Meanwhile, in FIG. 15, the respawn area 1300 may be positioned within the movement range 910, but the accessible mark 1400 may not be displayed.

Although a process of the movement of the character 900 from the respawn area 1300 to the accessible area 1100 is described herein, the character 900 may move from the currently occupied accessible area to another accessible area. A situation in which the character 900 moves from the currently occupied accessible area to another accessible area will be described with reference to the following drawings.

Hereinafter, a process in which the character 900 in a survival virtual space moves to a movement target area 1105 in which an accessible mark 1400 is displayed will be described with reference to FIGS. 16 to 20.

Figure 16:
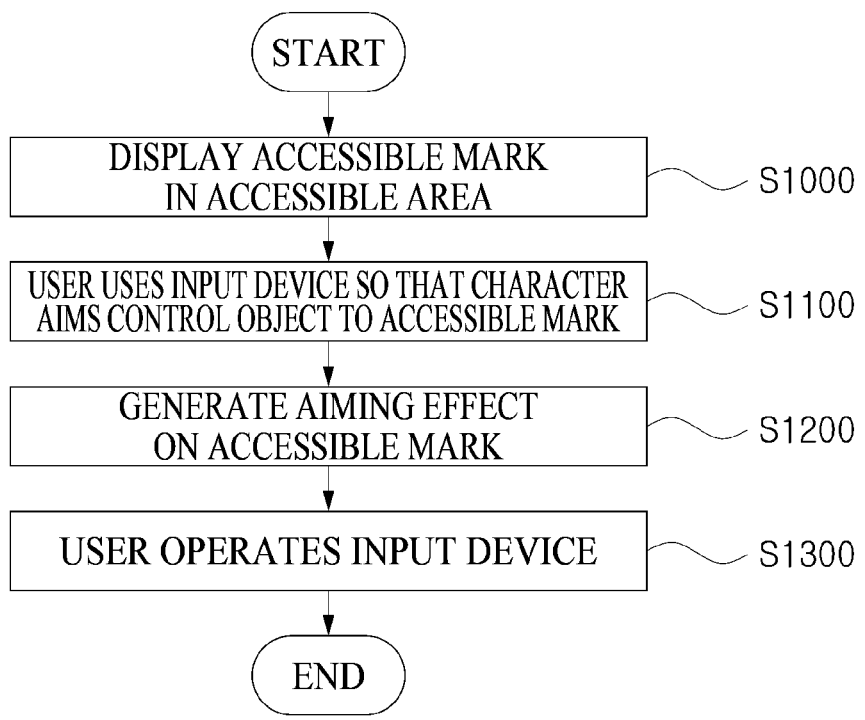
FIG. 16 is a flowchart illustrating a process of movement of a character to a movement target area in the survival virtual space according to one embodiment.

FIG. 16 is a flowchart illustrating a process of movement of the character 900 to a movement target area 1105 in the survival virtual space 30.

Referring to FIG. 16, the movement of the character 900 may be performed through a display stage (S1000) in which an accessible mark 1400 is displayed in a movement target area 1105, a selection stage (S1100) in which the character 900 orients a control object 2000 toward the accessible mark 1400 according to the movement of an input device 500 by the user 800, a loading stage (S1200) in which an aiming effect 1410 is generated in the accessible mark 1400, and an operation stage (S1300) in which the user 800 operates the input device 500.

In the display stage (S1000), the accessible mark 1400 may be displayed in the accessible area 1100 positioned within a movement range 910 according to representative virtual position data 930.

The accessible mark 1400 is displayed so that the user 800 can recognize the accessible area 1100 to which the character can move.

In the selection stage (S1100), the character 900 may aim the control object 2000 in a direction of the movement target area 1105.

In this case, the aiming direction of the control object 2000 may be adjusted by the user 800 using the input device 500.

In the loading stage (S1200), an aiming effect 1410 may be generated in the accessible mark 1400 at which the control object 2000 aims for a predetermined time.

In the operation stage (S1300), the character 900 may move to a desired area by the operation of the input device 500 by the user 800.

FIG. 17 is a diagram illustrating the display stage (S1000) of FIG. 16.

Referring to FIG. 17, there may be an accessible area 1100 in which the character 900 is located and a movement target area 1105 in which the accessible mark 1400 is displayed.

The movement target area 1105 may be an accessible area 1100 in which the accessible mark 1400 is displayed in the movement range 910 of the character 900 according to a method of displaying the accessible mark 1400 in FIGS. 14 and 15.

The movement target area 1105 in which the accessible mark 1400 is displayed may be present within the movement range 910 of the character 900.

The user 800 may check the movement target area 1105 through the wearable display device 400.

Meanwhile, the character 900 may carry the control object 2000.

The control object 2000 may be an object within the survival virtual space which corresponds to the input device 500 carried by the user 800.

A detecting device 100 may track the input device 500 and transmit detecting data to the server 200, the server 200 may calculate position data of the input device 500 and transmit the position data to the auxiliary computing device 300, and the auxiliary computing device 300 may calculate control object virtual position data 2030 that is virtual position data of the input device 500 in the survival virtual space 30 on the basis of the position data of the input device 500, and may implement the control object 2000 on the basis of the control object virtual position data 2030.

The control object 2000 may have various shapes as necessary.

For example, the control object 2000 may be a hand of the character 900 or a basic weapon, such as a knife, a gun, or the like, which is carried by the character 900.

In addition, the control object 2000 may change in shape as the survival content progresses.

For example, when the character 900 obtains an item 1500 in the survival virtual space 30, the control object 2000 may change to a shape of the item 1500.

Figure 18:
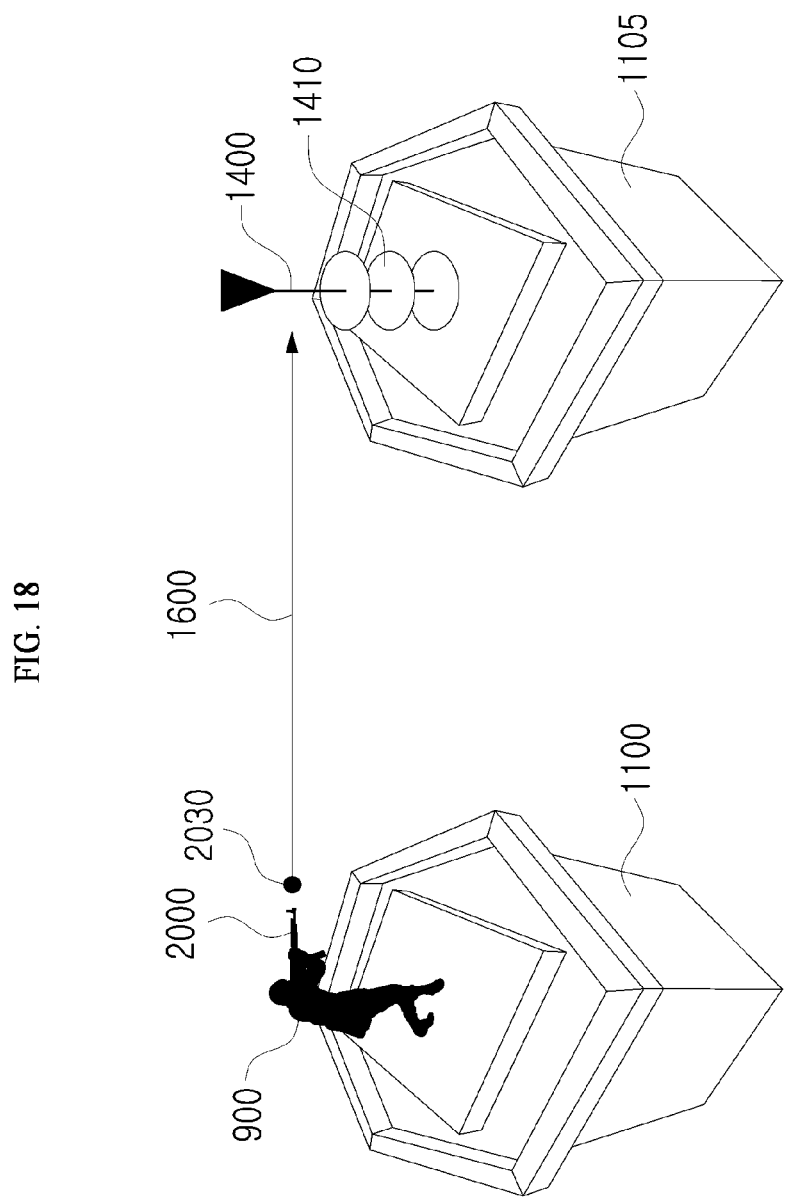
FIG. 18 is a diagram illustrating examples of a selection stage and a loading stage of FIG. 16 according to one embodiment.

FIG. 18 is a diagram illustrating the selection stage (S1100) and the loading stage (S1200) of FIG. 16.

Referring to FIG. 18, when the accessible mark 1400 is present within a range of the extension line 1600 in the same direction as a direction in which the control object 2000 is aimed, the aiming effect 1410 may be generated on the accessible mark 1400.

The extension line 1600 is a virtual straight line or a half line in the same direction as the direction in which the control object 2000 is aimed when the character 900 orients the control object 2000 in one direction.

The extension line 1600 may be changed according to the control object virtual position data 2030.

Accordingly, when the user 800 moves the input device 500, the direction or position of the extension line may be changed.

For example, when the control object 2000 is a gun, the extension line 1600 may be a half line starting from the muzzle and extending in a direction of the muzzle.

In another example, the extension line 1600 may be a parabola that is changed by a direction in which the control object 2000 is aimed with reference to the terrain 1000.

Meanwhile, the extension line 1600 may be displayed as a colored dotted line or solid line in the wearable display device 400.

Alternatively, the extension line 1600 may be an invisible virtual line and may not be displayed in the wearable display device 400.

The aiming effect 1410 is an effect in which the accessible mark 1400 is displayed when the accessible mark 1400 is present within a predetermined distance from the extension line 1600.

For example, when a virtual cylinder having a radius of a predetermined length is present around the extension line 1600, when the accessible mark 1400 is marked on inside of the virtual cylinder, the aiming effect 1410 may be displayed.

Meanwhile, the aiming effect 1410 may be displayed on the accessible mark 1400 even when the movement target area 1105 is present within a predetermined distance from the extension line 1600.

The aiming effect 1410 is displayed on the accessible mark 1400 so that the user 800 can be informed that the movement target area 1105 is selected.

By displaying the aiming effect 1410, it is possible to distinguish the case where the accessible mark 1400 is present within the predetermined distance from the extension line 1600 and the case where the accessible mark 1400 is not present within the predetermined distance.

For example, the aiming effect 1410 may be an animation showing a disc rotating around the accessible mark 1400 at a constant speed.

When the user 800 moves the input device 500, the character 900 may aim the control object 2000 at an area which the user desires to move to.

The detecting device 100 may track the input device 500 moved by the user 800 and transmit detecting data to the server 200, and the server 200 may calculate position data of the input device 500 and transmit the position data to the auxiliary computing device 300.

The auxiliary computing device 300 may calculate virtual position data on the basis of the position data of the input device 500 and implement the control object 2000 and the extension line 1600 in the survival virtual space 30 on the basis of the virtual position data.

The extension line 1600 may be calculated by at least one virtual coordinate forming the control object 2000.

The extension line 1600 may be calculated by a plurality of virtual coordinates calculated based on a plurality of markers M attached to the input device 500.

In this case, an image in which the character 900 aims the control object 200 at the accessible mark 1400 displayed in the movement target area 1105 may be displayed in the wearable display device 400.

When the accessible mark 1400 is positioned within a predetermined distance from the extension line 1600, the wearable display device 400 may display the aiming effect 1410 for a predetermined period of time.

FIG. 19 is a diagram illustrating the operation stage (S1300) of FIG. 16.

Referring to FIG. 19, when the user 800 operates the input device 500 in a state where the aiming effect 1410 is displayed on the accessible mark 1400, the character 900 may move to the movement target area 1105.

For example, when the user 800 operates the input device 500 while the aiming effect 1410 is being displayed so that the input signal is transmitted to the auxiliary computing device 300, the character 900 may move to the movement target area 1105.

The input signal may be transmitted to the auxiliary computing device 300 when the user 800 presses a button provided to the input device 500 or moves the input device 500 along a predetermined trajectory.

Meanwhile, the timing at which the user 800 operates the input device 500 may be a predetermined period of time after the aiming effect 1410 is displayed.

When a field of view output to the wearable display device 400 is changed from a field of view corresponding to the accessible area 1100 to a field of view corresponding to the movement target area 1105, the user 800 may recognize that the character 900 has moved.

When the character 900 moves to the movement target area 1105, the accessible mark 1400 may not be displayed in the movement target area 1105.

On the contrary, the accessible mark 1400 may be displayed in the accessible area 1100 where the character 900 was positioned according to a method of displaying the accessible mark 1400 as shown in FIGS. 14 and 15.

Figure 20:
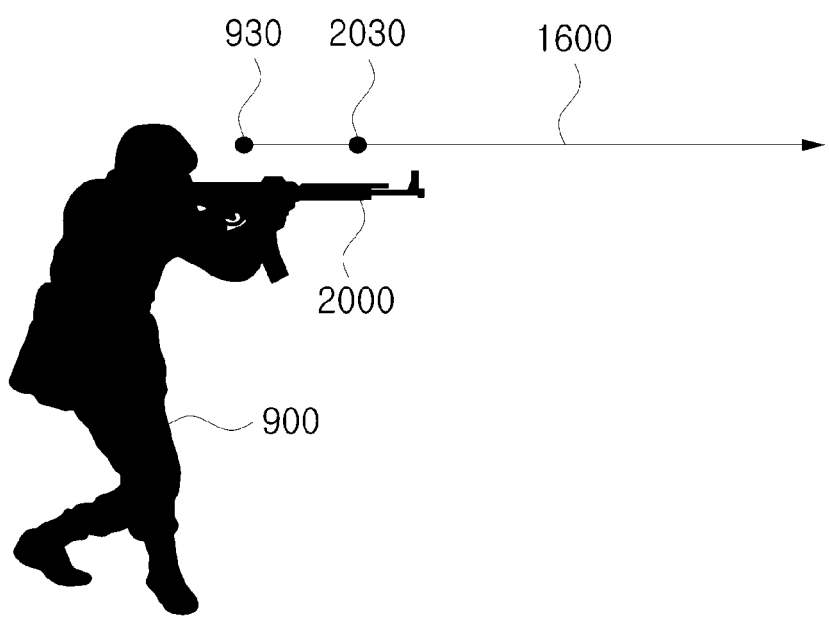
FIG. 20 is a diagram illustrating an example of another method of implementing an extension line according to one embodiment.

FIG. 20 is a diagram illustrating another method of implementing an extension line 1600.

Referring to FIG. 20, the extension line 1600 may be implemented by representative virtual position data 930 and control object virtual position data 2030.

When the representative virtual position data 930 based on position data of a wearable display device 400 worn by a user 800 is present and the control object virtual position data 2030 based on position data of an input device 500 carried by the user 800 is present, an auxiliary computing device 300 may set the extension line 1600 to a straight line or half line starting from the representative virtual position data 930 and passing through the control object virtual position data 2030. In this case, the representative virtual position data 930 may affect a direction in which the extension line 1600 is aimed and the control object virtual position data 2030 may affect the starting point of the extension line 1600.

For example, when the wearable display device 400 is rotated by the user 800, the auxiliary computing device 300 may set the direction in which the extension line 1600 is aimed to be equal to a direction in which the wearable display device 400 is aimed.

In addition, the auxiliary computing device 300 may set the starting point of the extension line 1600 differently according to the movement of the input device 500 by the user 800.

Meanwhile, the extension line 1600 may be set based on the representative virtual position data 930 and rotation data of the wearable display device 400.

For example, the auxiliary computing device 300 may implement the extension line 1600 starting from the representative virtual position data 930 and extending in the same direction as the direction in which the wearable display device 400 is oriented.

In this case, the rotation data of the wearable display device 400 acquired by a wearable display sensor 430 may be transmitted to the auxiliary computing device 300 and the auxiliary computing device 300 may set the direction in which the extension line 1600 is aimed on the basis of the rotation data.

Hereinafter, a method of displaying an accessible mark 1400 in a wearable display device 400 when a plurality of characters 900 are present in a survival virtual space 30 will be described with reference to FIGS. 21 and 22.

Figure 21:
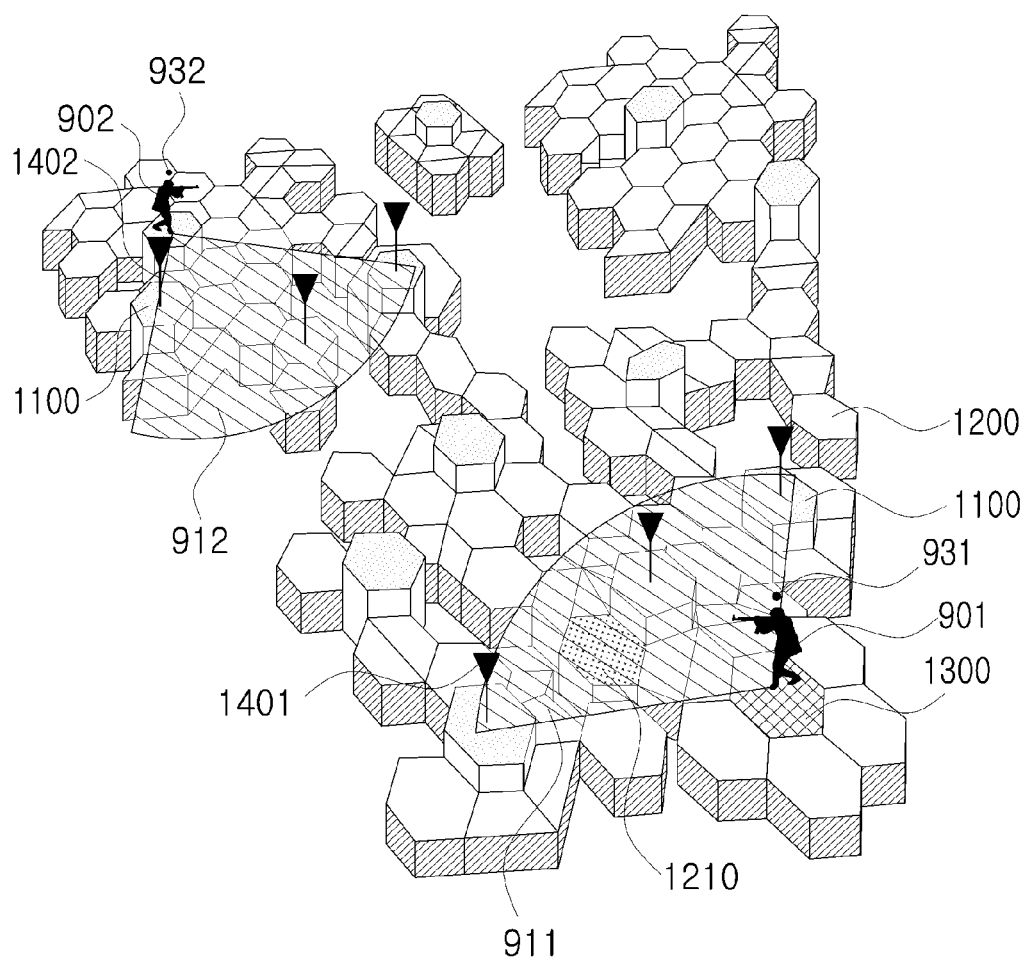
FIG. 21 is a diagram illustrating an example of a way in which an accessible mark is displayed when a plurality of characters are present in a survival virtual space according to one embodiment.

FIG. 21 is a diagram illustrating a way in which the accessible mark 1400 is displayed when a plurality of characters 900 are present in the survival virtual space 30.

Referring to FIG. 21, a first character 901 and a second character 902 are present in the survival virtual space 30.

In this case, a first accessible mark 1401 may be present in an accessible area 1100 positioned within a first movement range 911 of the first character 901, and a second accessible mark 1402 may be present in an accessible area 1100 positioned within a second movement range 912 of the second character 902.

The first movement range 911 and the second movement range 912 may be set by first representative virtual position data 931 and second representative virtual position data 932 in a similar manner as the method of setting the movement range 910 in FIG. 14.

The first movement range 911 and the second movement range 912 may be ranges which are different from each other.

In a case where a plurality of characters 900 are present in the survival virtual space 30, even when an accessible area 1100 is positioned within the first movement range 911 of the first character 901, when a second character 902 is present within an accessible area 1100, the first accessible mark 1401 may not be displayed.

The accessible area 1100 present within the first movement range 911 of the first character 901 may include a second character occupied area 1210 in which the second character 902 is positioned.

The second character occupied area 1210 may be processed in the same manner as an inaccessible area 1200 from the viewpoint of the first character 901.

For example, the first accessible mark 1401 is not displayed in the second character occupied area 1210 so that the first character 901 may not move to the second character occupied area 1210 even when the first user 801 operates the first input device 501 while a first control object 2001 of the first character 901 aims the second character occupied area 1210.

When the second character 902 is not located in the second character occupied area 1210 as the second character 902 moves to another accessible area 1100 and when the second character occupied area 1210 is still positioned within the first movement range 911, the first accessible mark 1401 may be re-displayed.

The first accessible mark 1401 and the second accessible mark 1402 may have different shapes and may be displayed in a different color.

Figure 22:
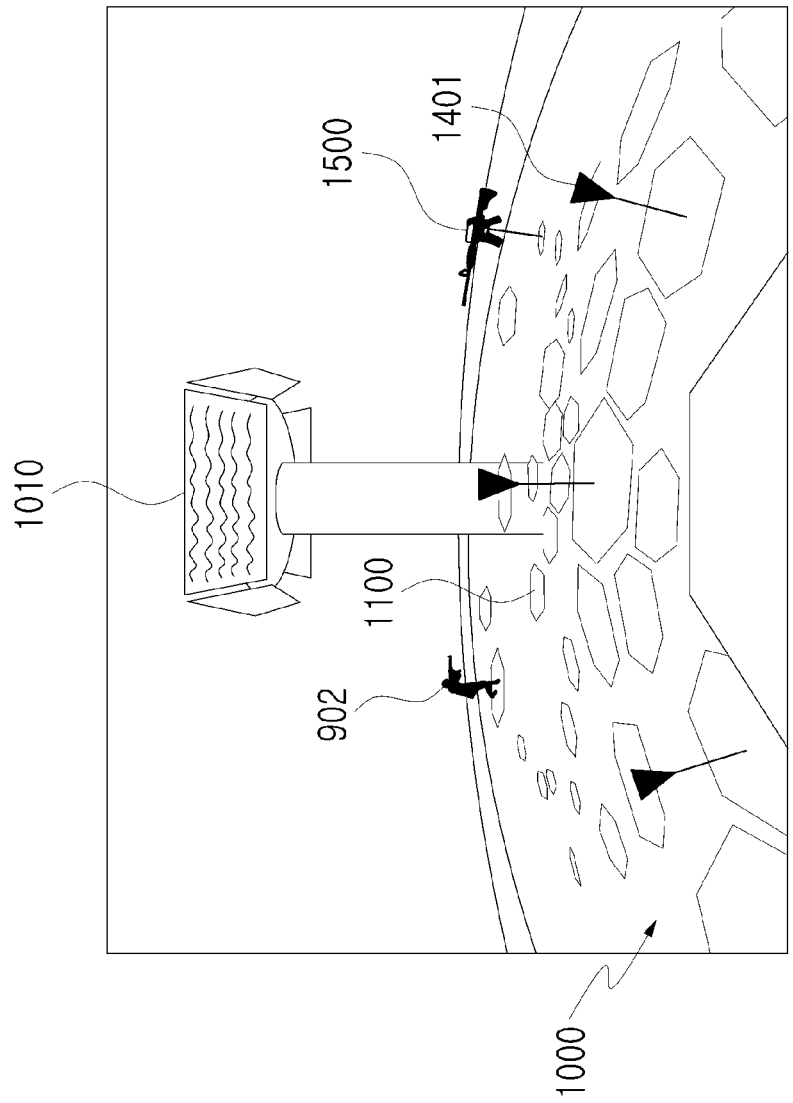
FIG. 22 is a diagram illustrating an example of a field of view output to wearable display devices worn by some users when a plurality of users proceed with survival content according to one embodiment.

FIG. 22 is a diagram illustrating a field of view output to a first wearable display device 401 worn by a first user 801 when a plurality of users proceed with survival content.

Referring to FIG. 22, terrain 1000, a second character 902 that moves in the accessible area 1100 in the terrain 1000, an item 1500, an electronic board 1010, a first accessible mark 1401, or the like may be displayed in the first wearable display device 401.

A first auxiliary computing device 301 that outputs an image related to a survival virtual space 30 to the first wearable display device 401 may receive an input signal according to the operation of a second input device 502 of a second user 802.

Meanwhile, the input signal from the second input device 502 may be provided to the first auxiliary computing device 301 through a server 200.

The first auxiliary computing device 301 may determine whether the second character 902 moves on the basis of the input signal from the second input device 502 and may output an image reflecting whether the second character 902 moves to the first wearable display device 401.

Meanwhile, the second accessible mark 1402 may not be displayed in the first wearable display device 401.

In a similar manner, in a field of view output to the second wearable display device 402 worn by the second user 802, terrain 1000, a first character 901 that moves in the accessible area 1100 in the terrain 1000, the item 1500, the electronic board 1010, the second accessible mark 1402, and the like may be displayed but the first accessible mark 1401 may not be displayed.

The accessible area 1100 may be located within the first movement range 911 of the first character 901 and simultaneously located within the second movement range 912 of the second character 902.

In this case, the first accessible mark 1401 and the second accessible mark 1402 may coexist in the accessible area 1100.

However, only the first accessible mark 1401 may be displayed in the first wearable display device 401 and only the second accessible mark 1402 may be displayed in the second wearable display device 402.

Meanwhile, when the first accessible mark 1401 and the second accessible mark 1402 coexist in a single accessible area 1100, when a point in time when the first user 801 operates the first input device 501 is earlier than a point in time when the second user 802 operates the second input device 502, the first character 901 corresponding to the first user 801 moves to the accessible area 1100. Alternatively, when the point in time at which the first input device 501 is operated is the same as the point in time at which the second input device 502 is operated, both of the first character 901 and the second character 902 do not move or one of the first character 901 and the second character 902 may move according to a preset priority.

Hereinafter, a method by which a character 900 obtains an item 1500 in a survival virtual space 30 will be described with reference to FIGS. 23 and 24.

Figure 23:
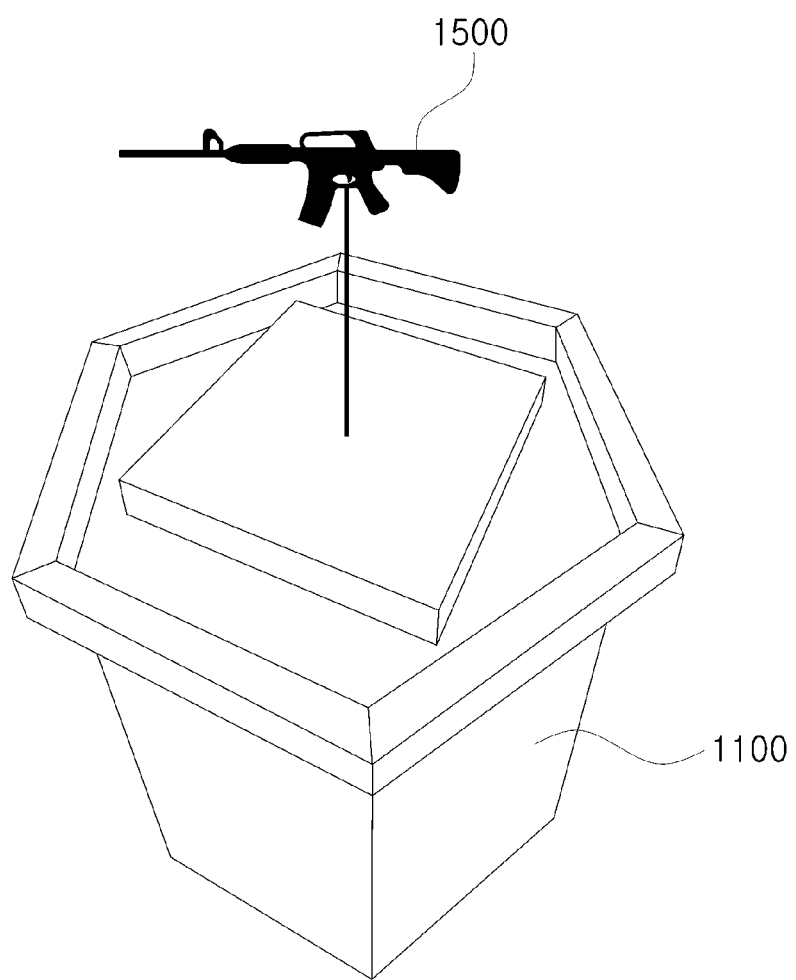
FIG. 23 is a diagram illustrating an example of the presence of an item in an accessible area according to one embodiment.

FIG. 23 is a diagram illustrating the presence of an item 1500 in an accessible area 1100.

The item 1500 may be a tool or equipment that the character 900 can use while proceeding with survival content.

In one embodiment, the item 1500 may include a knife, a bow, a grenade, a handgun, a shotgun, a mini gun, a laser gun, a rocket launcher, equipment such as rampage, a first aid box, a recovery capsule, and the like.

The character 900 may use the item 1500 to more effectively defend against attacks from the outside, recover the physical strength of the character 900, or attack other characters.

The item 1500 may be classified into several types of items 1500 according to performance or functionality.

For example, the item 1500 may have a different attack power depending on the type of the item 1500, and an effect displayed when the item 1500 is used may vary according to the attack power.

In the survival virtual space 30, the item 1500 may be randomly disposed in the terrain 100.

Alternatively, the item 1500 may be disposed at a preset position in the terrain 1000 according to the type of the item 1500.

The item 1500 may not be displayed in an inaccessible area 1200 and the respawn area 1300.

The item 1500 may be displayed in the accessible area 1100 or a special area 1310.

For example, the item 1500 may be displayed in a form floating in the center of the accessible area 1100.

The item 1500 may vary in distance from the respawn area 1300 depending on the type.

For example, as the attack power becomes stronger, the item 1500 may be disposed in the accessible area 1100 or the special area 1310 which are farther from respawn area 1300.

In another example, when a plurality of respawn areas 1300 are provided and arranged symmetrically around the terrain 1000, the item 1500 with the strongest attack power may be disposed in the accessible area 1100 positioned in the center of the terrain 1000.

Meanwhile, when the character 900 obtains the item 1500, the item 1500 may disappear from the accessible area 1100 and may be regenerated after a predetermined period of time.

An auxiliary computing device 300 may set an area in which the item 1500 is regenerated.

The item 1500 to be regenerated may be generated in the accessible area 1100 or the special area 1310 where the item 1500 was previously located before regeneration, or may be generated in another area.

When the character 900 is present in the area where the item 1500 is regenerated, the auxiliary computing device 300 may not generate the item 1500, may allow the character 900 to immediately obtain the item 1500, or may generate the item 1500.

Figure 24:
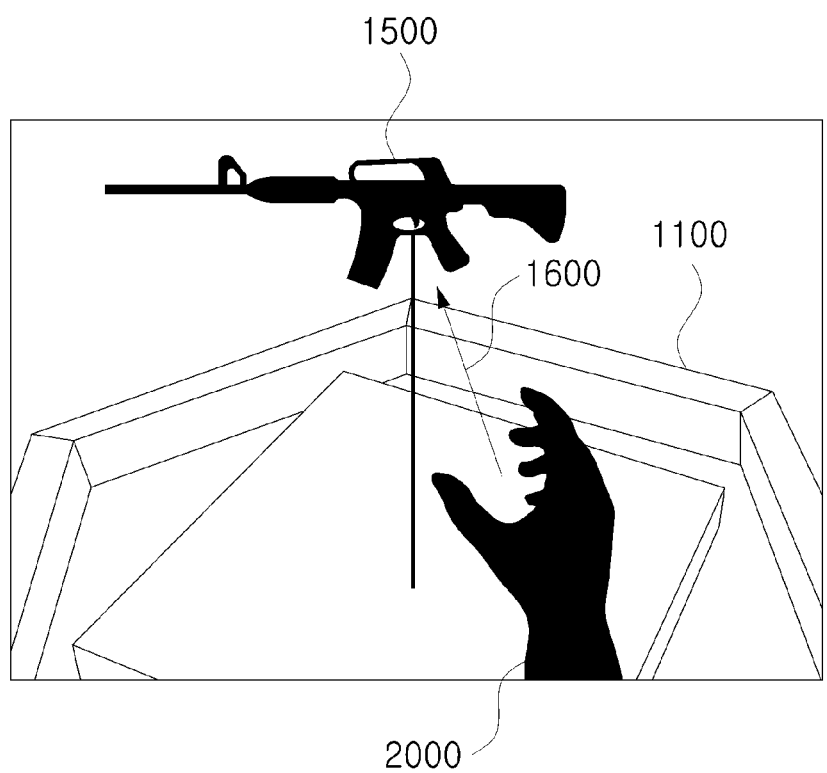
FIG. 24 is a diagram illustrating an example in which a character obtains an item using a control object according to one embodiment.

FIG. 24 is a diagram illustrating a character 900 obtaining an item 1500 using a control object 2000.

Referring to FIG. 24, the character 900 may obtain the item 1500 by directing the control object 2000 toward the item 1500.

The control object 2000 may be an object corresponding to an input device 500 carried by the user in the survival virtual space 30 and may have various shapes.

For example, when the character 900 obtains the item 1500 for the first time, the control object 2000 may be in a shape of a hand of the character 900 or in a shape of basic equipment provided at the time of starting the survival content.

In another example, when the character 900 that has already carried equipment or tool obtains the item 1500, the control object 2000 may be in a shape of the equipment or tool carried by the character 900.

An extension line 1600 may be a line that is changed by the control object 2000 as described in FIGS. 18 and 20.

The user 800 may confirm an area in which the item 1500 is present through the wearable display device 400, and may move to the area in which the item 1500 is present through the stages shown in FIG. 16.

The user 800 may allow the character 900 to aim the control object 2000 in a direction of the item 1500 using the input device 500.

When the item 1500 is present within a predetermined distance from the extension line 1600 that is changed according to the aiming direction of the control object 2000 and when the item 1500 is aimed at for a predetermined length of time, the character 900 may obtain the item 1500.

Alternatively, when the user 800 operates the input device 500 to transmit an input signal to the auxiliary computing device 300 in a state where the item 1500 is present within a predetermined distance from the extension line 1600, the character 900 may obtain the item 1500.

When the character 900 obtains the item 1500, an item acquisition effect may be generated.

For example, a shape of the control object 2000 may be changed to a shape of the item 1500.

In another example, the physical strength of the character 900 may be restored.

Figure 25:
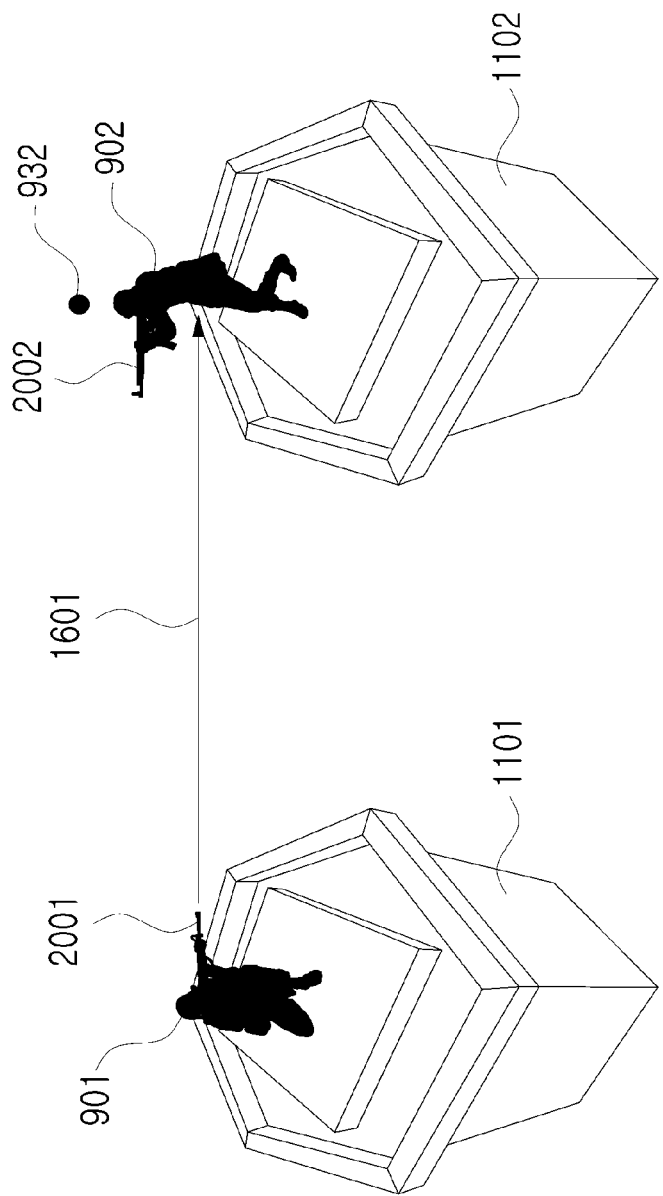
FIG. 25 is a diagram illustrating an example of a method of attacking a character in the progress of survival content according to one embodiment.

FIG. 25 is a diagram illustrating a method of attacking a character 900 in the progress of survival content.

Referring to FIG. 25, the character 900 may attack another character.

The character 900 may include a first character 901 corresponding to a first user 801 and a second character 902 corresponding to a second user 802.

Meanwhile, the second character 902 may not correspond to the second user 802 but may be a virtual character or object preset in the survival content by a program or application executed by the auxiliary computing device 300.

An accessible area 1100 may include a first accessible area 1101 and a second accessible area 1102.

The first character 901 may be positioned in the first accessible area 1101 and the second character 902 may be positioned in the second accessible area 1102.

The first character 901 may have first representative virtual position data 931 and the second character 902 may have second representative virtual position data 932.

The first accessible area 1101 and the second accessible area 1102 may be randomly positioned in terrain 1000.

The control object 2000 may include a first control object 2001 corresponding to a first input device 501 and a second control object 2002 corresponding to a second input device 502.

The first character 901 and the second character 902 may carry the first control object 2001 and the second control object 2002, respectively.

An extension line 1600 may include a first extension line 1601 that is changed by the first control object 2001.

The first extension line 1601 may be generated based on virtual position data of the first control object 2001 in a similar manner as described in FIG. 18 or 20.

When the first user 801 operates the first input device 501, the first character 901 may aim the first control object 2001 in a direction of the second character 902.

The second character 902 may be positioned within a predetermined distance from the first extension line 1601 moved by the movement of the first control object 2001.

Alternatively, the second representative virtual position data 932 may be positioned within a predetermined distance from the first extension line 1601 that is moved by the movement of the first control object 2001.

When the first user 801 operates the first input device 501 to transmit an input signal to a first auxiliary computing device 301, a server 200, or a second auxiliary computing device 302 in a state where at least a part of the second character 902 is present within a predetermined distance from the first extension line, the second character 902 may be shot.

When the first user 801 operates the first input device 501 to transmit an input signal to the first auxiliary computing device 301, the server 200, or the second auxiliary computing device 302 in a state where a predetermined range based on the second representative virtual position data 932 is positioned within a predetermined distance from the first extension line 1601, the second auxiliary computing device 302 may receive shooting data.

When the first user 801 presses a button provided in the first input device 501 or moves the first input device 501 along a predetermined trajectory, the input signal may be transmitted to the first auxiliary computing device 301, the server 200, or the second auxiliary computing device 302.

When the second character 902 is shot, at least one of the first wearable display device 401 and the second wearable display device 402 may display a shot effect on the second character 902.

The shot effect may include an effect that a shot portion of the character 900 is damaged or wound, or an effect of bleeding.

The shot effect may be displayed differently depending on the shot portion of the character 900.

The auxiliary computing device 300 may change a state of the character 900 according to the degree at which the character 900 is shot.

The character 900 may be in a wounded state, a death state, or the like according to the degree of damage from a shooting.

For example, when the second character 902 is shot, the physical strength of the second character 902 may be reduced and when the physical strength is lowered than a predetermined level, a death event may occur.

The degree of damage from a shot may be set according to the number of instances of being shot or an attack power of a virtual object attacking the character 900.

Hereinafter, a process of displaying a shot detector 1700 in a wearable display device 400 when a character 900 is shot will be described with reference to FIGS. 26 to 29.

Figure 26:
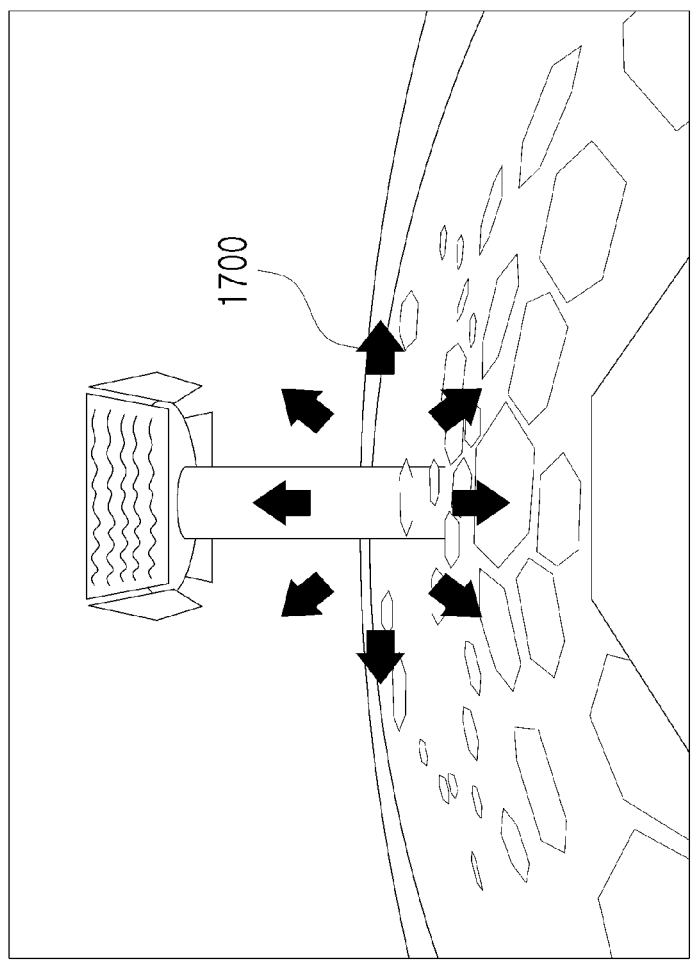
FIG. 26 is a diagram illustrating an example of an image in which a displayed shot detector is output to the wearable display device according to one embodiment.

FIG. 26 is a diagram illustrating an image in which the shot detector 1700, which is displayed, is output to the wearable display device 400.

Referring to FIG. 26, the shot detector 1700 may be displayed in various directions within a field of view output to the wearable display device 400 according to a position of a target that has attacked a character 900.

In a survival virtual space 30, the target that attacks the character 900 may include characters corresponding to other users, and a virtual character or object preset by a program or application executed by an auxiliary computing device 300.

The shot detector 1799 may be displayed within the field of view output by the wearable display device 400 to allow the user 800 to know in which direction the character 900 is attacked when the character 900 is shot.

For example, the shot detector 1700 may be displayed in the center or an edge of the field of view output by the wearable display device 400.

The auxiliary computing device 300 may display or may not display the shot detector 1700 in the wearable display device 400 using virtual position data of the character 900.

Figure 27:
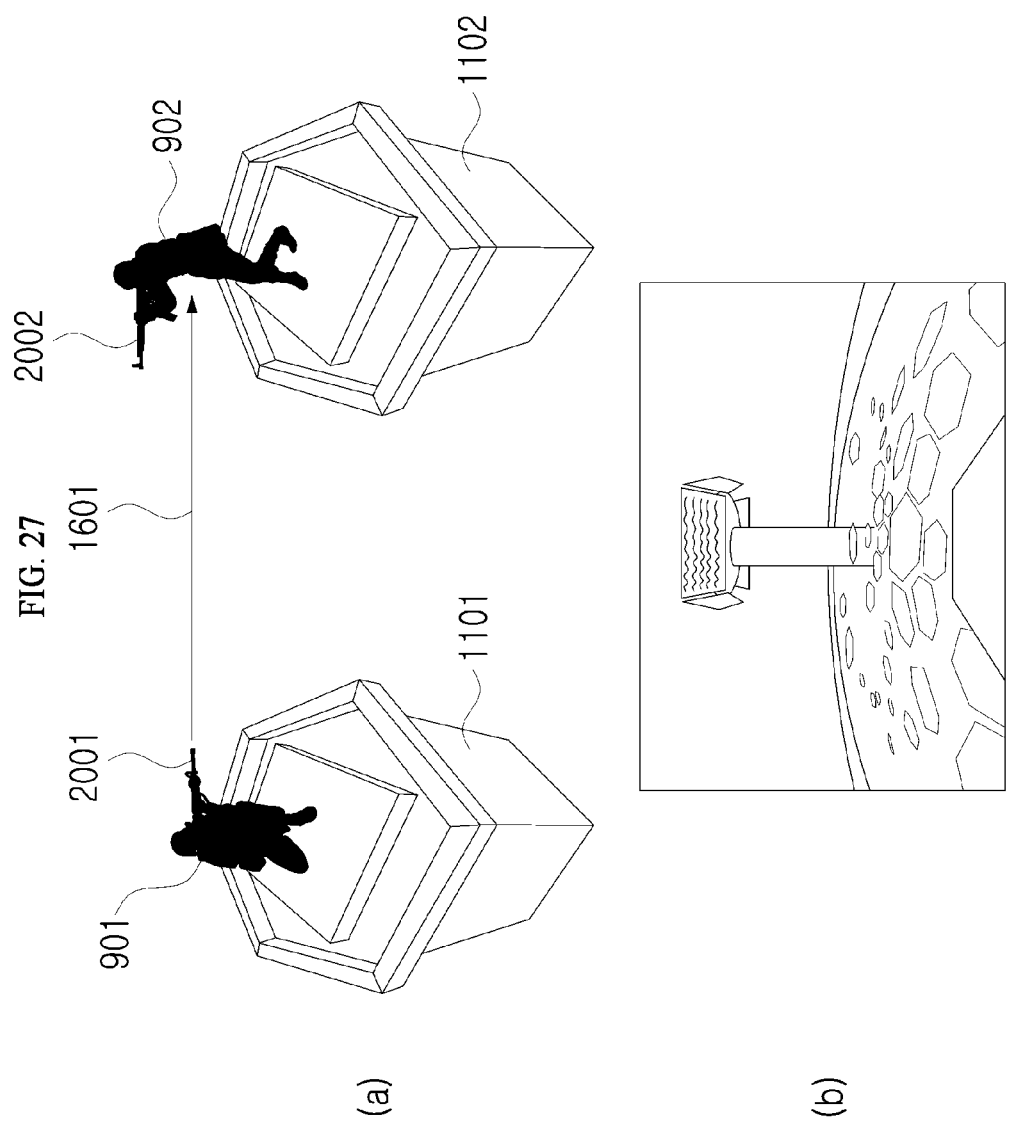
FIG. 27 is a diagram illustrating an example in which a character is attacked by a character present within a field of view output to a wearable display device according to one embodiment.
Figure 28:
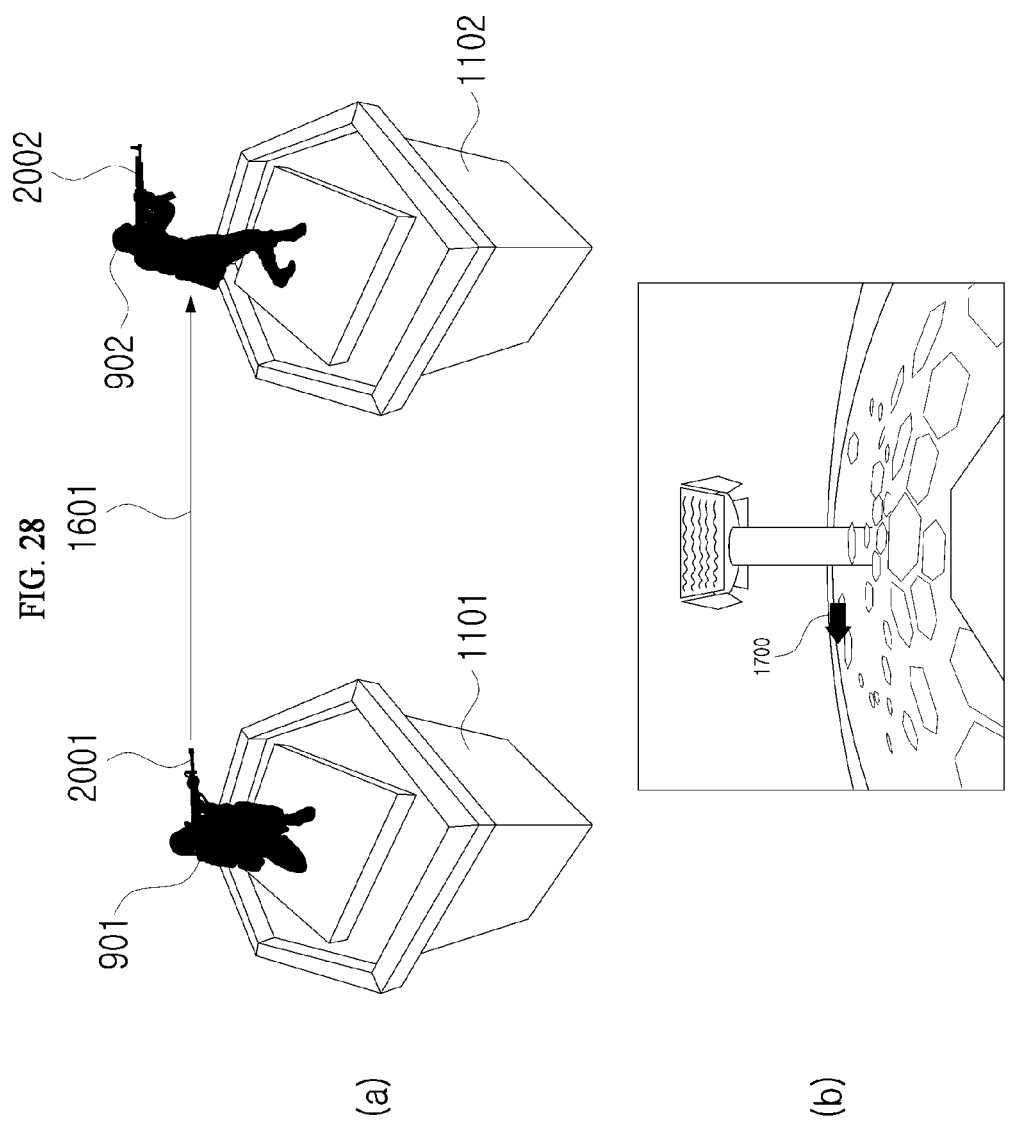
FIG. 28 is a diagram illustrating an example in which a character is attacked by a character located outside of the field of view output to the wearable display device according to one embodiment.

FIG. 27 is a diagram illustrating a case in which the character 900 is attacked by a character present within a field of view output to a wearable display device 400 and FIG. 28 is a diagram illustrating a case in which the character 900 is attacked by a character located outside of the field of view output to the wearable display device 400.

The field of view output to the wearable display device 400 may include a field of view of the character 900.

The field of view of the character 900 may include a field of view of a virtual camera that corresponds to representative virtual position of the character 900.

Meanwhile, the attacking character may not correspond to the user 800 and may include a virtual character or object in the survival content preset by a program or application executed by the auxiliary computing device 300.

FIG. 27A is a diagram illustrating that a first character 901 present within a field of view of a second character 902 is attacking the second character 902.

FIG. 27B is a diagram illustrating that the shot detector 1700 is not displayed in the second wearable display device 402.

Referring to FIG. 27, when the second character 902 is shot by the first character 901 present within the field of view of the second character 902, the shot detector 1700 may not be displayed in the second wearable display device 402.

The first character 901 may attack the second character 902 as shown in FIG. 25.

The first character 901 may attack the second character 902 according to manipulation of a first input device 501 by the first user 801.

When first representative virtual position data 931 of the first user 801 or the first character 901 is present within the field of view of the second character 902 at the time when the second character 902 is shot, the shot detector 1700 may not be displayed in the second wearable display device 402.

When the second auxiliary computing device 302 receives shooting data indicating that the second character 902 is shot, the second auxiliary computing device 302 may determine whether the first representative virtual position data 931 of the first character 901 is present within the field of view output to the second wearable display device 402.

In this case, rotation data of the second wearable display device 402 may be used.

Meanwhile, the rotation data may be acquired by a wearable display sensor 430 when the wearable display device 400 is rotated by the user 800.

For example, the field of view output to the second wearable display device 402 may be changed as the second wearable display device 402 is rotated by the second user 802.

Accordingly, the second auxiliary computing device 302 may determine whether the first representative virtual position data 931 is present within the field of view output to the second wearable display device 402 on the basis of the rotation data of the second wearable display device 402 and may determine whether the whole or part of the first character 901 is present within the field of view.

When the whole or part of the first character 901 is present within the field of view output to the second wearable display device 402, the second auxiliary computing device 302 may not display the shot detector 1700.

FIG. 28A is a diagram illustrating that a first character 901 outside of a field of view of a second character 902 is attacking the second character 902.

FIG. 28B is a diagram illustrating that a shot detector 1700 is displayed in a second wearable display device 402.

Referring to FIG. 28, when the second character 902 is shot by the first character 901 outside of the field of view of the second character 902, the shot detector 1700 may be displayed in the second wearable display device 402.

The shot detector 1700 may indicate a direction in which the second wearable display device 402 has to rotate in order to locate the first character 901 in the field of view of the second character 902.

When a second auxiliary computing device 302 receives shooting data indicating that the second character 902 is shot, the second auxiliary computing device 302 may determine whether first representative virtual position data 931 of the first character 901 is present within the field of view output to the second wearable display device 402.

For example, the second auxiliary computing device 302 may determine whether the first representative virtual position data 931 is present within the field of view output to the second wearable display device 402 on the basis of rotation data of the second wearable display device 402 and may determine whether the whole or part of the first character 901 appears in the field of view.

When the first character 901 is not present in the field of view output to the second wearable display device 402, the shot detector 1700 may be displayed.

Meanwhile, when part of the first character 901 is present in the field of view output to the second wearable display device 402, the shot detector 1700 may not be displayed.

Figure 29:
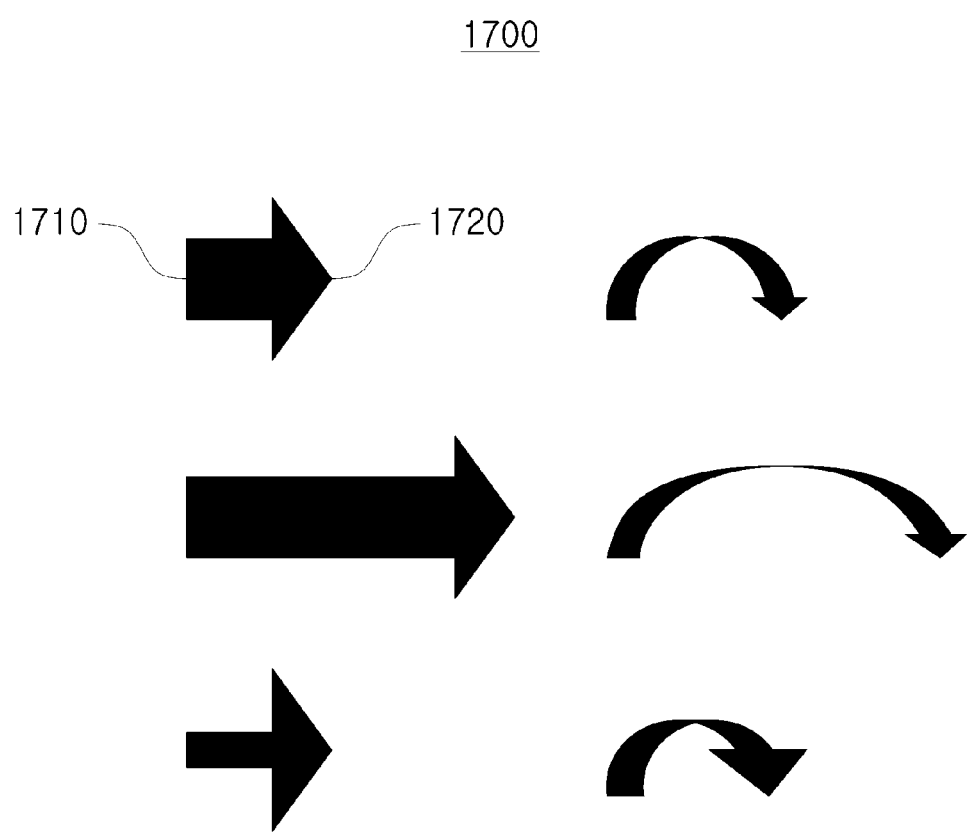
FIG. 29 is a diagram illustrating examples of a displayed shape of the shot detector according to one embodiment.

FIG. 29 is a diagram illustrating shapes of the shot detector 1700 according to one embodiment.

Referring to FIG. 29, the shape of the shot detector 1700 may include an arrow shape having a starting point 1710 and an end point 1720.

Alternatively, the shape of the shot detector 1700 may include a three-dimensional (3D) arrow shape having a starting point 1710 and an end point 1720. The shot detector 1700 may have various shapes according to a direction to be directed, a distance, the number of targets attacking a character 900, or a rotation angle at which a wearable display device 400 is to rotate.

For example, a length of the shot detector 1700 may be increased or decreased in proportion to the rotation angle.

For example, a thickness of the shot detector 1700 may be increased in proportion to the number of targets.

Meanwhile, a plurality of shot detectors 1700 may be displayed according to the number of targets.

In addition, the shot detector 1700 may be displayed in various forms, such as displaying an edge of a field of view 451 in red.

Also, the shot detector 1700 may be output by voice through a wearable display speaker 460.

The shot detector 1700 may be output on the basis of representative virtual position data 930 of a character 900, wherein a point in time at which a shooting event occurs and a point in time at which the shot detector 1700 is output may be taken into consideration.

At a first point in time, a shooting event may occur to a second character 902, a first character 901 may have first shooting virtual position data, and the second character 902 may have second shooting virtual position data.

At a second point in time, the shot detector 1700 may be output to the second wearable display device 402, the first character 901 may have first output virtual position data, and the second character 902 may have second output virtual position data.

The shot detector 1700 may be displayed on the basis of one of the first shooting virtual position data and the first shooting virtual position data and one of the second shooting virtual position data and the second output virtual position data.

For example, the shot detector 1700 may be displayed on the basis of the first shooting virtual position data and the second shooting virtual position data.

Alternatively, the shot detector 1700 may be displayed on the basis of the first output virtual position data and the second output virtual position data.

Alternatively, the shot detector 1700 may be displayed on the first shooting virtual position data and the second output virtual position data.

The shot detector 1700 may be output for a predetermined period of time from the point in time at which the second character 902 is shot.

For example, the shot detector 1700 may be output periodically for a predetermined period of time from the time of being shot, and the period may be inversely proportional to the number of times the second character 902 is shot by the target.

The shot detector 1700 may be changed and displayed according to the number of times the second character 902 is shot.

When the second character 902 is shot by two or more targets outside of the field of view of the second character 902, the shot detector 1700 may be displayed regarding one target.

In this case, a second auxiliary computing device 302 may take into consideration a rotation angle at which the second wearable display device 402 is to rotate in order to place the target that attacks the second character 902 outside of the field of view of the second character 902 into the field of view of the second character 902.

For example, when the second character 902 is shot by the first character 901 and a virtual character outside of the field of view of the second character 902, a rotation angle at which the second wearable display device 402 is to rotate may include a first rotation angle and a second rotation angle.

The first rotation angle may be an angle at which the second wearable display device 402 is to rotate in order to place the first character 901 into the field of view of the second character 902.

The second rotation angle may be an angle at which the second wearable display device 402 is to rotate in order to place the virtual character into the field of view of the second character 902.

The second auxiliary computing device 302 may compare the first rotation angle and the second rotation angle and display the shot detector 1700 in the second wearable display device 402.

For example, when the first rotation angle is greater than the second rotation angle, the second auxiliary computing device 302 may display the shot detector 1700 in the second wearable display device 402 in order to place the virtual character into the field of view of the second character 902.

Meanwhile, when the second character 902 is shot by two or more targets outside of the field of view of the second character 902, a plurality of shot detectors 1700 may be displayed corresponding to the respective targets.

As a way of displaying the shot detector 1700, the starting point 1710 of the shot detector 1700 may be connected to the second character 902 and the end point 1720 may be connected to the first character 901.

Alternatively, the shot detector 1700 may be displayed in such a manner that the first character 901 or the first representative virtual position data 931 is present within a predetermined distance from the connecting line connecting the starting point 1710 and the end point 1720.

The length of the shot detector 1700 may decrease as the second user 802 rotates the second wearable display device 402 in a direction of the first character 901.

Meanwhile, when the first character 901 is located within the field of view of the second character 902 a predetermined period of time after the attack outside of the field of view of the second character 902, the shot detector 1700 may be displayed only for a time during which the first character 901 is outside of the field of view of the second character 902.

Alternatively, when the first character 901 is located within the field of view of the second character 902 a predetermined period of time after the attack outside of the field of view of the second character 902, the shot detector 1700 may be further displayed for a predetermined period of time since the first character 901 enters into the field of view of the second character 902.

Hereinafter, a method in which the auxiliary computing device 300 controls the wearable display device 400 to guide the character 900 to a safety area 1110 when the character is located outside the safety area 1110 in a virtual space 30 will be described with reference to FIGS. 30 and 31.

Figure 30:
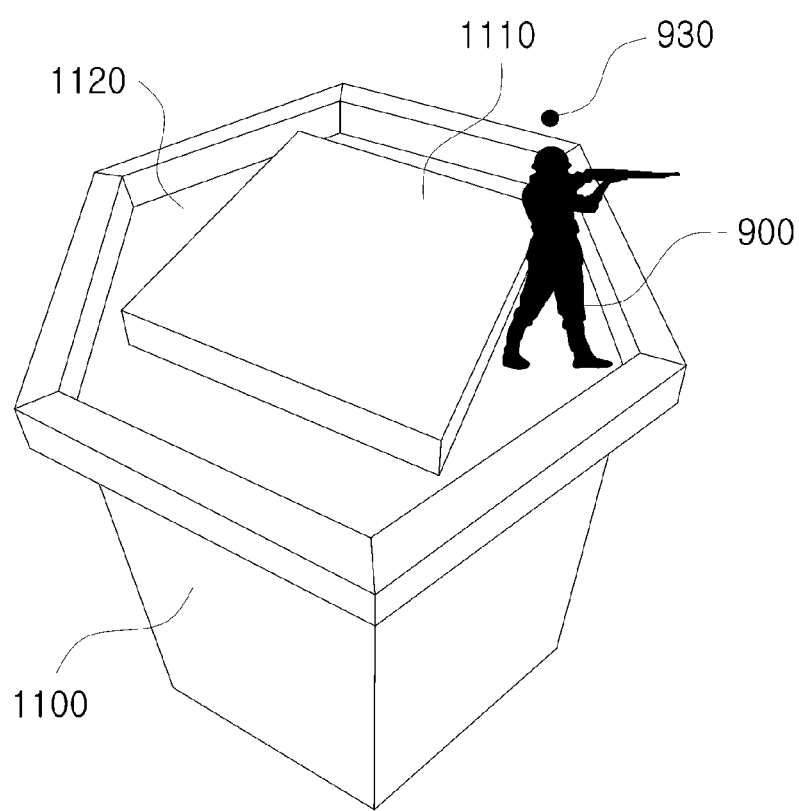
FIG. 30 is a diagram illustrating an example in which a character is located outside of a safety area in an accessible area according to one embodiment.

FIG. 30 is a diagram illustrating the character 900 located outside the safety area 1110 in an accessible area 1100.

The auxiliary computing device 300 may determine whether the character 900 is located within the safety area 1110 in the accessible area 1100 on the basis of virtual position data 930 of a user 800.

When the user 800 is placed outside of a recommended movement area within a tracking area 600, the character 900 may be located outside of the safety area 1110 in the accessible area 1100 in the virtual space 30.

When the character 900 is located outside the safety area 1110 in the accessible area 1100, the auxiliary computing device 300 may control the wearable display device 400 to inform the user 800 of being outside of the safety area 1110.

Figure 31:
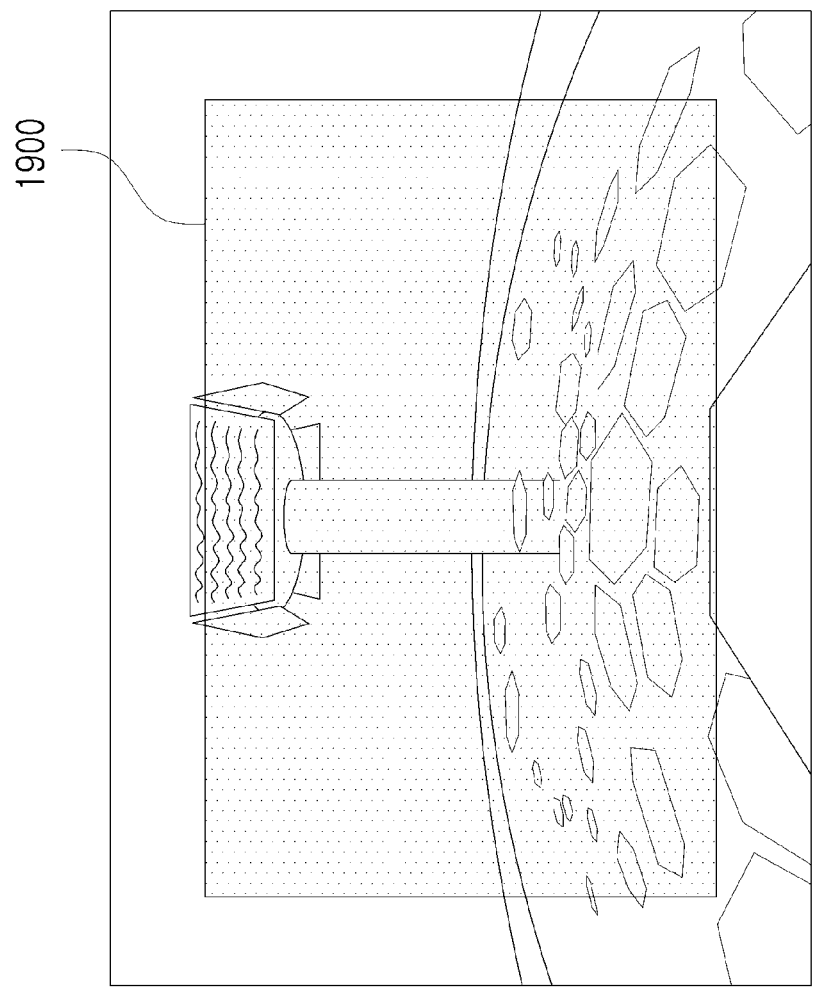
FIG. 31 is a diagram illustrating an example of an image displayed in a wearable display device by an auxiliary computing device when a character is located outside of the safety area in the accessible area according to one embodiment.

FIG. 31 is a diagram illustrating an image displayed in the wearable display device 400 by the auxiliary computing device 300 when the character 900 is located outside of the safety area 1110 in the accessible area 1100.

Referring to FIG. 31, the auxiliary computing device 300 may output an induced image 1900 to the wearable display device 400.

The induced image 1900 may induce the user 800 to move to the recommended movement area when the user 800 is outside of the recommended movement area within the tracking area 600.

For example, the induced image 1900 may include an image obtained by lowering a resolution of an image to be output to the wearable display device 400 to a predetermined resolution or lower.

The auxiliary computing device 300 may output an image to the wearable display device 400 according to the progress of survival content by lowering the resolution of the image.

In another example, the induced image 1900 may include a warning message that informs the user 800 that the character 900 is outside of the safety area 1110.

The induced image 1900 may be displayed in the whole or part of the field of view of the character 900.

The user 800 may experience survival content in the recommended movement area within the tracking area 600.

As the survival content proceeds, the user 800 may move out of the recommended movement area.

When the user 800 moves out of the recommended movement area, the character 900 within the survival virtual space 30 may move out of the safety area 1110.

The auxiliary computing device 300 may output the induced image 1900 to the wearable display device 400 when the virtual position data 930 based on the position data of the user 800 is present outside of the safety area 1110.

The user 800 may move to the recommended movement area within the tracking area 600 in order to prevent the induced image 1900 from being output to the wearable display device 400.

For example, when the virtual position data of the user 800 is located out of the safety area 1110 and the wearable display device 400 is oriented in a direction of the safety area 1110, the induced image 1900 may not be output. Accordingly, it is possible to easily induce the user 800 to return to the safety area 1110.

In another example, the induced image 1900 may be output when the virtual position data of the user 800 is located out of the safety area 1110 and the safety area 1110 is not placed in the field of view of the character 900.

Meanwhile, when part of the character 900 is located within the safety area 1110 and the other part of the character 900 is located out of the safety area 1110, the induced image 1900 may be displayed in a portion of the field of view of the character 900 corresponding to the outside of the safety area 1110.

When the user 800 operates the input device 500 in a state in which the character 900 is located out of the safety area 1110, the auxiliary computing device 300 may not generate any effects.

Meanwhile, the auxiliary computing device 300 may output an induced message through a wearable display speaker 460 to induce the user 800 to move to the recommended movement area.

Hereinafter, a method in which a barrier 1800 is displayed in an accessible area 1100 within a survival virtual space 30 and the barrier 1800 protects a character 900 from attacks from the outside will be described with reference to FIGS. 32 to 34.

Figure 32:
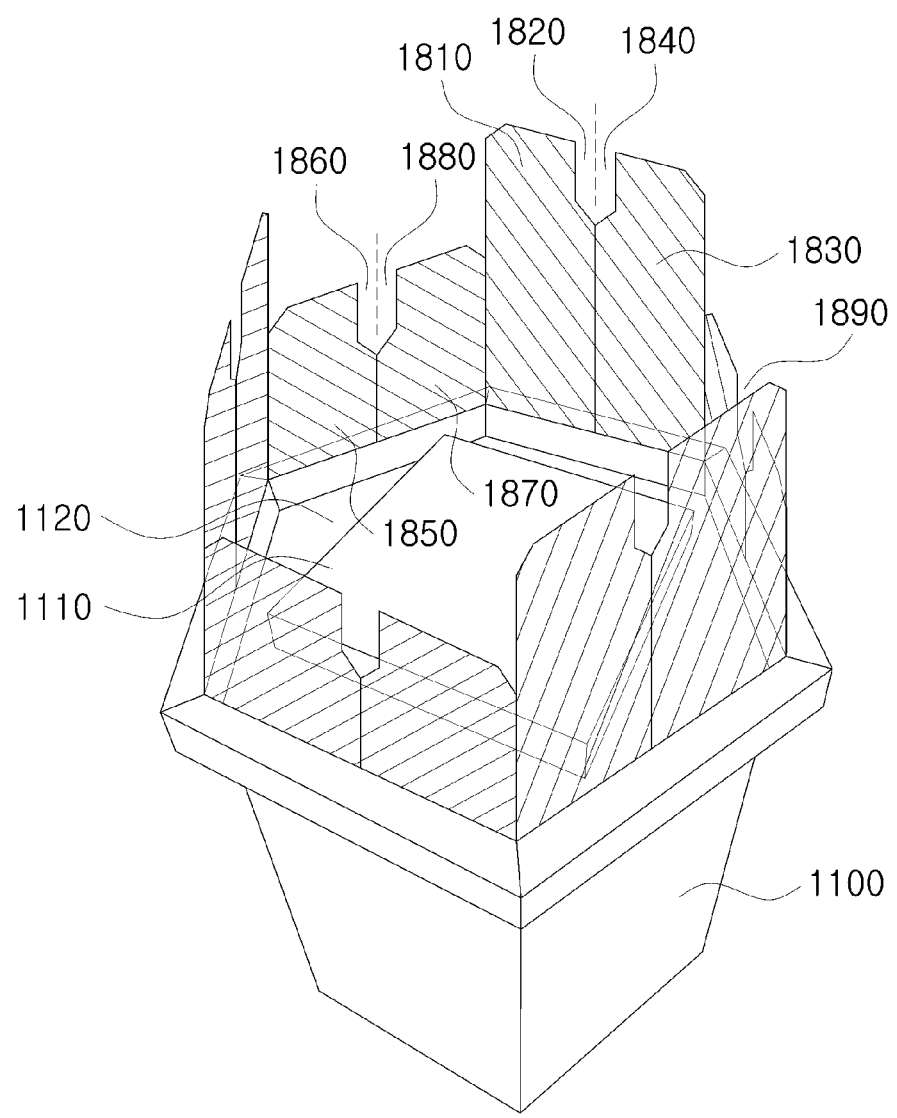
FIG. 32 is a diagram illustrating an example of a barrier formed in a barrier area within the accessible area according to one embodiment.

FIG. 32 is a diagram illustrating the barrier 1800 formed in a barrier area 1120 within the accessible area 1100.

Referring to FIG. 32, the barrier 1800 may include a first barrier 1810, a second barrier 1830, a third barrier 1850, and a fourth barrier 1870. The barrier 1800 may include a neutral barrier, an enemy barrier, and a friendly barrier.

The neutral barrier may be a barrier 1800 displayed in the accessible area 1100 where no characters 900 are located.

The enemy barrier may be a barrier 1800 displayed in the accessible area 1100 where a character attacking the character 900 is located.

The friendly barrier may be a barrier 1800 displayed in the accessible area 1100 where the character 900 or a character forming a team with the character 900 is located.

The neutral barrier, the enemy barrier, and the friendly barrier may be distinguished by color.

A shape of the barrier 1800 may include a polygonal shape and a curved shape.

The shape of the barrier 1800 may include a shape of an angled solid figure or a curved solid figure.

The barrier 1800 may have various heights and sizes.

The barrier 1800 may be disposed within the barrier area 1120.

Alternatively, the barrier 1800 may be disposed in an area which is not the safety area 1110.

Alternatively, the barrier 1800 may be disposed in an area of a top surface of the accessible area 1100 which surrounds the barrier area 1120.

Alternatively, the barrier 1800 may be positioned in the safety area 1110.

The barrier 1800 may be located outside the safety area 1110. The barrier 1800 may be disposed at a boundary between the safety area 1110 and the barrier area 1120.

A predetermined number of barriers 1800 may be formed on each side of the barrier area 1120.

For example, two barriers 1800 may be disposed on each side of the barrier area 1120.

The barrier 1800 may include a blank area to allow an extension line 1600 occurring from a control object 2000 to pass therethrough.

The blank area may be formed in a part of the barrier 1800.

When a plurality of barriers 1800 are attached, the blank areas of each barrier 1800 may be combined to form a crevice 1890.

For example, when two symmetrical barriers 1800, each of which has a blank area on an edge, are arranged side by side, the blank areas of the two barriers 1800 may be combined to form a crevice 1890.

The first barrier 1810 to the fourth barrier 1870 may include a first blank area 1820 to a fourth blank area 1880, respectively.

Each of the first blank area 1820 to the fourth blank area 1880 may be formed on a part of each of the respective first barrier 1810 to fourth barrier 1870.

The first barrier 1810 and the second barriers 1830 may be symmetrical to each other, and the third barrier 1850 and the fourth barrier 1870 may be symmetrical to each other.

The first barrier 1810 and the second barrier 1830 may be formed to be higher than the third barrier 1850 and the fourth barrier 1870.

When the first barrier 1810 and the second barrier 1830 are arranged side by side, the first blank area 1820 and the second blank area 1840 may form the crevice 1890.

When the third barrier 1850 and the fourth barrier 1870 are arranged side by side, the third blank area 1860 and the fourth blank area 1880 may form the crevice 1890.

The first barrier 1810 and the second barrier 1830 may be arranged side by side on one side of the barrier area 1120.

The third barrier 1850 and the fourth barrier 1870 may be arranged side by side on one side of the barrier area 1120.

Two barriers 1800 may be disposed on each side of the barrier area 1120, wherein a set of the first barrier 1810 and the second barrier 1830 may be arranged on one side and a set of the third barrier 1850 and the fourth barrier 1870 may be arranged on a neighboring side alternately.

Alternatively, a set of the first barrier 1810 and the second barrier 1830 or a set of the third barrier 1850 and the fourth barrier 1870 may be randomly arranged on each side of the barrier area 1120.

When a character 900 is located in the accessible area 1100, the barrier 1800 may be formed.

The barrier 1800 may be gradually displayed in the barrier area 1120 within the accessible area 1100 when the character 900 has moved to the accessible area 1100.

For example, when the character 900 has moved to the accessible area 1100 by the method described in FIGS. 17 to 19, the barrier 1800 may be formed in the barrier area 1120 from a bottom to a top thereof.

In another example, the first barrier 1810 to the fourth barrier 1870 may be formed in a sequential or random order.

Meanwhile, the barrier 1800 may not be displayed in the accessible area 1100 in which the character 900 is not located.

Alternatively, the barrier 1800 may be displayed even in the accessible area 1100 in which the character 900 is not located. In this case, the barrier 1800 may act as the neutral barrier.

Figure 33:
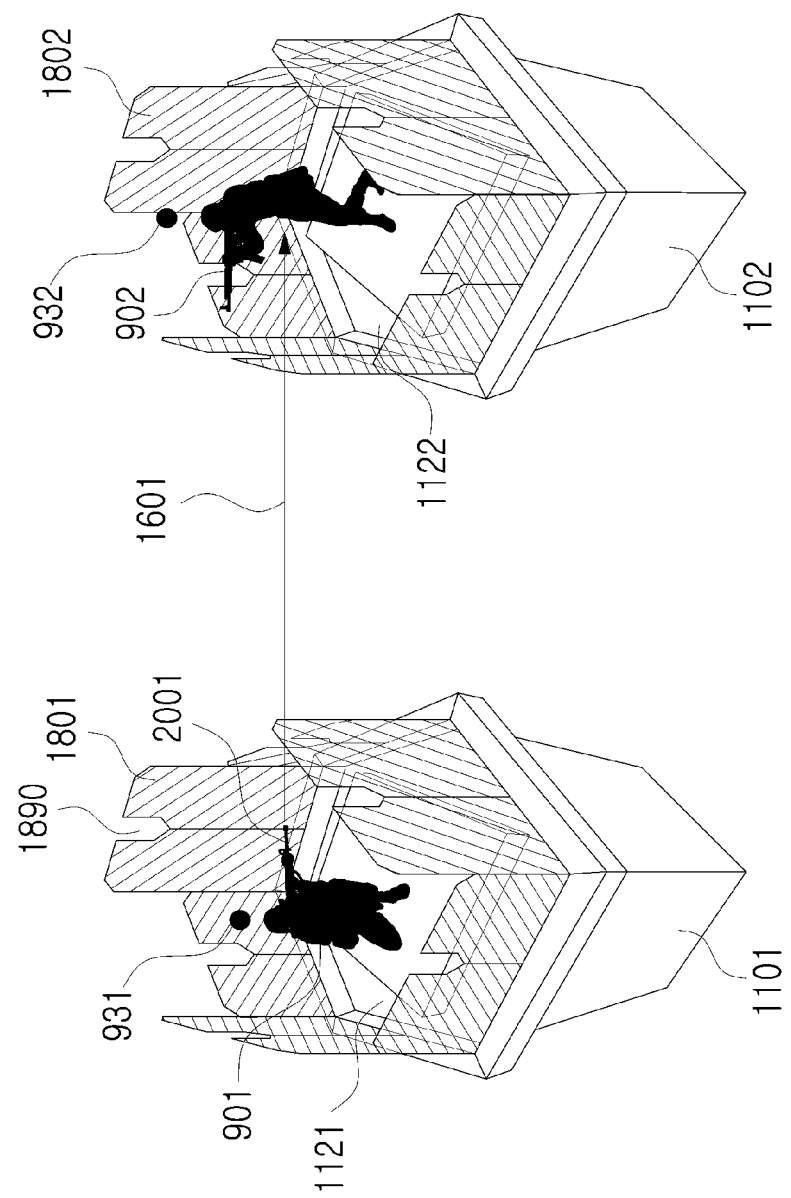
FIG. 33 is a diagram illustrating an example of the use of a barrier when survival content is provided to a plurality of characters in a survival virtual space according to one embodiment.

FIG. 33 is a diagram illustrating the use of the barrier 1800 when survival content is provided to a plurality of characters 900 in a survival virtual space 30. Referring to FIG. 33, a first character 901 located in a first accessible area 1101 may attack a second character 902 located in a second accessible area 1102 using a first control object 2001.

The second character 902 may include a virtual character or an object which does not correspond to a second user 802 and is created by a program or application stored in an auxiliary computing device 300.

The first accessible area 1101 and the second accessible area 1102 may form terrain 1000 in the survival virtual space 30.

The barrier 1800 may include a first character barrier 1801 and a second character barrier 1802.

A barrier area 1120 may include a first barrier area 1121 present in the first accessible area 1101 and a second barrier area 1122 present in the second accessible area 1102.

The first character barrier 1801 may be formed in the first barrier area 1121 and the second character barrier 1802 may be formed in the second barrier area 1122.

When first representative virtual position data 931 of the first user 801 is present in the first accessible area 1101, a first auxiliary computing device 301 may display the first character barrier 1081 in a first wearable display device 401.

When second representative position data 932 of the second user 802 is present in the second accessible area 1102, a second auxiliary computing device 302 may display the second character barrier 1802 in a second wearable display device 402.

Alternatively, the same barriers may be formed in the first barrier area 1121 and the second barrier area 1122.

Meanwhile, the same barriers 1800 may even be displayed in different colors respectively in the first wearable display device 401 and the second wearable display device 402.

The auxiliary computing device 300 may output an image related to the survival virtual space 30 around the user 800 through the wearable display device 400 worn by the user 800.

For example, when the friendly barrier is displayed in blue and the enemy barrier is displayed in red, the first character barrier 1801 located in the first barrier area 1121 may be displayed in blue in the first wearable display device 401 while being displayed in red in the second wearable display device 402.

In the same manner, the second character barrier 1802 located in the second barrier area 122 may be displayed in blue in the second wearable display device 402 while being displayed in red in the first wearable display device 401.

As the survival content proceeds, the first character 901 and the second character 902 may attack each other by the method described in FIG. 25.

The first character barrier 1801 may protect the first character 901 from attacks from the outside, and the second character barrier 1802 may protect the second character 902 from attacks from the outside.

The first character 901 may carry a first control object 2001 corresponding to a first input device 501 carried by the first user 800.

There may be a first extension line 1601 that changes based on the first control object 2001.

The second character 902 and the second character barrier 1802 may be present within a predetermined distance from the first extension line 1601.

In addition, the first extension line 1601 may pass through a crevice 1890 present in the first character barrier 1801 and may not pass through a crevice 1890 present in the second character barrier 1802.

Meanwhile, the first character 901 may attack in a sitting position to attack the second character 902 through the crevice 1890.

When the barrier 1800 is present within a predetermined distance from the extension line 1600 that changes by the control object 2000 and an input signal is transmitted to the auxiliary computing device 300 or the server 200 by operation of the input device 500 of the user 800, the auxiliary computing device 300 or a server 200 may determine that the barrier 1800 has been shot.

For example, in a case where the first extension line 1601 that is changed by a virtual position of the first control object 2001 of the first character 901, the second character 902 is present within a predetermined distance from the first extension line 1601, and a second character barrier is present between the first character 901 and the second character 902, the first wearable display device 401 may display a shot effect on the second character barrier 1802 when the first user 801 operates the first input device 501 so that an input signal is transmitted to the first auxiliary computing device 301 or the server 200.

The first user 801 and the second user 802 may use the barrier 1800 to avoid or defend from each other's attack within the survival virtual space 30.

For example, when the first user 801 takes a motion such as lowering his or her body the first character 901 in the survival virtual space 30 may take cover behind the first character barrier 1801 so that the attack of the second character 902 can be absorbed by the first character barrier 1801.

The first user 801 and the second user 802 may attack the opponent character using the crevice 1890 formed in the barrier 1800.

For example, the first user 801 may use the first input device 501 to cause the first character 901 to place the first control object 2001 in the crevice 1890 and may attack the second character 902 by operating the first input device 501 while the first character 901 aims at the second character 902.

When the barrier 1800 is shot by the character 900 or when the barrier 1800 is shot in place of the character 900, the auxiliary computing device 300 may store a durability state according to the degree of damage from a shot.

The auxiliary computing device 300 may change the shape of the barrier 1800 to be output to the wearable display device 400 by reflecting the stored durability state of the barrier 1800.

A detail of the durability state of the barrier 1800 will be described with reference to FIG. 34.

Figure 34:
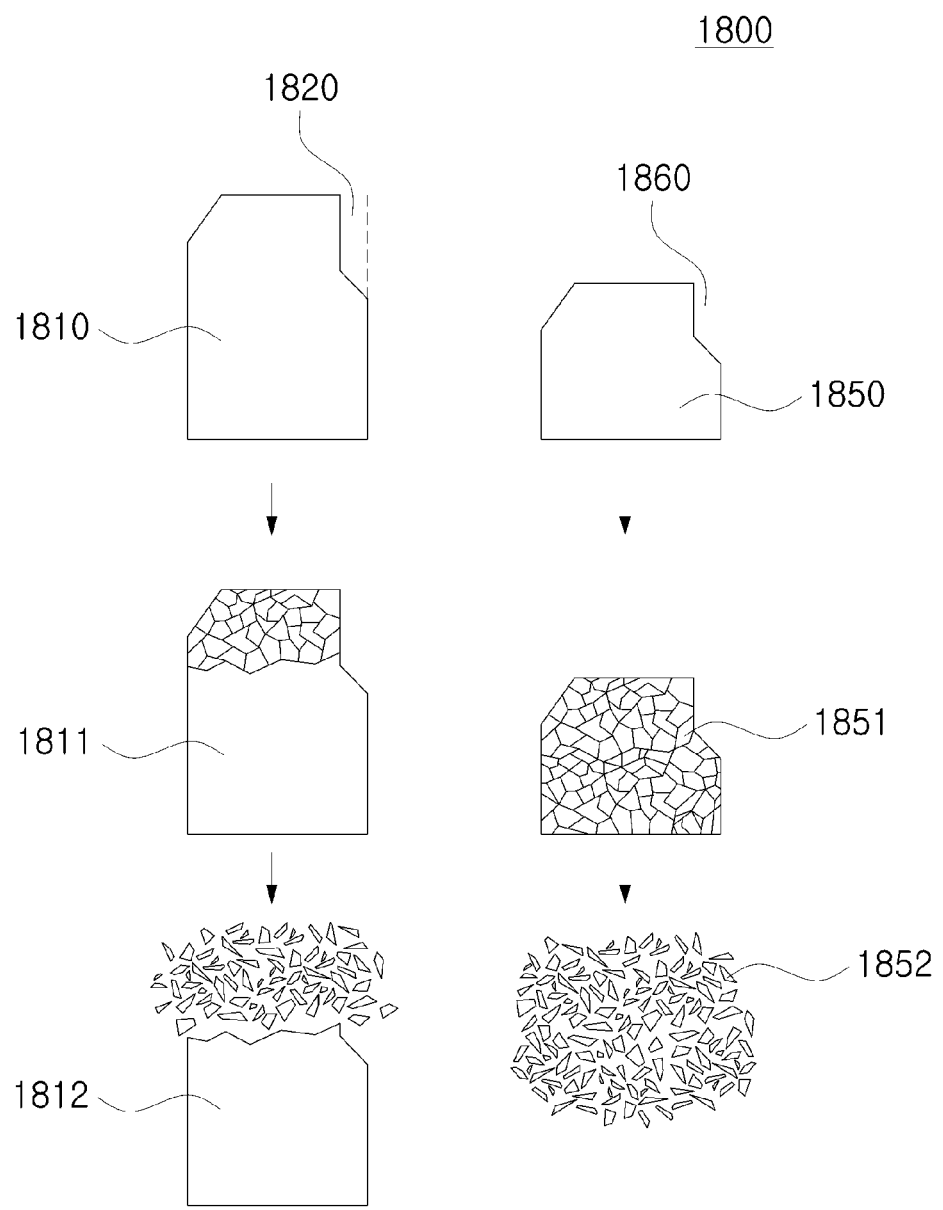
FIG. 34 is a diagram illustrating an example in which a durability state is changed as a barrier is shot according to one embodiment.

FIG. 34 is a diagram illustrating that the durability state is changed as the barrier 1800 is shot.

Referring to FIG. 34, when the first barrier 1810 and the third barrier 1850 are shot, the durability states thereof may be changed according to the degree of damage from a shot.

In this case, when the second barrier 1830 is shot, the durability state of the second barrier 1830 may be changed similarly to that of the first barrier 1810 according to the degree of damage from the shot, and when the fourth barrier 1870 is shot, the durability state of the fourth barrier 1870 may be changed similarly to that of the third barrier 1850 according to the degree of damage from the shot.

The durability state may include a base state, a first state 1811, a second state 112, a third state 1851, and a fourth state 1852.

The first barrier 1810 may have a base state, a first state 1811, or a second state 1812 according to the degree of damage from a shot.

In addition, the third barrier 1850 may have the base state, the third state 1851, or the fourth state 1852 according to the degree of damage from a shot.

Meanwhile, the first barrier 1810 may become the third barrier 1850 according to the degree of damage from a shot.

The degree of damage from a shot may be determined by the number of times the barrier 1800 is shot or the attack power of the control object 2000 or item 1500 carried by the character 900 that attacks the barrier 1800.

The degree of damage from a shot may include a shot from the character 900 protected by the barrier 1800.

For example, in FIG. 33, the second character barrier 1802 protecting the second character 902 may be shot by the attack of the first character 901, as well as by the attack of the second character 902.

In the first state 1811, an impact-induced cracking effect or a partial damage effect may be displayed on a portion of the first barrier 1810.

In the second state 1812, an effect in which a portion of the first barrier 1810 is destroyed may be displayed.

The portion that is destroyed in the second state 1812 may include the portion in which the impact-induced cracking effect or the partial damage effect of the first state 1811 is displayed.

In the third state 1851, an impact-induced cracking effect or a partial damage effect may be displayed on the whole or part of the third barrier 1850.

In the fourth state 1852, an effect in which the whole of the third barrier 1850 is destroyed may be displayed.

Meanwhile, the first state 1811 to the fourth state 1852 may be examples of a state that may occur when the barrier 1800 is shot, and the durability state of the barrier 1800 may include more states according to the degree of damage from a shot.

In FIG. 33, when the first character 901 attacks the second character 902 and the second character barrier 1802 is shot in place of the second character 902, the first auxiliary computing device 301 or the second auxiliary computing device 302 may change and display the durability state of the second character barrier 1802.

For example, when the second character 902 takes cover behind the second character barrier 1802 and an input signal by the first input device is transmitted to the first auxiliary computing device 30 or the server 200 a predetermined number of times or more while the first character 901 aims the first control object 2001 at the second character barrier 1802, at least one of the first wearable display device 401 and the second wearable device 402 may display the second character barrier 1802 as one of the first state 1811 to the fourth state 1852.

In another example, the state of the barrier 1800 may be changed from the first state 1811 to the second state 1812 or changed from the third state 1851 to the fourth state 1852 according to the number of instances of being shot and the degree of damage from a shot.

Meanwhile, when the durability state of the barrier 1800 is changed due to a shot by the character 900, the barrier 1800 may be maintained in the same durability state while the survival content is proceeding.

For example, when the durability state of the first character barrier 1801 is the first state 1811 at a first point in time, the durability state of the first character barrier 1801 may be the first state 1811 at a second point in time at which a predetermined length of time elapses from the first point in time.

In another example, in a case where the first character 901 is located within the first accessible area 1101 at the first point in time and the first character barrier 1801 in the first state 1811 is present in the first barrier area 1121, the first character barrier 1801 in the first state 1811 may be formed in the first barrier area 1121 when the first character 901 moves to another movement target area 1105 at the second point in time and moves back to the first accessible area 1101 at a third point in time.

In another example, in a case where the first character 901 is located in the accessible area 1100 at the first point in time and the first character barrier 1801 is formed in the barrier area 1120 and is in the second state 1812 due to a shot, the second character barrier 1802 in the second state 1812 may be formed in the barrier area 1120 when the first character 901 moves to another accessible area at the second point in time and the second character 902 is located in the accessible area 1100 where the first character 901 was located.

Meanwhile, the durability state of the barrier 1800 that has been changed according to the degree of damage from a shot may be restored to the base state after a predetermined period of time.

For example, the auxiliary computing device 300 may display the barrier 1800 as the third barrier 1850 in the fourth state 1852 that is changed to the third state 1851 and then changed to the base state after a predetermined period of time, or may display the barrier 1800 as the first barrier 1810 that sequentially goes through the third state 1851, the second state 1812, and the first state 1811, and then enters into the base state.

Alternatively, the barrier 1800 having the first state 1811 and the fourth state 1852 may be restored to the barrier 1800 in the base state after a predetermined period of time.

Figure 35:
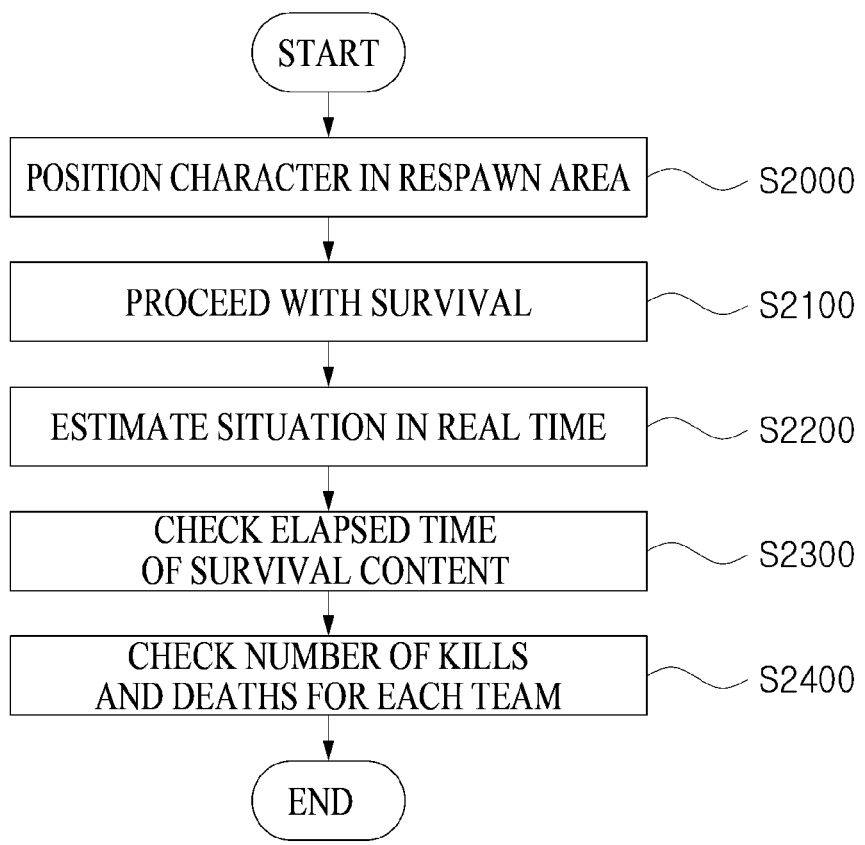
FIG. 35 is a flowchart illustrating a method by which survival content proceeds in a survival virtual space according to one embodiment.

FIG. 35 is a flowchart illustrating a method in which survival content proceeds in a survival virtual space 30.

Referring to FIG. 35, the survival content may proceed through an initial deployment stage (S2000) in which a character 900 is positioned in a respawn area 1300 (S2000), a survival stage (S2100) in which survival proceeds, a situation estimation stage (S2200) in which whether the character 900 is shot and whether the physical strength is present or absent are determined in real time, a time check stage (S2300) in which survival content progress time is checked, and an evaluation stage (S2400) in which the number of kills and the number of deaths are checked for each team.

In the initial deployment stage (S2000), when tutorial is terminated within the tutorial virtual space 20 described in FIG. 10, the character 900 corresponding to the user 800 may be placed in the respawn area 1300 in the survival virtual space 30.

When there are a plurality of users 800, the survival content may proceed as an individual competition or a team competition.

In the case of the individual competition, the characters 900 may be positioned in different respawn areas 1300, and in the case of the team competition, the characters 900 may be positioned in the respawn area 1300 for each team.

In the survival stage (S2100), the character 900 may attack other characters while moving in an accessible area 1100 which forms terrain 1000 in the survival virtual space 30, or a special area 1310.

In this case, the character 900 may use an item 1500, the special area 1310, or a barrier 1800.

In the situation estimation stage (S2200), an auxiliary computing device 300 or a server 200 may share the number of times the character 900 is shot, the degree of damage from the shot, the number of times the character 900 has attacked other characters, the damage caused by the attack of the character 900, and the like.

In addition, the auxiliary computing device 300 or the server 200 may generate a death event when the character 900 does not have any physical strength due to being shot, and when the death event occurs, the character 900 may return to the respawn area 1300 after a predetermined period of time.

In addition, the auxiliary computing device 300 or the server 200 may generate a kill event when another character attacked by the character 900 does not have any physical strength due to the attack of the character 900, and the killed character may move to the respawn area 1300 after a predetermined period of time.

Meanwhile, the auxiliary computing device 300 or the server 200 may record the number of kills and deaths by the character 900 that is determined in the situation estimation stage (S2200) and display the recorded number to an electronic board placed in the survival virtual space 30 through a wearable display device 400.

In the time check stage (S2300), the auxiliary computing device 300 or the server 200 may check the time for which the survival content has proceeded, and when the checked time reaches a preset time or the preset time has elapsed, may terminate the survival content.

Before terminating the survival content, the auxiliary computing device 300 or the server 200 may inform the user 800 of the remaining time until the end through the wearable display device 400.

In the evaluation stage (S2400), the auxiliary computing device 300 or the server 200 may rank the character 900 by taking into consideration the number of kills and deaths, the number of instances of being shot, the degree of damage from the shot, the number of attacks, and the degree of damage from the attack made by the character 900 during the survival content.

The auxiliary computing device 300 or the server 200 may generate a penalty event in the tutorial virtual space 20 according to the rank of the character 900.

A number of example embodiments have been described above. Nevertheless, it should be understood that various modifications may be made to these example embodiments. For example, suitable results may be achieved when the described techniques are performed in a different order and/or when components in a described system, architecture, device, or circuit are combined in a different manner and/or replaced or supplemented by other components or their equivalents.

Accordingly, other implementations are within the scope of the following claims.

REFERENCE NUMERALS

10: VIRTUAL REALITY CONTROL SYSTEM
100: DETECTING DEVICE
200: SERVER
300: AUXILIARY COMPUTING DEVICE
400: WEARABLE DISPLAY DEVICE
500: INPUT DEVICE

The invention claimed is:

1. A virtual reality control system comprising;
a sensor detecting a light signal from a tracking area including a recommended movement area and a remaining area other than the recommended movement area;
a display displaying an image to a first user;
at least one control circuit controlling the display; and
an input device transmitting an input signal input from the first user to the at least one control circuit,
wherein the at least one control circuit is configured to:
provide a plurality of areas including a plurality of accessible areas where a position, a movement, or both, of a first character corresponding to the first user is possible and an inaccessible area where the position, the movement, or both, of the first character is limited, wherein an accessible mark is provided in each of at least one of the plurality of accessible areas which is located within a reference distance from the first character, and wherein each of the plurality of accessible areas includes a first area corresponding to the recommended movement area and corresponding to the remaining area,
compute position data of the first user by using data based on the light signal,
compute a virtual position data based on the position data of the first user, wherein a movement of the first user identified based on the virtual position data is tracked with higher accuracy in the recommended movement area compared to the remaining area,
based on the virtual position data, control the first character to be positioned on at least a part of the plurality of areas,
receive the input signal using the input device while a virtual object corresponding to position data of the input device aims at an area among the plurality of areas, wherein a first accessible area and a second accessible area among the plurality of accessible areas located within the reference distance from the first character at a selection moment, and the accessible mark is displayed on the first accessible area,
based on the input signal being received while the virtual object aims at the first accessible area, control the first character to be positioned on the first accessible area and change a field of view displayed on the display from a field of view corresponding to the virtual position data to a field of view corresponding to the first accessible area,
based on the input signal being received while the virtual object aims at the second accessible area and the accessible mark is not displayed on the second accessible area based on a second character corresponding to a second user being positioned on the second accessible area, maintain the field of view corresponding to the virtual position data displayed on the display, and
based on the input signal being received while the virtual object aims at the inaccessible area, maintain the field of view displayed on the display,
wherein based on at least a part of the first character being positioned in the second accessible area a message for guiding the first user to the recommended movement area in the tracking area is provided.

2. The system of claim 1,
wherein terrain comprising at least two blocks is displayed on the display, and
wherein, at least a part of the at least two blocks includes the plurality of accessible areas and the inaccessible area.

3. The system of claim 2,
wherein a shape of each of the at least two blocks is a hexagonal column.

4. The system of claim 1,
wherein the plurality of accessible areas and the inaccessible area are distinguished by different color.

5. The system of claim 1,
wherein the accessible mark and the first character are connected by a line.

6. The system of claim 1, wherein the plurality of areas further include a special area,
wherein the special area includes a virtual item which is available for the first character, and wherein when the input signal is transmitted to the at least one control circuit while the virtual object aims the virtual item, the first character gets the virtual item.

7. The system of claim 1, wherein the plurality of areas further include a special area, and
wherein when the virtual position data exists in the special area, the at least one control circuit is configured to change the field of view displayed on the display from the field of view corresponding to the virtual position data to a field of view corresponding to a position vertically risen from the virtual position data.

8. The system of claim 1, wherein the plurality of areas further include a respawn area, and
wherein when a death event is occurred to the first character, the at least one control circuit is configured to change the field of view displayed on the display from the field of view corresponding to the virtual position data to a field of view corresponding to a position vertically risen from the virtual position data.

9. The system of claim 1,
wherein the accessible mark is not provided in a third accessible area located outside the reference distance from the first character, among the plurality of accessible areas.

\* \* \* \* \*